(12) United States Patent
Kusashima et al.

(10) Patent No.: US 10,075,263 B2
(45) Date of Patent: Sep. 11, 2018

(54) TERMINAL DEVICE, BASE STATION APPARATUS, COMMUNICATION METHOD, AND INTEGRATED CIRCUIT

(71) Applicant: SHARP KABUSHIKI KAISHA, Osaka-shi, Osaka (JP)

(72) Inventors: Naoki Kusashima, Osaka (JP); Toshizo Nogami, Osaka (JP); Kazuyuki Shimezawa, Osaka (JP); Wataru Ouchi, Osaka (JP); Kimihiko Imamura, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 17 days.

(21) Appl. No.: 15/039,321

(22) PCT Filed: Nov. 26, 2014

(86) PCT No.: PCT/JP2014/081211
§ 371 (c)(1),
(2) Date: May 25, 2016

(87) PCT Pub. No.: WO2015/080140
PCT Pub. Date: Jun. 4, 2015

(65) Prior Publication Data
US 2017/0170931 A1 Jun. 15, 2017

(30) Foreign Application Priority Data
Nov. 26, 2013 (JP) .................................. 2013-243416

(51) Int. Cl.
*H04L 1/18* (2006.01)
*H04L 5/00* (2006.01)
*H04L 5/14* (2006.01)

(52) U.S. Cl.
CPC .......... *H04L 1/1861* (2013.01); *H04L 5/0058* (2013.01); *H04L 5/14* (2013.01);
(Continued)

(58) Field of Classification Search
CPC ....... H04L 1/1861; H04L 5/14; H04L 5/0058; H04L 5/001
See application file for complete search history.

(56) References Cited

U.S. PATENT DOCUMENTS

| | | | |
|---|---|---|---|
| 2013/0242816 A1* | 9/2013 | He ..................... | H04W 28/0268 370/280 |
| 2014/0369290 A1* | 12/2014 | Yang ..................... | H04L 1/1861 370/329 |
| 2014/0376421 A1* | 12/2014 | Yang ........................ | H04L 5/14 370/280 |

OTHER PUBLICATIONS

3GPP TS 36.211 V8.8.0 (Sep. 2009), 3rd Generation Partnership Project; Technical Specification Group Radio Access Network; Evolved Universal Terrestrial Radio Access (E-UTRA); Physical Channels and Modulation, (Release (Release 8).
(Continued)

*Primary Examiner* — Gbemileke J Onamuti
(74) *Attorney, Agent, or Firm* — Birch, Stewart, Kolasch & Birch, LLP

(57) ABSTRACT

A terminal device includes a transmission unit that transmits HARQ response information to a first serving cell and a second serving cell on a physical uplink shared channel in a subframe. The physical uplink shared channel is transmitted based on a physical downlink control channel or an enhanced physical downlink control channel which is detected in a state of including a downlink control information format 0/4. Two or more serving cells are configured in the terminal device, in a case where frame constitution types of any two configured serving cells are different from each other, and in a case where a primary cell has Frame (Continued)

constitution type 2, $B_c^{DL}$ is applied to the first serving cell of Frame constitution type 2 by using a first following expression, and is applied to the second serving cell of Frame constitution type 1 by using a second expression.

8 Claims, 15 Drawing Sheets

(52) U.S. Cl.
CPC ............ *H04L 1/1812* (2013.01); *H04L 5/001* (2013.01); *H04L 5/0055* (2013.01)

(56) References Cited

OTHER PUBLICATIONS

3GPP TS 36.300 V10,10.0 (Jun. 2013), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 10).

HiSilicon Huawei, "Potential solutions of TDD-FDD joint operation", R1-132886, 3GPP TSG RAN WG1 Meeting #74, Barcelona, Spain, Aug. 19-23, 2013.

* cited by examiner

FIG. 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Special subframe [S]   Uplink subframe [U]   Downlink subframe [D]

FIG. 6

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 7

| | |
|---|---|
| PDCCH | $n_{PUCCH,i}^{(1)} = (M - i - 1) \cdot N_c + i \cdot N_{c+1} + n_{CCE,i} + N_{PUCCH}^{(1)}$ ... EXPRESSION (a) |
| EPDCCH | IN CASE OF DISTRIBUTED TRANSMISSION<br>$n_{PUCCH,i}^{(1)} = n_{ECCE,q} + \sum_{i1=0}^{i-1} N_{ECCE,q,n-k_{i1}} + \Delta_{ARO} + N_{PUCCH,q}^{(e1)}$ ... EXPRESSION (b-1)<br><br>IN CASE OF LOCALIZED TRANSMISSION<br>$n_{PUCCH,i}^{(1)} = \left\lfloor \frac{n_{ECCE,q}}{N_{RB}^{ECCE,q}} \right\rfloor \cdot N_{RB}^{ECCE,q} + \sum_{i1=0}^{i-1} N_{ECCE,q,n-k_{i1}} + n' + \Delta_{ARO} + N_{PUCCH,q}^{(e1)}$ ... EXPRESSION (b-2) |

WHERE, c IS SELECTED FROM {0, 1, 2, 3} SO AS TO SATISFY $N_c \leq n_{CCE,i} < N_{c+1}$ ; $N_c = \max\left\{0, \left\lfloor \left\lfloor N_{RB}^{DL} \cdot (N_{sc}^{RB} \cdot c - 4) \right\rfloor / 36 \right\rfloor \right\}$

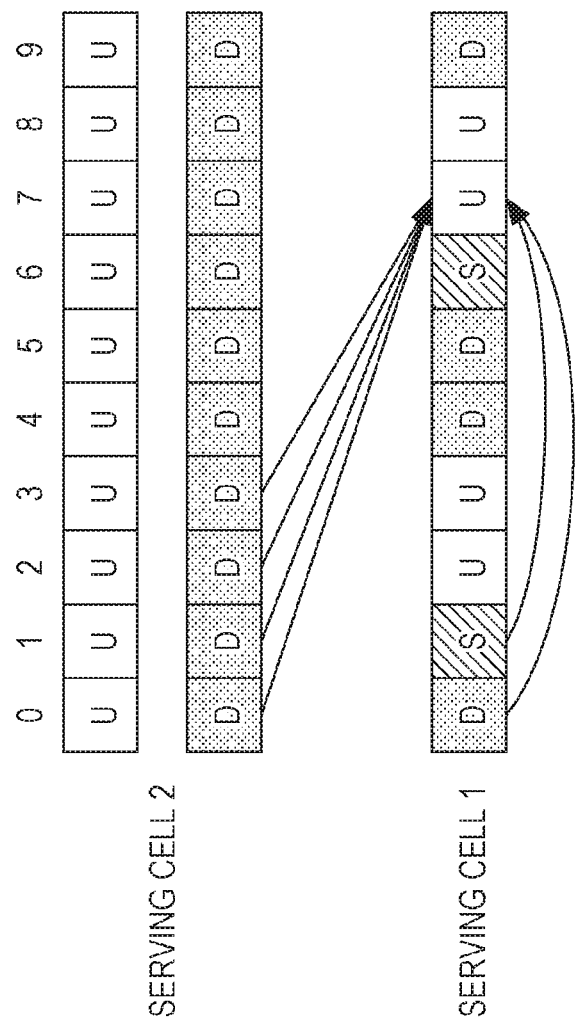

FIG. 9

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5, 4 | | 4, 5 | | | 6, 5, 4 | | 4, 5 |
| 1 | | | 7, 6, 5, 4 | 4 | | | | 7, 6, 5, 4 | 4 | |
| 2 | | | 8, 7, 4, 6, 5 | | | | | 8, 7, 4, 6, 5 | | |
| 3 | | | 7, 6, 11, 10, 9, 8 | 6, 5 | 5, 4 | | | | | |
| 4 | | | 12, 11, 8, 7, 10, 9 | 7, 6, 5, 4 | | | | | | |
| 5 | | | 13, 12, 9, 8, 7, 5, 4, 11, 6, 10 | | | | | | | |
| 6 | | | 10, 9, 8, 7 | 7 | 5 | | | 10, 9, 7 | 7 | |

FIG. 10

| SET | (PRIMARY CELL UL/DL CONFIGURATION, SECONDARY CELL UL/DL CONFIGURATION) | DOWNLINK REFERENCE UL/DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(0,2),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 11

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5, 4 | | 4, 5 | | | 6, 5, 4 | | 4, 5 |
| 1 | | | 7, 6, 5, 4 | 4 | | | | 7, 6, 5, 4 | 4 | |
| 2 | | | 8, 7, 4, 6, 5 | | | | | 8, 7, 4, 6, 5 | | |
| 3 | | | 7, 6, 11, 10, 9, 8 | 6, 5 | 5, 4 | | | | | |
| 4 | | | 12, 11, 8, 7, 10, 9 | 7, 6, 5, 4 | | | | | | |
| 5 | | | 13, 12, 9, 8, 7, 5, 4, 11, 6 | | | | | | | |
| 6 | | | 10, 9, 8, 7 | 7 | 5 | | | 10, 9, 7 | 7 | |

FIG. 12

| DAI MSB, LSB | $V_{DAI}^{UL}$ or $V_{DAI}^{DL}$ | Number of subframes with PDSCH transmission and with PDCCH/EPDCCH indicating DL SPS release |
|---|---|---|
| 0, 0 | 1 | 1 or 5 or 9 |
| 0, 1 | 2 | 2 or 6 or 10 |
| 1, 0 | 3 | 3 or 7 |
| 1, 1 | 4 | 0 or 4 or 8 |

FIG. 13

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

FIG. 14

$B_c^{DL} = M$ ... EXPRESSION (a-1)

$B_c^{DL} = W_{DAI}^{UL}$ ... EXPRESSION (a-2)

$B_c^{DL} = W_{DAI}^{UL} + 4\left\lceil (U - W_{DAI}^{UL})/4 \right\rceil$ ... EXPRESSION (a-3)

$B_c^{DL} = M_c$ ... EXPRESSION (b-1)

$B_c^{DL} = \min(W_{DAI}^{UL}, M_c)$ ... EXPRESSION (b-2)

$B_c^{DL} = \min\left(W_{DAI}^{UL} + 4\left\lceil (U - W_{DAI}^{UL})/4 \right\rceil, M_c\right)$ ... EXPRESSION (b-3)

$B_c^{DL} = 1$ ... EXPRESSION (b-4)

FIG. 15

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6,5 | 5,4 | 4 | | | 6,5 | 5,4 | 4 |
| 1 | | | 7,6,5 | 4,5 | | | | 7,6,5 | 4,5 | |
| 2 | | | 8,7,4,6,5 | | | | | 8,7,4,6,5 | | |
| 3 | | | 7,6,11,10 | 6,5,10 | 5,4,10 | | | | | |
| 4 | | | 12,11,8,7,10 | 7,6,5,4,10 | | | | | | |
| 5 | | | 13,12,9,8,7,5,4,11,6,10 | | | | | | | |
| 6 | | | 7,8 | 7,6 | 5,6 | | | 7,5 | 7,5 | |

TERMINAL DEVICE, BASE STATION APPARATUS, COMMUNICATION METHOD, AND INTEGRATED CIRCUIT

TECHNICAL FIELD

The present invention relates to a terminal device, a base station apparatus, a communication method, and an integrated circuit.

This application is based upon and claims the benefit of priority of the prior Japanese Patent Application No. 2013-243416, filed on Nov. 26, 2013, the entire contents of which are incorporated herein by reference.

BACKGROUND ART

A base station apparatus (a base station, a cell, a first communication apparatus (communication apparatus different from a terminal device), and eNodeB), and a terminal device (a terminal, a mobile terminal, a mobile station apparatus, a second communication apparatus (communication apparatus different from the base station apparatus), user equipment (UE), and a user device) are included in a communication system such as Wideband Code Division Multiple Access (WCDMA) (registered trademark), Long Term Evolution (LTE), and LTE-Advanced (LTE-A) by Third Generation Partnership Project (3GPP), and a Wireless Local Area Network (WLAN), and Worldwide Interoperability for Microwave Access (WiMAX) by The Institute of Electrical and Electronics engineers (IEEE). Each of the base station apparatus and the terminal device includes a plurality of transmit/receive antennae. The base station apparatus and the terminal device perform spatial multiplexing on a data signal by using a Multi Input Multi Output (MIMO) technology, and thus high-speed data communication is realized.

In 3GPP, in order to realize high-speed data communication between the base station apparatus and the terminal device, carrier aggregation (CA) in which simultaneous communication is performed by using a plurality of component carriers is employed (NPL 1).

In 3GPP, as a frame structure type of a hi-directional communication scheme (duplex communication scheme), frequency division duplex (FDD) and time division duplex (TDD) are employed. In FDD, a full duplex scheme in which bi-directional communication can be simultaneously performed, and a half duplex scheme in which uni-directional communication is switched and thus the hi-directional communication is realized are employed (NPL 2). There is also a case where LTE employing the TDD is referred to as TD-LTE or LTE TDD.

In 3GPP, TDD-FDD carrier aggregation (TDD-FDD CA) in which a component carrier (TDD carrier) which supports the TDD, and a component carrier (FDD carrier) which supports the FDD are aggregated and communication is performed is examined (NPL 3).

CITATION LIST

Non Patent Literature

NPL 1: 3rd Generation Partnership Project Technical Specification Group Radio Access Network; Evolved Universal Terrestrial Radio Access (E-UTRA) and Evolved Universal Terrestrial Radio Access Network (E-UTRAN); Overall description; Stage 2 (Release 10), TS36.300 v10.10.0 (2013-06).

NPL 2: 3rd Generation Partnership Project Technical Specification Group Radio Access Network; Evolved Universal Terrestrial Radio Access (E-UTRA); Physical Channels and Modulation (Release 8), TS36.211 v8.8.0 (2009-09).

NPL 3: "Potential solutions of TDD-FDD joint operation", R1-132886, 3GPP TSG-RAN WG1 Meeting #74, Barcelona, Spain, 19-23 Aug. 2013.

SUMMARY OF INVENTION

Technical Problem

In carrier aggregation performed by a TDD cell and an FDD cell, a mechanism in which HARQ response information which corresponds to a PDCCH/EPDCCH indicating a cell PDSCH of a certain frame constitution type, or a PDCCH/EPDCCH indicating SPS release is transmitted and received to and from a cell of a frame constitution type which is different from the above cells is not provided. Thus, there is a problem in that appropriate communication is not performed.

Considering the above problem, an object of an aspect of the present invention is to provide a terminal device and the like which allow appropriate communication.

Solution to Problem

[1] An aspect of the invention has been made for solving the above-described problem. According to a first aspect of the present invention, there is provided a terminal device which includes a transmission unit that transmits HARQ response information to a first serving cell and a second serving cell on a physical uplink shared channel in a subframe n. The physical uplink shared channel is transmitted based on a physical downlink control channel or an enhanced physical downlink control channel which is detected in a state of including a downlink control information format 0/4. Two or more serving cells are configured in the terminal device, in a case where frame constitution types of any two configured serving cells are different from each other, and in a case where a primary cell has Frame constitution type 2, $B_c^{DL}$ is applied to the first serving cell of Frame constitution type 2 by using the following expression (1), and is applied to the second serving cell of Frame constitution type 1 by using the following expression (2).

[Math. 1]
$$B_c^{DL} = \min(W_{DAI}^{UL}, M_c) \qquad \text{Expression (1)}$$

[Math. 2]
$$B_c^{DL} = \min(W_{DAI}^{UL} + 4\lceil (U - W_{DAI}^{UL})/4 \rceil, M_c) \qquad \text{Expression (2)}$$

The $B_c^{DL}$ is the number of subframes required for the terminal device performing feedback of the HARQ response information to the first serving cell or the second serving cell. The $W_{DAI}^{UL}$ is determined by a downlink allocation index in the downlink control information format 0/4 corresponding to the physical uplink shared channel in the first serving cell or the second serving cell. The $M_c$ is the number of elements in a downlink association set associated with the subframe n for the first serving cell or the second serving cell. The U indicates the maximum value of $U_c$ in all configured serving cells. The $U_c$ is the total number of received physical downlink shared channels with respect to the first serving cell or the second serving cell in a subframe (n−k), or physical downlink control channels, or enhanced physical downlink control channels which indicate release of downlink semi-persistent scheduling. Min(x, y) is a function indicating a minimum value of the x and the y.
[Math. 3]

$$\lceil z \rceil$$

is a function indicating a minimum integer among integers which are equal to or more than z.

[2] In the terminal device according to the first aspect of the present invention, a downlink reference uplink/downlink configuration of the first serving cell or the second serving cell may be 2 or 4.

[3] In the terminal device according to the first aspect of the present invention, the first serving cell may be the primary cell or a secondary cell.

[4] In the terminal device according to the first aspect of the present invention, the second serving cell may be a secondary cell.

[5] In the terminal device according to the first aspect of the present invention, the Frame constitution type 1 may be allowed to be applied to frequency division duplex.

[6] In the terminal device according to the first aspect of the present invention, the Frame constitution type 2 may be allowed to be applied to time division duplex.

[7] In the terminal device according to the first aspect of the present invention, the downlink association set may depend on the subframe n and the downlink reference uplink/downlink configuration.

[8] According to a second aspect of the present invention, there is provided a terminal device which includes a transmission unit that transmits HARQ response information to a serving cell on a physical uplink shared channel in a subframe n. The physical uplink shared channel is transmitted based on a physical downlink control channel or an enhanced physical downlink control channel which is detected in a state of including a downlink control information format 0/4. In a set of two or more downlink cells which include a primary cell using frequency division duplex and at least one secondary cell using time division duplex, $B_c^{DL}$ is 1. The $B_c^{DL}$ is the number of subframes required for the terminal device performing feedback of HARQ response information to the serving cell.

[9] In the terminal device according to the second aspect of the present invention, the serving cell may be a secondary cell using frequency division duplex.

[10] In the terminal device according to the second aspect of the present invention, the serving cell may be a primary cell or a secondary cell which uses time division duplex.

[11] According to a third aspect of the present invention, there is provided a base station apparatus which communicates with a terminal device. The base station apparatus includes a reception unit that receives HARQ response information regarding a first serving cell and a second serving cell on a physical uplink shared channel in a subframe n. The physical uplink shared channel is transmitted based on a physical downlink control channel or an enhanced physical downlink control channel which is detected in a state of including a downlink control information format 0/4. Two or more serving cells are configured in the terminal device, in a case where frame constitution types of any two configured serving cells are different from each other, and in a case where a primary cell has Frame constitution type 2, $B_c^{DL}$ is applied to the first serving cell of Frame constitution type 2 by using the following expression (1), and is applied to the second serving cell of Frame constitution type 1 by using the following expression (2).
[Math. 4]

$$B_c^{DL}=\min(W_{DAI}^{UL},M_c) \qquad \text{Expression (1)}$$

[Math. 5]

$$B_c^{DL}=\min(W_{DAI}^{UL}+4\lceil(U-W_{DAI}^{UL})/4\rceil,M_c) \qquad \text{Expression (2)}$$

The $B_c^{DL}$ is the number of subframes required for the terminal device performing feedback of the HARQ response information to the first serving cell or the second serving cell. The $W_{DAI}^{UL}$ is determined by a downlink allocation index in the downlink control information format 0/4 corresponding to the physical uplink shared channel in the first serving cell or the second serving cell. The $M_c$ is the number of elements in a downlink association set associated with the subframe n for the first serving cell or the second serving cell. The U indicates the maximum value of $U_c$ in all configured serving cells. The $U_c$ is the total number of received physical downlink shared channels with respect to the first serving cell or the second serving cell in a subframe (n−k), or physical downlink control channels, or enhanced physical downlink control channels which indicate release of downlink semi-persistent scheduling. Min(x, y) is a function indicating a minimum value of the x and the y.
[Math. 6]

$$\lceil z \rceil$$

is a function indicating a minimum integer among integers which are equal to or more than z.

[12] In the base station apparatus according to the third aspect of the present invention, a downlink reference uplink/downlink configuration of the first serving cell or the second serving cell may be 2 or 4.

[13] In the base station apparatus according to the third aspect of the present invention, the first serving cell may be the primary cell or a secondary cell.

[14] In the base station apparatus according to the third aspect of the present invention, the second serving cell may be a secondary cell.

[15] In the base station apparatus according to the third aspect of the present invention, the Frame constitution type 1 may be allowed to be applied to frequency division duplex.

[16] In the base station apparatus according to the third aspect of the present invention, the Frame constitution type 2 may be allowed to be applied to time division duplex.

[17] In the base station apparatus according to the third aspect of the present invention, the downlink association set may depend on the subframe n and the downlink reference uplink/downlink configuration.

[18] According to a fourth aspect of the present invention, there is provided a base station apparatus which communicates with a terminal device. The base station apparatus includes a reception unit that receives HARQ response information regarding a serving cell on a physical uplink shared channel in a subframe n. The physical uplink shared channel is transmitted based on a physical downlink control channel or an enhanced physical downlink control channel which is detected in a state of including a downlink control information format 0/4. In a set of two or more downlink cells which include a primary cell using frequency division duplex and at least one secondary cell using time division duplex, $B_c^{DL}$ is 1. The $B_c^{DL}$ is the number of subframes required for the terminal device performing feedback of HARQ response information to the serving cell.

[19] In the base station apparatus according to the fourth aspect of the present invention, the serving cell may be a secondary cell using frequency division duplex.

[20] In the base station apparatus according to the fourth aspect of the present invention, the serving cell may be a primary cell or a secondary cell which uses time division duplex.

[21] According to a fifth aspect of the present invention, there is provided a communication method of a terminal device, which includes a step of transmitting HARQ response information to a first serving cell and a second serving cell on a physical uplink shared channel in a subframe n. The physical uplink shared channel is transmitted based on a physical downlink control channel or an enhanced physical downlink control channel which is detected in a state of including a downlink control information format 0/4. Two or more serving cells are configured in the terminal device, in a case where frame constitution types of any two configured serving cells are different from each other, and in a case where a primary cell has Frame constitution type 2, $B_c^{DL}$ is applied to the first serving cell of Frame constitution type 2 by using the following expression (1), and is applied to the second serving cell of Frame constitution type 1 by using the following expression (2).
[Math. 7]

$$B_c^{DL}=\min(W_{DAI}^{UL},M_c) \qquad \text{Expression (1)}$$

[Math. 8]

$$B_c^{DL}=\min(W_{DAI}^{UL}+4\lceil(U-W_{DAI}^{UL})/4\rceil,M_c) \qquad \text{Expression (2)}$$

The $B_c^{DL}$ is the number of subframes required for the terminal device performing feedback of the HARQ response information to the first serving cell or the second serving cell. The $W_{DAI}^{UL}$ is determined by a downlink allocation index in the downlink control information format 0/4 corresponding to the physical uplink shared channel in the first serving cell or the second serving cell. The $M_c$ is the number of elements in a downlink association set associated with the subframe n for the first serving cell or the second serving cell. The U indicates the maximum value of $U_c$ in all configured serving cells. The $U_c$ is the total number of received physical downlink shared channels with respect to the first serving cell or the second serving cell in a subframe (n–k), or physical downlink control channels, or enhanced physical downlink control channels which indicate release of downlink semi-persistent scheduling. Min(x, y) is a function indicating a minimum value of the x and the y.
[Math. 9]

$$\lceil z \rceil$$

is a function indicating a minimum integer among integers which are equal to or more than z.

[22] According to a sixth aspect of the present invention, there is provided a communication method of a terminal device, which includes a step of transmitting HARQ response information to a serving cell on a physical uplink shared channel in a subframe n. The physical uplink shared channel is transmitted based on a physical downlink control channel or an enhanced physical downlink control channel which is detected in a state of including a downlink control information format 0/4. In a set of two or more downlink cells which include a primary cell using frequency division duplex and at least one secondary cell using time division duplex, $B_c^{DL}$ is 1. The $B_c^{DL}$ is the number of subframes required for the terminal device performing feedback of HARQ response information to the serving cell.

[23] According to a sixth aspect of the present invention, there is provided a communication method of a base station apparatus which communicates with a terminal device. The communication method includes step of receiving HARQ response information regarding a first serving cell and a second serving cell on a physical uplink shared channel in a subframe n. The physical uplink shared channel is transmitted based on a physical downlink control channel or an enhanced physical downlink control channel which is detected in a state of including a downlink control information format 0/4. Two or more serving cells are configured in the terminal device, in a case where frame constitution types of any two configured serving cells are different from each other, and in a case where a primary cell has Frame constitution type 2, $B_c^{DL}$ is applied to the first serving cell of Frame constitution type 2 by using the following expression (1), and is applied to the second serving cell of Frame constitution type 1 by using the following expression (2).
[Math. 10]

$$B_c^{DL}=\min(W_{DAI}^{UL},M_c) \qquad \text{Expression (1)}$$

[Math. 11]

$$B_c^{DL}=\min(W_{DAI}^{UL}+4\lceil(U-W_{DAI}^{UL})/4\rceil,M_c) \qquad \text{Expression (2)}$$

The $B_c^{DL}$ is the number of subframes required for the terminal device performing feedback of the HARQ response information to the first serving cell or the second serving cell. The $W_{DAI}^{UL}$ is determined by a downlink allocation index in the downlink control information format 0/4 corresponding to the physical uplink shared channel in the first serving cell or the second serving cell. The $M_c$ is the number of elements in a downlink association set associated with the subframe n for the first serving cell or the second serving cell. The U indicates the maximum value of $U_c$ in all configured serving cells. The $U_c$ is the total number of received physical downlink shared channels with respect to the first serving cell or the second serving cell in a subframe (n–k), or physical downlink control channels, or enhanced physical downlink control channels which indicate release of downlink semi-persistent scheduling. Min(x, y) is a function indicating a minimum value of the x and the y.
[Math. 12]

$$\lceil z \rceil$$

is a function indicating a minimum integer among integers which are equal to or more than z.

[24] According to a seventh aspect of the present invention, there is provided a communication method of a base station apparatus which communicates with a terminal device. The communication method includes a step of receiving HARQ response information regarding a serving cell on a physical uplink shared channel in a subframe n. The physical uplink shared channel is transmitted based on a physical downlink control channel or an enhanced physical downlink control channel which is detected in a state of including a downlink control information format 0/4. In a set of two or more downlink cells which include a primary cell using frequency division duplex and at least one secondary cell using time division duplex, $B_c^{DL}$ is 1. The $B_c^{DL}$ is the number of subframes required for the terminal device performing feedback of HARQ response information to the serving cell.

[25] According to an eighth aspect of the present invention, there is provided an integrated circuit mounted in a terminal device. The integrated circuit realizes a function of transmitting HARQ response information to a first serving cell and a second serving cell on a physical uplink shared channel in a subframe n. The physical uplink shared channel is transmitted based on a physical downlink control channel or an enhanced physical downlink control channel which is detected in a state of including a downlink control information format 0/4. Two or more serving cells are configured in the terminal device, in a case where frame constitution types of any two configured serving cells are different from each other, and in a case where a primary cell has Frame constitution type 2, $B_c^{DL}$ is applied to the first serving cell of Frame constitution type 2 by using the following expression (1), and is applied to the second serving cell of Frame constitution type 1 by using the following expression (2).
[Math. 13]

$$B_c^{DL}=\min(W_{DAI}^{UL},M_c) \quad \text{Expression (1)}$$

[Math. 14]

$$B_c^{DL}=\min(W_{DAI}^{UL}+4\lceil(U-W_{DAI}^{UL})/4\rceil,M_c) \quad \text{Expression (2)}$$

The $B_c^{DL}$ is the number of subframes required for the terminal device performing feedback of the HARQ response information to the first serving cell or the second serving cell. The $W_{DAI}^{UL}$ is determined by a downlink allocation index in the downlink control information format 0/4 corresponding to the physical uplink shared channel in the first serving cell or the second serving cell. The $M_c$ is the number of elements in a downlink association set associated with the subframe n for the first serving cell or the second serving cell. The U indicates the maximum value of $U_c$ in all configured serving cells. The $U_c$ is the total number of received physical downlink shared channels with respect to the first serving cell or the second serving cell in a subframe (n−k), or physical downlink control channels, or enhanced physical downlink control channels which indicate release of downlink semi-persistent scheduling. Min(x, y) is a function indicating a minimum value of the x and the y.
[Math. 15]

$$\lceil z \rceil$$

is a function indicating a minimum integer among integers which are equal to or more than z.

[26] According to a ninth aspect of the present invention, there is provided an integrated circuit mounted in a terminal device. The integrated circuit realizes a function of transmitting HARQ response information to a serving cell on a physical uplink shared channel in a subframe n. The physical uplink shared channel is transmitted based on a physical downlink control channel or an enhanced physical downlink control channel which is detected in a state of including a downlink control information format 0/4. In a set of two or more downlink cells which include a primary cell using frequency division duplex and at least one secondary cell using time division duplex, $B_c^{DL}$ is 1. The $B_c^{DL}$ is the number of subframes required for the terminal device performing feedback of HARQ response information to the serving cell.

[27] According to a ninth aspect of the present invention, there is provided an integrated circuit mounted in a base station apparatus which communicates with a terminal device. The integrated circuit realizes a function of receiving HARQ response information regarding a first serving cell and a second serving cell on a physical uplink shared channel in a subframe n. The physical uplink shared channel is transmitted based on a physical downlink control channel or an enhanced physical downlink control channel which is detected in a state of including a downlink control information format 0/4. Two or more serving cells are configured in the terminal device, in a case where frame constitution types of any two configured serving cells are different from each other, and in a case where a primary cell has Frame constitution type 2, $B_c^{DL}$ is applied to the first serving cell of Frame constitution type 2 by using the following expression (1), and is applied to the second serving cell of Frame constitution type 1 by using the following expression (2).
[Math. 16]

$$B_c^{DL}=\min(W_{DAI}^{UL},M_c) \quad \text{Expression (1)}$$

[Math. 17]

$$B_c^{DL}=\min(W_{DAI}^{UL}+4\lceil(U-W_{DAI}^{UL})/4\rceil,M_c) \quad \text{Expression (2)}$$

The $B_c^{DL}$ is the number of subframes required for the terminal device performing feedback of the HARQ response information to the first serving cell or the second serving cell. The $W_{DAI}^{UL}$ is determined by a downlink allocation index in the downlink control information format 0/4 corresponding to the physical uplink shared channel in the first serving cell or the second serving cell. The $M_c$ is the number of elements in a downlink association set associated with the subframe n for the first serving cell or the second serving cell. The U indicates the maximum value of $U_c$ in all configured serving cells. The $U_c$ is the total number of received physical downlink shared channels with respect to the first serving cell or the second serving cell in a subframe (n−k), or physical downlink control channels, or enhanced physical downlink control channels which indicate release of downlink semi-persistent scheduling. Min(x, y) is a function indicating a minimum value of the x and the y.
[Math. 18]

$$\lceil z \rceil$$

is a function indicating a minimum integer among integers which are equal to or more than z.

[28] According to a tenth aspect of the present invention, there is provided an integrated circuit mounted in a base station apparatus which communicates with a terminal device. The integrated circuit realizes a function of receiving HARQ response information regarding a serving cell on a physical uplink shared channel in a subframe n. The physical uplink shared channel is transmitted based on a physical downlink control channel or an enhanced physical downlink control channel which is detected in a state of including a downlink control information format 0/4. In a set of two or more downlink cells which include a primary cell using frequency division duplex and at least one secondary cell using time division duplex, $B_c^{DL}$ is 1. The $B_c^{DL}$ is the number of subframes required for the terminal device performing feedback of HARQ response information to the serving cell.

Advantageous Effects of Invention

According to any aspect of the invention, in a communication system in which a base station apparatus and a terminal device communicate with each other, the terminal device performs appropriate transmission control and reception control, and thus it is possible to improve communication efficiency.

BRIEF DESCRIPTION OF DRAWINGS

FIG. 3 is a diagram illustrating a configuration of a subframe pattern in a TDD UL/DL configuration.

FIG. 6 is a diagram illustrating a correspondence between a subframe in which a PDCCH/EPDCCH is transmitted, and a subframe in which the HARQ response information is transmitted, according to the first embodiment of the present invention.

FIG. 7 is a diagram illustrating a calculation expression of PUCCH resources including the HARQ response information in TDD according to the first embodiment of the present invention.

FIG. 8 is a diagram illustrating an example of a transmission timing of the HARQ response information in carrier aggregation between TDD and FDD, according to the first embodiment of the present invention.

FIG. 9 a diagram illustrating an example of a correspondence between a subframe in which the PDCCH/EPDCCH is transmitted and a subframe in which the HARQ response information is transmitted, in the carrier aggregation between TDD and FDD according to the first embodiment of the present invention.

FIG. 10 is a diagram illustrating a correspondence between a combination of UL-DL configurations and a downlink reference UL-DL configuration, according to the first embodiment of the present invention.

FIG. 11 is a diagram illustrating an example of the correspondence between a subframe in which the PDCCH/EPDCCH is transmitted and a subframe in which the HARQ response information is transmitted, in the carrier aggregation between TDD and FDD according to the first embodiment of the present invention.

FIG. 12 is a diagram illustrating a correspondence between a value of a DAI and the number of subframes of the PDCCH/EPDCCH indicating PDSCH transmission and release of downlink SPS, according to the first embodiment of the present invention.

FIG. 13 is a diagram illustrating an uplink association index according to the first embodiment of the present invention.

FIG. 14 is a diagram illustrating a calculation expression of the number of downlink subframes required for performing feedback of a HARQ response information bit according to the first embodiment of the present invention.

FIG. 15 is a diagram illustrating an example of the correspondence between a subframe in which the PDCCH/EPDCCH is transmitted and a subframe in which the HARQ response information is transmitted, in the carrier aggregation between TDD and FDD according to the first embodiment of the present invention.

DESCRIPTION OF EMBODIMENTS

Figure 1:
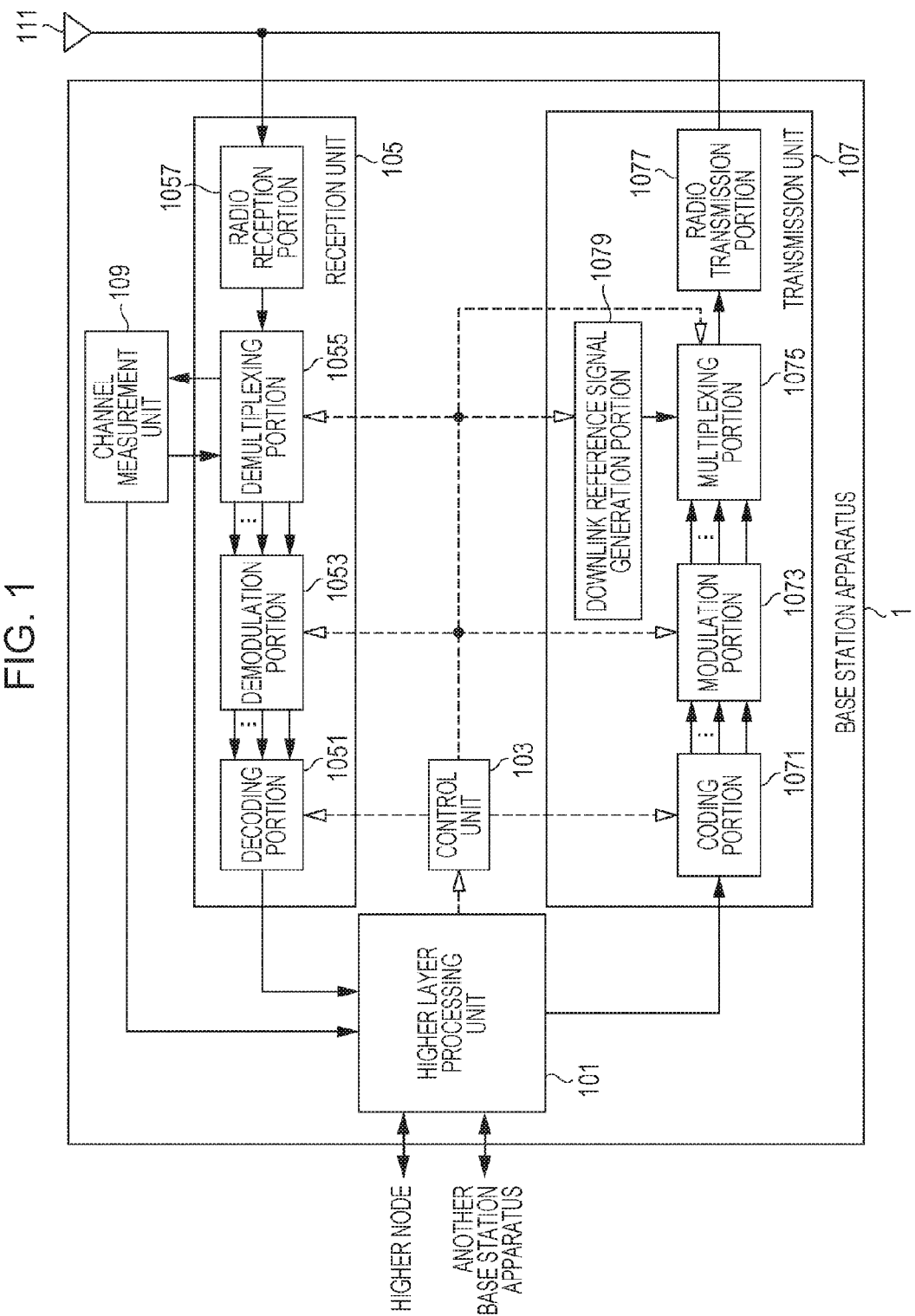
FIG. 1 is a schematic block diagram illustrating a configuration of a base station apparatus 1 according to a first embodiment of the present invention.

In a communication system of an embodiment, carrier aggregation in which a plurality of component carriers are aggregated (summed, collected) so as to perform communication is applied. Because a cell may be configured by using a component carrier, the carrier aggregation may be referred to as cell aggregation. That is, the communication system according to the embodiment may perform communication by using integration of a plurality of cells. In the communication system according to the embodiment, the cell aggregation aggregates a cell (TDD cell, TDD serving cell, TDD carrier, and TDD component carrier) to which a TDD scheme is applied, and a cell (FDD cell, FDD serving cell, FDD carrier, and FDD component carrier) to which an FDD scheme is applied, among the plurality of cells, and performs communication. That is, in the communication system according to the embodiment, the cell aggregation is applied in a plurality of cells in which a different frame structure type is configured. The frame structure type may be referred to as duplex mode. In LTE and LTE-A, Frame structure type 1 is defined as the FDD, and Frame constitution type 2 is defined as the TDD.

In the cell aggregation, one primary cell and one or more secondary cells are aggregated so as to perform communication. The primary cell may be configured by using an uplink component carrier and a downlink component carrier. On the contrary, the secondary cell may be configured by using only a downlink component carrier.

A plurality of configured serving cells (plurality of configured cells) includes one primary cell and one or a plurality of secondary cells. The primary cell is a serving cell in which initial connection establishment procedure is performed, a serving cell in which connection reestablishment procedure is started, or a cell instructed as a primary cell in a handover procedure. The secondary cell may be configured at a point of time when or after RRC connection is established. A plurality of serving cells may be constituted by one base station apparatus 1, and a plurality of serving cells may be constituted by a plurality of base station apparatuses 1.

A frequency band in an uplink and a downlink (UL/DL operating band) and a duplex mode (TDD, FDD) are correlated with one index. The frequency band in an uplink and a downlink (UL/DL operating band) and the duplex mode are managed on one table. This index may be also referred to as an E-UTRA operating band, an E-UTRA band, or a band. For example, Index 1 may be also referred to as Band 1, Index 2 may be also referred to as Band 2, and Index n may be also referred to as Band n. For example, in Band 1, an uplink operating band is from 1920 MHz to 1980 MHz, a downlink operating band is from 2110 MHz to 2170 MHz, and the duplex mode is FDD. In Band 33, the uplink and downlink operating band is from 1900 MHz to 1920 MHz, and the duplex mode is TDD.

A combination (E-UTRA CA Band) of bands in which performing carrier aggregation is possible may be configured. For example, the carrier aggregation performed by using component carriers in Band 1 and Band 5 may be indicated to be possible. That is, it may be indicated whether or not the carrier aggregation is performed by using component carriers in bands different from each other.

A combination of a band supported by a terminal device 2, and a band in which performing the carrier aggregation is possible is configured in function information (UE capability, UE-EUTRA-Capability) of the terminal device 2. The base station apparatus 1 can recognize a function included in the terminal device 2 by the terminal device 2 transmitting the function information.

The present invention may be applied to some of a plurality of configured cells. A cell configured in the terminal device 2 may be also referred to as a serving cell.

TDD is a technology in which time division multiplexing is performed on an uplink signal and a downlink signal, and thus communication between an uplink and a downlink is allowed in a single frequency band (carrier frequency, component carrier). In LTE, configuration is performed in advance, and thus a downlink and an uplink may be switched in a subframe unit. In TDD, a subframe (downlink subframe, and subframe reserved for downlink transmission) in which downlink transmission is allowed, and a subframe (uplink subframe, and subframe reserved for uplink transmission) in which uplink transmission is allowed, and further a guard period (GP) are configured, and thus a subframe (special subframe) in which downlink transmission and uplink transmission can be switched in a time region (symbol region) is defined. In a special subframe, a time region (symbol corresponding to the time region) in which downlink transmission is allowed is referred to as a downlink pilot time slot (DwPTS), and a time region (symbol corresponding to the time region) in which uplink transmission is allowed is referred to as an uplink pilot time slot (UpPTS). For example, in a case where a subframe i is a downlink subframe in the terminal device 2, a downlink signal transmitted from the base station apparatus 1 can be received. In a case where a subframe j different from the subframe i is an uplink subframe, an uplink signal can be transmitted from the terminal device 2 to the base station apparatus 1. In a case where a subframe k which is different from the subframe i or the subframe j is a special subframe, a downlink signal can be received in a downlink time region DwPTS, and an uplink signal can be transmitted in an uplink time region UpPTS.

In order to perform communication by using the TDD scheme in LTE and LTE-A, notification is performed by using a specific information element (TDD UL/DL (UL-DL) configuration (TDD UL/DL configuration(s), TDD uplink-downlink configuration(s)), TDD configuration (TDD configuration(s), tdd-Config, TDD contig), and UL/DL (UL-DL) configuration (uplink-downlink configuration(s))). The terminal device 2 may consider a certain subframe as any one of an uplink subframe, a downlink subframe, and a special subframe, based on notified information, and may perform transmission and reception processing.

Regarding a constitution of a special subframe (DwPTS, UpPTS, and length of GP in the special subframe), a plurality of patterns is defined, and is managed in a manner of a table. The plurality of patterns is correlated with values (indices), and notification of the value corresponding to the pattern is performed, and thus the terminal device performs processing of the special subframe. That is, notification of information regarding constitution of the special subframe may be performed from the base station apparatus 1 to the terminal device 2.

A traffic adaptive control technology in which a ratio of an uplink resource and a downlink resource is changed in accordance with traffic of an uplink and traffic of a downlink (information quantity, data quantity, and communication volume) may be applied to TDD. For example, a ratio of a downlink subframe and an uplink subframe may be dynamically changed. Regarding a certain subframe, the downlink subframe and the uplink subframe may be adaptively switched. Such a subframe is referred to as a flexible subframe. The base station apparatus 1 can receive an uplink signal or transmit a downlink signal in a flexible subframe, in accordance with a condition (situation). The terminal device 2 may perform reception processing considering a flexible subframe as the downlink subframe, as long as the base station apparatus 1 does not perform an instruction of transmission of an uplink signal in the flexible subframe. Such TDD in which the ratio of the downlink subframe and the uplink subframe, subframes of the uplink and the downlink, or the TDD UL/DL (re)configuration is dynamically changed may be also referred to as dynamic TDD (DTDD) or enhanced interference mitigation and traffic adaptation (eIMTA). For example, TDD UL/DL configuration information may be transmitted through L1 signaling.

FDD is a technology in which communication between a downlink and an uplink is allowed different frequency bands (carrier frequencies, component carriers).

As the communication system, a cellular communication system in which a plurality of areas which are covered by the base station apparatus 1 and have a cell shape is disposed may be applied. A single base station apparatus 1 may manage a plurality of cells. A single base station apparatus 1 may manage a plurality of remote radio heads (RRHs). A single base station apparatus 1 may manage a plurality of local areas. A single base station apparatus 1 may manage a plurality of heterogeneous networks (HetNets). A single base station apparatus 1 may manage a plurality of low power base station apparatuses (LPN: Low Power Node).

In the communication system, the terminal device 2 measures reference signal received power (RSRP) based on a cell specific reference signal(s) (CRS).

In the communication system, communication may be performed by using carriers (component carriers) in which some of physical channels or signals defined in LTE are not mapped. Here, such a carrier is referred to as a new carrier type (NCT). For example, in the new carrier type, a cell specific reference signal, a physical downlink control channel, or a synchronization signal (primary synchronization signal, secondary synchronization signal) may be not mapped. In a cell in which the new carrier type is configured, application of a physical channel (PDCH: Physical Discovery Channel, NDS: New Discovery Signal(s), DRS: Discovery Reference Signal, and DS: Discovery Signal) for measuring mobility or detecting time/frequency synchronization is examined. The new carrier type may be also referred to as an additional carrier type (ACT). Regarding the NCT, a known carrier type may be also referred to as a legacy carrier type (LCT).

In the embodiment, "X/Y" includes a meaning of "X or Y". In the embodiment, "X/Y" includes a meaning of "X and Y". In the embodiment, "X/Y" includes a meaning of "X and/or Y".

(Physical Channel)

The main physical channel (or physical signal) used in LTE and LTE-A will be described. The channel means a medium used in transmission of a signal. The physical channel means a physical medium used in transmission of a signal. The physical channel may be added after now, or the structure or a format type thereof may be changed or added in LTE and LTE-A, and release of the subsequent standard. However, even when such a case occurs, the case does not influence the descriptions for the embodiment of the present invention.

In LTE and LTE-A, scheduling of the physical channel is managed by using a radio frame. One radio frame is 10 ms and one radio frame is constituted by 10 subframes. Further, one subframe is constituted by 2 slots (that is, one slot is 0.5 ms). The scheduling is managed by using a resource block as a smallest unit for the scheduling, to which the physical channel is allocated. The resource block is defined as a region which includes a constant frequency region in which a frequency axis is constituted by a set of a plurality of subcarriers (for example, 12 subcarriers), and a constant transmission time interval (for example, one slot, seven symbols).

In order to improve communication accuracy, a cyclic prefix (CP) allocated to a redundant portion of the physical channel is applied to the physical channel and is transmitted. The length of the CP causes the number of symbols allocated in one slot to be changed. For example, in a case of a normal CP, seven symbols may be allocated in one slot. In a case of an extended CP, six symbols may be allocated in one slot.

An interval between subcarriers is narrowed, and thus 24 subcarriers may be allocated in one resource block. Such a case may be applied to a specific physical channel.

The physical channel corresponds to a set of resource elements for transmitting information which is output from a higher layer. A physical signal is used in a physical layer, and does not transmit information which is output from a higher layer. That is, control information of a higher layer, such as a radio resource control (RRC) message or system information (SI) is transmitted on a physical channel.

As a downlink physical channel, there are a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), and an enhanced physical downlink control channel (EPDCCH). As a downlink physical signal, various reference signals and various synchronization signals are provided. As a downlink reference signal (DL-RS), there are a cell specific reference signal (CRS), an UE specific reference signal (UERS), and a channel state information reference signal (CSI-RS). As a synchronization signal, there are a primary synchronization signal (PSS), and a secondary synchronization signal (SSS).

As an uplink physical channel, there are a physical uplink shared channel (PUSCH), a physical uplink control channel (PUCCH), and a physical random access channel (PRACH). As an uplink physical signal, various reference signals are provided. As an uplink reference signal, there are a demodulation reference signal (DMRS) and a sounding reference signal (SRS).

The synchronization signal is constituted by three types of PSSs, and an SSS. The SSS is constituted by 31 types of codes which are arranged at different positions in a frequency domain. A physical layer cell identity (PCI: physical layer cell identity, physical cell identity, physical cell identifier) and a frame timing for radio synchronization are indicated by combining the PSS and the SSS. The physical layer cell identity is used for identifying the base station apparatus 1 like 504. The terminal device 2 specifies a cell identifier of the received synchronization signal, by cell searching. The cell identifier may be also referred to as a cell ID. The physical layer cell identity may be also referred to as a physical cell ID.

A physical broadcast channel (PBCH) is transmitted for the purpose of performing a notification of a control parameter (broadcast information or system information) which is commonly used in terminal devices 2 in a cell. Broadcast information (for example, SIB1 or portion of system information) of which notification on the PBCH is not performed is transmitted through a DL-SCH on a PDSCH. Notification of a cell global identifier (CGI), a tracking area identifier (TAI), random access configuration information (transmission timing timer and the like), common radio resource configuration information (shared radio resource configuration information), and the like as the broadcast information is performed. The cell global identifier (CGI) indicates an identifier specific to a cell. The tracking area identifier is for managing an area waiting by paging.

The downlink reference signal is classified into a plurality of types in accordance with the use thereof. For example, the cell specific reference signal (CRS) is a pilot signal transmitted with predetermined power for each cell, and is a downlink reference signal of which transmission is periodically repeated in the frequency domain and in the time domain, based on a predetermined rule. The terminal device 2 receives the cell specific reference signal, and thus measures reception quality for each cell. The terminal device 2 uses the cell specific reference signal as a reference signal for demodulating a physical downlink control channel or a physical downlink shared channel transmitted by an antenna port which is the same as that used for the cell specific reference signal. As a sequence used for the cell specific reference signal, a sequence which can be identified for each cell is used. The CRS may be transmitted in all downlink subframes by the base station apparatus 1. However, the terminal device 2 may receive the CRS only on a designated downlink subframe.

The downlink reference signal is also used in estimating propagation fluctuation in a downlink. Each of downlink reference signals used in estimating propagation fluctuation may be referred to as a channel state information reference signal (CSI-RS) or a CSI reference signal. A CSI reference signal which is not transmitted in practice or is transmitted with zero power may be referred to as a zero power channel state information reference signals (ZP CSI-RS) or a zero power CSI reference signal. A CSI reference signal which is transmitted in practice may be referred to as a non zero power channel state information reference signal (NZP CSI-RS) or a non zero power CSI reference signal.

Each of downlink resources used in measuring an interference component may be referred to as a channel state information-interference measurement resource (CSI-IMR) or a CSI-IM resource. The terminal device 2 may measure interference signal by using a zero power CSI reference signal included in a CSI-IM resource, so as to calculate a value of a CQI. A downlink reference signal which is configured dedicatedly for each terminal device 2 is referred to as an UE specific reference signal (UERS) or a dedicated reference signal, a downlink demodulation reference signal (DL DMRS), and the like. Such a downlink reference signal is used in demodulating the physical downlink control channel or the physical downlink shared channel.

A sequence for the downlink reference signals may be generated based on a pseudo-random sequence. The sequence for the downlink reference signals may be generated based on a Zadoff-Chu sequence. The sequence for the downlink reference signals may be generated based on a Gold sequence. The sequence for the downlink reference signals may be generated based on subspecies or modifications of the pseudo-random sequence, the Zadoff-Chu sequence, or the Gold sequence.

The physical downlink shared channel (PDSCH) is used for transmitting downlink data (DL-SCH). The PDSCH is also used in a case where system information is transmitted on the DL-SCH. Radio resource assignment information for the physical downlink shared channel is indicated by the physical downlink control channel. The PDSCH is also used in performing notification of a parameter (information element, RRC message) relating to a downlink and an uplink.

The physical downlink control channel (PDCCH) is transmitted by using some OFDM symbols from the leading of each subframe, and is used for instructing the terminal device 2 of resource assignment information or an adjusted quantity of an increase or a decrease of transmitted power in accordance with scheduling of the base station apparatus 1. It is necessary that the terminal device 2 monitors a physical downlink control channel thereof before a message of Layer 3 (paging, handover command, RRC message, and the like) is transmitted and received, and acquires resource assignment information from the physical downlink control channel. The resource assignment information is referred to as an uplink grant when transmission is performed, and is referred to as a downlink grant (also referred to as downlink assignment) when reception is performed. The physical downlink control channel may be constituted so as to be transmitted with the above-described OFDM symbols, and to be transmitted in a region of resource blocks which are dedicatedly allocated to the terminal device 2 from the base station apparatus 1. The physical downlink control channel transmitted in the region of the resource blocks which are dedicatedly allocated to the terminal device 2 from the base station apparatus 1 may be also referred to as an enhanced physical downlink control channel (EPDCCH: Enhanced PDCCH). The PDCCH transmitted with the above-described OFDM symbols may be also referred to as a first control channel. The EPDCCH may be also referred to as a second control channel. The resource region to which the PDCCH can be allocated may be also referred to as a first control channel region. The resource region to which the EPDCCH can be allocated may be also referred to as a second control channel region. A PDCCH which will be described later is assumed to basically include an EPDCCH.

The base station apparatus 1 may transmit a PCFICH, a PHICH, a PDCCH, an EPDCCH, a PDSCH, a synchronization signal (PSS/SSS), and a downlink reference signal in a DwPTS of a special subframe. The base station apparatus 1 may not transmit a PBCH in the DwPTS of the special subframe.

The terminal device 2 may transmit a PRACH and a SRS in an UpPTS of the special subframe. The terminal device 2 may not transmit a PUCCH, a PUSCH, and a DMRS in the UpPTS of the special subframe.

In a case where the special subframe is constituted only by a GP and an UpPTS, the terminal device 2 may transmit the PUCCH and/or the PUSCH and/or the DMRS in the UpPTS of the special subframe.

Here, the terminal device 2 monitors PDCCH candidates and/or EPDCCH candidates. Hereinafter, for simple descriptions, a PDCCH may include an EPDCCH. The PDCCH candidates indicate candidates having a probability of the base station apparatus 1 mapping and transmitting a PDCCH. Each of the PDCCH candidates is constituted from one or a plurality of control channel elements (CCEs). The monitoring may include a case where the terminal device 2 attempts to decode each of PDCCHs in a set of the PDCCH candidates, in accordance to all monitored DCI formats.

Here, the set of PDCCH candidates monitored by the terminal device 2 is also referred to as a search space. The search space means a set of resources having a probability of being used in transmitting the PDCCH by the base station apparatus 1. A common search space (CSS) and a terminal device specific search space (USS: UE-specific search space) are constituted (defined, configured) in a PDCCH region.

The CSS is used in transmitting downlink control information to a plurality of terminal devices 2. That is, the CSS is defined by a common resource for the plurality of terminal devices 2. The USS is used in transmitting the downlink control information to a certain specific terminal device 2. That is, the USS is dedicatedly configured for the certain specific terminal device 2. The USS may be configured so as to be duplicated in a plurality of terminal devices 2.

Downlink control information (DCI) is transmitted to the terminal device 2 from the base station apparatus 1 in a specific format (constitution, form). The format may be referred to as a DCI format. Transmission of the DCI format includes a case where DCI having a certain format is transmitted. The DCI format may be restated as a format for transmitting the DCI. As the DCI format transmitted to the terminal device 2 from the base station apparatus 1, a plurality of formats is prepared (for example, DCI format 0/1/1A/1B/1C/1D/2/2A/2B/2C/2D/3/3A/4). Fields (bit fields) corresponding to various types of downlink control information are set in the DCI format.

In a case where common DCI (single DCI) is transmitted to a plurality of terminal devices 2 in a certain DCI format, the base station apparatus 1 performs transmission in a PDCCH (or EPDCCH) CSS. In a case where DCI is dedicatedly transmitted to each of the terminal devices 2 in a certain DCI format, the base station apparatus 1 performs transmission in a PDCCH (or EPDCCH) USS.

As the DCI transmitted in the DCI format, there are resource assignment of a PUSCH or a PDSCH, modulation and coding scheme, a sounding reference signal request (SRS request), a channel state information request (CSI request), an instruction of first transmission or retransmission of a single transport block, a transmitted power control command for a PUSCH, a transmitted power control command for a PUCCH, cyclic shift of an UL DMRS, an index of an orthogonal code cover (OCC), and the like. In addition, various types of DCI are defined by a specification document.

A format used in uplink transmission control (for example, scheduling of a PUSCH, and the like) may be referred to as an uplink DCI format (for example, DCI format 0/4) or DCI associated with an uplink. The uplink transmission control may be referred to as an uplink grant. A format used in downlink reception control (for example, scheduling of a PDSCH, and the like) may be referred to as a downlink DCI format (for example, DCI format 1/1A/1B/1C/1D/2/2A/2B/2C/2D), or DCI associated with a downlink. The downlink reception control may be referred to as a downlink grant, downlink assignment, or downlink allocation. A format used for adjusting transmitted power of each of a plurality of terminal devices 2 may be referred to as a group triggering DCI format (for example, DCI format 3/3A).

For example, DCI format 0 is used for transmitting information regarding resource assignment of a PUSCH, which is required for performing scheduling of one PUSCH in one serving cell, or information regarding a modulation scheme, information regarding a transmitted power control (TPC) command for the PUSCH, and the like. The DCI is transmitted on a PDCCH/EPDCCH. It is stated that the DCI format is constituted by at least one piece of DCI.

The terminal device 2 monitors PDCCHs in a CSS and/or a USS of a PDCCH region, and detects a PDCCH of the terminal device 2.

An RNTI allocated to the terminal device 2 by the base station apparatus 1 is used in transmitting downlink control information (transmission on the PDCCH). Specifically, a cyclic redundancy check (CRC) parity bit is added to a DCI format (which may be downlink control information), and after addition is performed, the CRC parity bit is scrambled by using the RNTI.

The terminal device 2 attempts to decode a DCI format to which the CRC parity bit scrambled by using the RNTI is added, and detects a DCI format of which the CRC is determined to succeed, as the DCI format of the terminal device 2 (such a process is also referred to blind decoding). That is, the terminal device 2 attempts to decode a PDCCH in accordance with the CRC scrambled by using the RNTI, and detects a PDCCH of which the CRC is determined to succeed, as the PDCCH of the terminal device 2.

Here, the RNTI includes a cell-radio network temporary identifier (C-RNTI). The C-RNTI is a unique identifier used for RRC connection and identification of scheduling. The C-RNTI is used for uni-cast transmission which is dynamically scheduled.

The RNTI includes a Temporary C-RNTI. The Temporary C-RNTI is an identifier used for a random access procedure. For example, the terminal device 2 may decode the DCI format (for example, DCI format 0) to which the CRC scrambled by using the Temporary C-RNTI is added and which is associated with an uplink, only in the CSS. The terminal device 2 may attempt to decode the DCI format (for example, DCI format 1A) to which the CRC scrambled by using the Temporary C-RNTI is added and which is associated with a downlink, in the CSS and the USS.

In a case where the DCI is transmitted in the CSS, the base station apparatus 1 adds a CRC parity bit scrambled by using the Temporary C-RNTI or the C-RNTI, to the DCI (DCI format). In a case where the DCI is transmitted in the USS, the base station apparatus 1 may add CRC scrambled by using the C-RNTI, to the DCI (DCI format).

A physical uplink shared channel (PUSCH) is mainly used for transmitting uplink data and uplink control information (UCI). The UCI transmitted on a PUSCH includes channel state information (CSI), and/or ACK/NACK. The CSI transmitted on a PUSCH includes aperiodic CSI (A-CSI) and periodic CSI (P-CSI). Similarly to a case of the downlink, resource assignment information of the physical uplink shared channel is indicated by a physical downlink control channel. The PUSCH scheduled by a dynamic scheduling grant transmits the uplink data. The PUSCH scheduled by a random access response grant transmits information (for example, identification information of the terminal device 2, and Message 3) of the base station apparatus 1, which is associated to random access. Parameters used for setting transmitted power for transmission on the PUSCH may be different in accordance with the type of the detected grant. Control data is transmitted in a form of channel quality information (CQI and/or PMI), HARQ response information (HARQ-ACK, HARQ-ACK response), and RI. That is, the control data is transmitted in a form of uplink control information.

A physical uplink control channel (PUCCH) is used for notification of reception acknowledgement response (ACK/NACK: Acknowledgement/Negative Acknowledgement) of downlink data transmitted on a physical downlink shared channel, or notification of channel information (channel state information) of a downlink, and is used for performing a scheduling request (SR) which is a resource assignment request (radio resource request) of an uplink. Channel state information (CSI) includes a channel quality indicator (CQI), a precoding matrix indicator (PMI), a precoding type indicator (PTI), and a rank indicator (RI). Each of the indicators may be described as indication, but the use and the meaning thereof is the same. A format of the PUCCH may be switched in accordance with the transmitted UCI. For example, in a case where the UCI is constituted from HARQ response information and/or SR, the UCI may be transmitted on a PUCCH of a format 1/1a/1b/3 (PUCCH format 1/1a/1b/3). In a case where the UCI is constituted from the CSI, the UCI may be transmitted on a PUCCH of a format 2/2a/2b (PUCCH format 2/2a/2b). In order to avoid collision with a SRS, a shortened format obtained by performing puncturing by one symbol, and a normal format obtained by not performing puncturing by one symbol are provided in the PUCCH format 1/1a/1b. For example, in a case where simultaneous transmission of a PUCCH and a SRS in the same subframe is available, the PUCCH format 1/1a/1b in a SRS subframe is transmitted in the shortened format. In a case where simultaneous transmission of a PUCCH and a SRS in the same subframe is not available, the PUCCH format 1/1a/1b in a SRS subframe is transmitted in the normal format. At this time, even when transmission of the SRS occurs, the SRS may not be transmitted.

As a CSI report (CSI report), a periodic CSI report and an aperiodic CSI report are provided. The periodic CSI report is for periodically reporting channel state information or for reporting channel state information in a case where an event condition for triggering a CSI report is satisfied. The aperiodic CSI report is for reporting the channel state information in response to a CSI request included in the DCI format, in a case where the CSI report is requested. The periodic CSI report is performed on a PUCCH or a PUSCH. The aperiodic CSI report is performed on a PUSCH. In a case where an instruction is performed based on information (CSI request) included in the DCI format, the terminal device 2 may transmit CSI which is not followed by uplink data, on the PUSCH.

An uplink reference signal (UL-RS) includes a demodulation reference signal (DMRS) and a sounding reference signal (SRS). The demodulation reference signal is used for the base station apparatus 1 demodulating a physical uplink control channel PUCCH and/or a physical uplink shared channel PUSCH. The sounding reference signal is used for the base station apparatus 1 mainly estimating a channel state of an uplink. As the sounding reference signal, a periodic sounding reference signal (P-SRS) and an aperiodic sounding reference signal (A-SRS) are provided. The periodic sounding reference signal is configured so as to perform periodic transmission by a higher layer. Transmission of the aperiodic sounding reference signal is required by a SRS request included in the downlink control information format. The uplink reference signal may be also referred to as an uplink pilot signal or an uplink pilot channel.

A sequence for the uplink reference signals may be generated based on a pseudo-random sequence. The sequence for the uplink reference signals may be generated based on a Zadoff-Chu sequence. The sequence for the uplink reference signals may be generated based on a Gold sequence. The sequence for the uplink reference signals may be generated based on subspecies or modifications of the pseudo-random sequence, the Zadoff-Chu sequence, or the Gold sequence.

The periodic sounding reference signal may be also referred to as a periodic sounding reference signal and a Trigger Type 0 sounding reference signal (Trigger Type 0 SRS). The aperiodic sounding reference signal may be also referred to as an aperiodic sounding reference signal and a Trigger Type 1 sounding reference signal (Trigger Type 1 SRS).

The A-SRS may be classified into a signal specialized for estimating a channel of an uplink (for example, which may be also referred to as a Trigger Type 1aSRS), and a signal used for causing the base station apparatus 1 to measure a channel state (CSI, CQI, PMI, and RI) by using channel reciprocity in TDD (for example, which may be also referred to as a Trigger Type 1bSRS) in coordinated communication. The DMRS is configured corresponding to each of the PUSCH and the PUCCH. The DMRS is time-multiplexed in the same subframe as that of the PUSCH or the PUCCH, and is transmitted.

The time multiplexing method of the DMRS may be different in a case of the DMRS for the PUSCH and in a case of the DMRS for the PUCCH. For example, regarding the DMRS for the PUSCH, only one symbol is allocated in one slot which is constituted by seven symbols. On the contrary, regarding the DMRS for the PUCCH, three symbols are allocated in one slot which is constituted by seven symbols.

Regarding the SRS, notification of various parameters (such as a bandwidth, a cyclic shift, and a transmission subframe) is performed by higher layer signaling. Regarding the SRS, a subframe for transmitting the SRS is determined based on information regarding a transmission subframe which is included in a configuration of the SRS and of which notification is performed by the higher layer signaling. As the information regarding the transmission subframe, information (shared information) configured so as to be specific to a cell, and information (dedicated information, individual information) configured so as to be specific to a terminal device are provided. The information configured so as to be specific to a cell includes information indicating a subframe in which the SRS shared by all terminal devices 2 in the cell is transmitted. The information configured so as to be specific to a terminal device includes information indicating periodicity and a subframe offset which functions as a subset of the subframe configured so as to be specific to the cell. The terminal device 2 may determine a subframe (which may be also referred to as a SRS subframe and a SRS transmission subframe) for transmitting the SRS, by using the pieces of information. When the terminal device 2 transmits a PUSCH in a subframe in which the SRS configured so as to be specific to a cell is transmitted, the terminal device 2 may puncture a time resource of the PUSCH by symbols for transmitting the SRS, and may transmit the PUSCH by using the punctured time resource. Thus, it is possible to avoid collision of transmission of the PUSCH with transmission of the SRS between terminal devices 2. It is possible to prevent deterioration of characteristics of the terminal device 2 which transmits the PUSCH. It is possible to ensure channel estimation accuracy in the terminal device 2 which transmits the SRS. Here, the information configured so as to be specific to a terminal device may be independently configured as the P-SRS and the A-SRS.

For example, in a case where the various parameters are configured by the higher layer signaling, a first uplink reference signal is periodically transmitted based on the configured transmission subframe. In a case where an instruction of a transmission request is performed by using a field (SRS request) regarding a transmission request of a second uplink reference signal included in the downlink control information format, the second uplink reference signal is aperiodically transmitted. In a case where a SRS request included in certain downlink control information format indicates being positive or indicates an index (value) corresponding to being positive, the terminal device 2 transmits an A-SRS in a predetermined transmission subframe. In a case where the detected SRS request indicates being negative or indicates an index (value) corresponding to being negative, the terminal device 2 does not transmit in a predetermined subframe. Notification of the information (shared parameter, shared information) configured so as to be specific to a cell is performed by using system information or a dedicated control channel (DCCH). Notification of the information (dedicated parameter, individual parameter, dedicated information, and individual information) configured so as to be specific to a terminal device is performed by using a common control channel (CCCH). Notification of the pieces of information may be performed by using a RRC message. Notification of the RRC message may be performed by a higher layer.

A physical random access channel (PRACH) is a channel used for notification of a preamble sequence. The physical random access channel has a guard time. The preamble sequence is constituted such that 64 types of sequences are prepared so as to express 6-bit information. The physical random access channel is used as an access unit of the terminal device 2 to the base station apparatus 1. The terminal device 2 uses the physical random access channel in order to transmit a radio resource request when the physical uplink control channel is not configured, in response to a scheduling request (SR), or in order to request transmission timing adjustment information (which is also referred to timing advance (TA)) to the base station apparatus 1. The transmission timing adjustment information is needed for causing an uplink transmission timing to match with a reception timing window of the base station apparatus.

Specifically, the terminal device 2 transmits a preamble sequence by using a radio resource for the physical random access channel, which is configured by the base station apparatus 1. The terminal device 2 which receives the transmission timing adjustment information configures a transmission timing timer. The transmission timing timer tracks an effective time of the transmission timing adjustment information which is commonly configured by broadcast information (or which is individually configured by the layer 3 message). The terminal device 2 manages a state of the uplink in a manner that a state is set as a transmission timing adjusted state during the effective time of the transmission timing timer (during tracking), and the state is set as a transmission timing non-adjusted state during a period which is out of the effective period (during stopping). The layer 3 message is a message of a control-plane (C-plane), which is transmitted and received in a radio resource control (RRC) layer between the terminal device 2 and the base station apparatus 1. The layer 3 message is used as having the same meaning as RRC signaling or a RRC message. The RRC signaling may be also referred to higher layer signaling or dedicated signaling.

The random access procedure includes two random access procedures of a contention based random access procedure and a non-contention based random access procedure. The contention based random access procedure is a random access having a probability of collision occurring between a plurality of terminal devices 2.

The non-contention based random access procedure is a random access in which collision does not occur between the plurality of terminal devices 2.

The non-contention based random access procedure is formed from three steps. The terminal device 2 is notified of random access preamble assignment from the base station apparatus 1 by dedicated signaling of the downlink. At this time, in the random access preamble assignment, the base station apparatus 1 assigns a non-contention random access preamble to the terminal device 2. The random access preamble assignment is transmitted for handover by a source base station apparatus (Source eNB). The random access preamble assignment is subjected to signaling by a handover command which is by a target base station apparatus (Target eNB), or is subjected to signaling by a PDCCH in a case of downlink data arrival.

The terminal device 2 which receives the random access preamble assignment transmits a random access preamble (Message 1) on a RACH in an uplink. At this time, the terminal device 2 transmits the assigned non-contention random access preamble.

The base station apparatus 1 which receives the random access preamble transmits a random access response in the downlink data (DL-SCH: Downlink Shared Channel) to the terminal device 2. Information transmitted in the random access response includes a first uplink grant (random access response grant) and timing alignment information for handover, and timing alignment information and a random access preamble identifier for downlink data arrival. The downlink data may be also referred to downlink shared channel data (DL-SCH data).

Here, the non-contention based random access procedure is applied to handover, downlink data arrival, and positioning. The contention based random access procedure is applied to an initial access from RRC_IDLE, reestablishment of RRC connection, handover, downlink data arrival, and uplink data arrival.

The random access procedure according to the embodiment is the contention based random access procedure. An example of the contention based random access procedure will be described.

The terminal device 2 acquires System information block type 2 (SIB2) transmitted by the base station apparatus 1. The SIB2 corresponds to a common configuration (common information) for all terminal devices 2 (or a plurality of terminal devices 2) in a cell. For example, the common configuration includes a configuration of the PRACH.

The terminal device 2 randomly selects the number of the random access preamble. The terminal device 2 transmits a random access preamble (Message 1) of the selected number to the base station apparatus 1 by using the PRACH. The base station apparatus 1 estimates a transmission timing of the uplink by using the random access preamble.

The base station apparatus 1 transmits a random access response (Message 2) by using the PDSCH. The random access response includes plural pieces of information for the random access preamble detected by the base station apparatus 1. For example, the plural pieces of information include the number of the random access preamble, a Temporary C-RNTI, a timing advance command (TA command), and a random access response grant.

The terminal device 2 transmits (initially transmits) uplink data (Message 3) on the PUSCH scheduled by using the random access response grant. The uplink data includes an identifier (InitialUE-Identity or information indicating a C-RNTI) for identifying the terminal device 2.

In a case where decoding of uplink data fails, the base station apparatus 1 performs an instruction of retransmission of the uplink data by using a DCI format to which a CRC parity bit scrambled by using the Temporary C-RNTI is added. In a case where the instruction of retransmission of the uplink data is received by the DCI format, the terminal device 2 retransmits the same uplink data on a PUSCH scheduled by using the DCI format to which the CRC parity bit scrambled by using the Temporary C-RNTI is added.

In a case where decoding of uplink data fails, the base station apparatus 1 may perform an instruction of retransmission of the uplink data by using a PHICH (NACK). In a case where the instruction of retransmission of the uplink data is received by using the NACK, the terminal device 2 retransmits the same uplink data on the PUSCH.

The base station apparatus 1 succeeds decoding of the uplink data, and thus acquires the uplink data. Thus, it is possible to recognize which terminal device 2 transmits the random access preamble and the uplink data. That is, before decoding of the uplink data is determined to succeed, the base station apparatus 1 recognizing which terminal device 2 transmits the random access preamble and the uplink data is not possible.

In a case where Message 3 including InitialUE-Identity is received, the base station apparatus 1 transmits a contention resolution identity (Message 4) generated based on the received InitialUE-Identity, to the terminal device 2 by using the PDSCH. In a case where the received contention resolution identity matches with the transmitted InitialUE-Identity, the terminal device 2 (1) considers that contention resolution of the random access preamble succeeds, (2) sets the value of the Temporary C-RNTI in the C-RNTI, (3) discards the Temporary C-RNTI, and (4) considers that the random access procedure is correctly completed.

In the base station apparatus 1 receives Message 3 including information which indicates the C-RNTI, the base station apparatus 1 transmits a DCI format (Message 4) to which a CRC parity bit scrambled by using the received C-RNTI is added, to the terminal device 2. In a case where the terminal device 2 decodes the DCI format to which the CRC parity bit scrambled by using the received C-RNTI is added, the terminal device 2 (1) considers that contention resolution of the random access preamble succeeds, (2) discards the Temporary C-RNTI, and (3) considers that the random access procedure is correctly completed.

That is, the base station apparatus 1 performs scheduling of a PUSCH by using the random access response grant as a part of the contention based random access procedure.

The terminal device 2 transmits the uplink data (Message 3) on the PUSCH scheduled by using the random access response grant. That is, the terminal device 2 performs transmission on a PUSCH corresponding to the random access response grant, as a part of the contention based random access procedure.

The base station apparatus 1 performs scheduling of a PUSCH by using the DCI format to which a CRC scrambled by using the Temporary C-RNTI is added, as a part of the contention based random access procedure. The base station apparatus 1 performs scheduling/instruction of transmission on the PUSCH by using a PHICH (NACK), as a part of the contention based random access procedure.

The terminal device 2 transmits (retransmits) the uplink data (Message 3) on the PUSCH scheduled by using the DCI format to which a CRC scrambled by using the Temporary C-RNTI is added. The terminal device 2 transmits (retransmits) the uplink data (Message 3) on the scheduled PUSCH, in response to reception of the PHICH. That is, the terminal device 2 performs transmission on the PUSCH corresponding to the retransmission of the same uplink data (transport block), as a part of the contention based random access procedure.

A logical channel will be described below. The logical channel is used for transmitting a RRC message or an information element. The logical channel is transmitted on a physical channel through a transport channel.

A broadcast control channel (BCCH) is a logical channel used for broadcasting system control information. For example, system information or information needed for an initial access is transmitted by using the broadcast control channel. A master information block (MIB) or System Information Block Type 1 (SIB1) is transmitted by using this logical channel.

A common control channel (CCCH) is a logical channel used for transmitting control information between a network, a terminal device which does not have RRC connection, and a network. For example, terminal-specific control information or configuration information is transmitted by using this logical channel.

A dedicated control channel (DCCH) is a logical channel used for transmitting dedicated control information (individual control information) between a terminal device 2 having RRC connection, and a network in a bi-directional manner. For example, cell-specific reconfiguration information is transmitted by using this logical channel.

Signaling using a CCCH or a DCCH may be generically referred to RRC signaling.

Information regarding uplink power control includes information of which notification as broadcast information is performed, information of which notification as information (shared information) shared between terminal devices 2 in the same cell is performed, and information of which notification as terminal device-specific dedicated information is performed. The terminal device 2 sets transmitted power based on only the information of which notification as broadcast information is performed, or based on the information of which notification as the broadcast information/shared information is performed, and the information of which notification as dedicated information is performed.

Notification of radio resource control configuration shared information as the broadcast information (or the system information) may be performed. Notification of the radio resource control configuration shared information as dedicated information (mobility control information) may be performed.

A radio resource configuration includes a random access channel (RACH) configuration, a broadcast control channel (BCCH) configuration, a paging control channel (PCCH) configuration, a physical random access channel (PRACH) configuration, a physical downlink shared channel (PDSCH) configuration, a physical uplink shared channel (PUSCH) configuration, a physical uplink control channel (PUCCH) configuration, a sounding reference signal (SRS) configuration, a configuration relating to the uplink power control, a configuration relating to an uplink cyclic prefix length, and the like. That is, the radio resource configuration is configured so as to perform notification of a parameter used for generating a physical channel/physical signal. Parameters (information elements) of which notification is performed may be different in a case where notification as the broadcast information is performed, and in a case where notification as reconfiguration information is performed.

An information element needed for configuring the parameter relating to various physical channels/physical signals (PRACH, PUCCH, PUSCH, SRS, UL DMRS, CRS, CSI-RS, PDCCH, PDSCH, PSS/SSS, UERS, PBCH, PMCH, and the like) is constituted by shared configuration information and dedicated configuration information. The shared configuration information is information shared between terminal devices 2 in the same cell. The dedicated configuration information is configured for each of the terminal devices 2. The shared configuration information may be transmitted in the system information. In a case where reconfiguration is performed, the shared configuration information may be transmitted as the dedicated information. The configurations include a configuration of a parameter. The configuration of a parameter includes a configuration of a value of the parameter. In a case where the parameter is managed in a manner of a table, the configuration of a parameter includes a configuration of the value of an index.

Information regarding the parameter of the physical channel is transmitted to the terminal device 2 by using a RRC message. That is, the terminal device 2 configures resource assignment or transmitted power for each physical channel, based on the received RRC message. As the RRC message, there are a message relating to a broadcast channel, a message relating to a multicast channel, a message relating to a paging channel, a message relating to each of channels of a downlink, a message relating to each of channels of an uplink, and the like. Each of the RRC messages may include an information element (IE). The information element may include information corresponding to a parameter. The RRC message may be also referred to as a message. A message class is a set of one or more message. The message may include the information element. As the information element, there are an information element relating to radio resource control, an information element relating to security control, an information element relating to mobility control, an information element relating to measurement, an information element relating to a multimedia broadcast multicast service (MBMS), and the like. The information element may include a lower information element. The information element may be configured as the parameter. The information element may be defined as control information which indicates one or more parameters.

The information element (IE) is used for defining (designating, configuring) parameters for the system information (SI) or various types of channels/signals/information in dedicated signaling. A certain information element includes one or more fields. The information element may be configured by one or more information elements. A field included in the information element may be also referred to as a parameter. That is, the information element may include one or more types of parameters (one or more parameters). The terminal device 2 performs radio resource assignment control, uplink power control, transmission control, and the like, based on various parameters. The system information may be defined as the information element.

An information element may be configured in a field constituting an information element. A parameter may be configured in a field constituting an information element.

The RRC message includes one or more information elements. A RRC message in which a plurality of RRC messages is set is referred to as a message class.

As parameters which are related to uplink transmitted power control, and of which the terminal device 2 is notified by using the system information, there are standard power for a PUSCH, standard power for a PUCCH, a channel loss compensation coefficient α, a list of power offsets obtained by being configured for each PUCCH format, and a power offset of a preamble and Message 3. As parameters which are related to the random access channel, and of which the terminal device 2 is notified by using the system information, there are a parameter relating to the preamble, a parameter relating to transmitted power control of the random access channel, and a parameter relating to transmission control of a random access preamble. The parameters are used at a time of the initial access, or at a time of reconnection/reestablishment after radio link failure (RLF) occurs.

The terminal device 2 may be notified of information used for configuring the transmitted power, as the broadcast information. The terminal device 2 may be notified of information for configuring transmitted power, as the shared information. The terminal device 2 may be notified of information for configuring transmitted power, as the dedicated information (individual information).

(First Embodiment)

A first embodiment of the present invention will be described below. In the first embodiment, a communication system includes a primary base station apparatus as the base station apparatus 1. The base station apparatus 1 is also referred below to an access point, a point, a transmission point, a reception point, a cell, a serving cell, a transmission apparatus, a reception apparatus, a transmission station, a reception station, a transmit antenna group, a transmit antenna port group, a receive antenna group, a receive antenna port group, a communication apparatus, a communication terminal, and eNodeB. The primary base station apparatus is also referred below to a macro base station apparatus, a first base station apparatus, a first communication apparatus, a serving base station apparatus, an anchor base station apparatus, a master base station apparatus, a first access point, a first point, a first transmission point, a first reception point, a macro cell, a first cell, a primary cell, a master cell, a master small cell. The primary cell and the master cell (master small cell) may be independently constituted. In the first embodiment, the communication system may include a secondary base station apparatus. The secondary base station apparatus is also referred below to a remote radio head (RRH), a remote antenna, an overhang antenna, a distributed antenna, a second access point, a second point, a second transmission point, a second reception point, a reference node, a low power base station apparatus (LPN: Low Power Node), a micro base station apparatus, a pico base station apparatus, a femto base station apparatus, a small base station apparatus, a local area base station apparatus, a phantom base station apparatus, a home (indoor) base station apparatus (Home eNodeB, Home NodeB, HeNB, HNB), a second base station apparatus, a second communication apparatus, a coordinated base station apparatus group, a coordinated base station apparatus set, a coordinated base station apparatus, a micro cell, a pico cell, a femto cell, a small cell, a phantom cell, a local area, a second cell, and a secondary cell. The communication system according to the first embodiment may include a terminal device 2. The terminal device 2 is also referred below to a mobile station, a mobile station apparatus, a mobile terminal, a reception apparatus, a transmission apparatus, a reception terminal, a transmission terminal, a third communication apparatus, a receive antenna group, a receive antenna port group, a transmit antenna group, a transmit antenna port group, a user device, and a user terminal (UE: User Equipment). Here, the secondary base station apparatus may be illustrated as a plurality of secondary base station apparatuses. For example, the primary base station apparatus and the secondary base station apparatus may communicate with a terminal device by using heterogeneous network arrangement, in such a manner that a portion or the entirety of coverage of the secondary base station apparatus is included in coverage of the primary base station apparatus.

The communication system according to the first embodiment is configured by the base station apparatus 1 and the terminal device 2. The single base station apparatus 1 may manage one or more terminal devices 2. The single base station apparatus 1 may manage one or more cells (serving cell, primary cell, secondary cell, femto cell, pico cell, small cell, phantom cell). The single base station apparatus 1 may manage one or more frequency bands (component carriers, carrier frequencies). The single base station apparatus 1 may manage one or more low power base station apparatuses (LPN: Low Power Nodes). The single base station apparatus 1 may manage one or more home (indoor) base station apparatuses (HeNB: Home eNodeBs). The single base station apparatus 1 may manage one or more access points. Base station apparatuses 1 may be connected to each other in a wired (optical fiber, copper wire, coaxial cable, and the like) or wireless (X2 interface, X3 interface, Xn interface, and the like) manner. That is, a plurality of base station apparatuses 1 may communicate with each other at a high speed (without delay) by using an optical fiber (Ideal backhaul), or may communicate with each other at a low speed through the X2 interface (Non ideal backhaul). At this time, communication of various types of information of the terminal device 2 (configuration information or channel state information (CSI), function information (UE capability) of the terminal device 2, information for handover, and the like) may be performed. The plurality of base station apparatuses 1 may be managed on a network. The single base station apparatus 1 may manage one or more relay station apparatus (Relay).

The communication system according to the first embodiment may realize coordinated communication (CoMP: Coordination Multiple Points) using a plurality of base station apparatuses, low power base station apparatuses, or home base station apparatuses. That is, the communication system according to the first embodiment may perform dynamic point selection (DPS) in which a point (transmission point and/or reception point) which communicates with the terminal device 2 is dynamically switched. The communication system according to the first embodiment may perform coordinated scheduling (CS) or coordinated beamforming (CB). The communication system according to the first embodiment may perform joint transmission (JT) or joint reception (JR).

A plurality of low power base station apparatuses or small cells which are disposed so as to be close to each other may be clustered (grouped). The plurality of clustered low power base station apparatuses may perform notification of the same configuration information. An area (coverage) of the clustered small cells may be also referred to as a local area.

In downlink transmission, the base station apparatus 1 may be also referred to as a transmission point (TP). In uplink transmission, the base station apparatus 1 may be also referred to as a reception point (RP). The downlink transmission point and the uplink reception point may function as a pathloss reference point (reference point) for measuring downlink pathloss. The reference point for measuring pathloss may be configured independently from the transmission point and the reception point.

The small cell, the phantom cell, or the local area cell may be configured as a third cell. The small cell, the phantom cell, or the local area cell may be reconfigured as the primary cell. The small cell, the phantom cell, or the local area cell may be reconfigured as the secondary cell. The small cell, the phantom cell, or the local area cell may be reconfigured as the serving cell. The small cell, the phantom cell, or the local area cell may be included in the serving cell.

The base station apparatus 1 allowed to constitute the small cell may perform discrete reception (DRX) or discrete transmission (DTX), if necessary. The base station apparatus 1 allowed to constitute the small cell may cause power of some apparatuses (for example, transmission unit or reception unit) to intermittently or quasi-stationary turn ON/OFF.

Independent identifiers (IDs: Identities) may be configured for base station apparatuses 1 constituting a macro cell and base station apparatuses 1 constituting a small cell. That is, identifiers of the macro cell and the small cell may be independently configured. For example, in a case where cell specific reference signals (CRSs) are transmitted from the macro cell and the small cell, even when transmission frequencies are the same as each other, and radio resources are the same as each other, scrambling may be performed by using different identifiers. The cell specific reference signal for the macro cell may be scrambled by using a physical layer cell ID (PCI: Physical layer Cell Identity). The cell specific reference signal for the small cell may be scrambled by using a virtual cell ID (VCI: Virtual Cell Identity). Scrambling may be performed in the macro cell by using the physical layer cell ID (PCI: Physical layer Cell Identity), and scrambling may be performed in the small cell by using a global cell ID (GCI: Global Cell Identity). Scrambling may be performed in the macro cell by using a first physical layer cell ID, and scrambling may be performed in the small cell by using a second physical layer cell ID. Scrambling may be performed in the macro cell by using a first virtual cell ID, and scrambling may be performed in the small cell by using a second virtual cell ID. Here, the virtual cell ID may be an ID configured in a physical channel/physical signal. The virtual cell ID may be an ID which is configured independently from the physical layer cell ID. The virtual cell ID may be an ID used in scrambling a sequence used in the physical channel/physical signal.

Some of physical channels/physical signals may not be transmitted in a small cell, or a serving cell configured as the small cell, or a component carrier corresponding to the small cell. For example, a cell specific reference signal (CRS) or a physical downlink control channel (PDCCH) may be not transmitted. A new physical channel/physical signal may be transmitted in the small cell, or the serving cell configured as the small cell, or the component carrier component carrier corresponding to the small cell.

A constitution of one or a plurality of HARQ-ACK feedback bits $\{o^{ACK}_{c,0}, o^{ACK}_{c,1}, \ldots, o^{ACK}_{c,OACKc-1}\}$ will be described below.

A HARQ-ACK bit is received from a higher layer in each subframe of each cell. Each positive response (ACK) is encoded so as to have a bit value of '1'. Each negative response (NACK) is encoded so as to have a bit value of '0'. In a case where a PUCCH format 3 in the higher layer is used for transmitting the configured HARQ-ACK feedback information, HARQ-ACK feedback is constituted by interconnection of HARQ-ACK bits in each serving cell. In a cell in which Transmission mode 1, 2, 5, 6, or 7 such as one code word transmission mode is configured, 1-bit HARQ-ACK information $a_k$ is used in the cell. In a cell in which other transmission modes, that is, two or more code word transmission mode are configured, 2-bit HARQ-ACK information $a_k$, $a_{k+1}$ is used in the cell. Here, $a_k$ corresponds to code word 0, and $a_{k+1}$ corresponds to code word 1.

Regarding the HARQ-ACK feedback bit $\{o^{ACK}_{c,0}, o^{ACK}_{c,1}, \ldots, o^{ACK}_{c,OACKc-1}\}$, an region is individually configured by a serving cell c.

HARQ-ACK feedback bits of serving cells c are arranged so as to be a bit string of HARQ-ACK feedback bit, which is aggregated in all serving cells before coding is performed. The HARQ-ACK feedback bits aggregated in all of the serving cells are assigned in an order from a small index of the serving cell. A plurality of HARQ-ACK feedback bits for each of the serving cells is assigned in an order from a small value of the DAI included in the received downlink grant.

A HARQ process will be described.

Re-transmission processing of a PDSCH corresponds to asynchronous HARQ. A retransmission timing of the downlink subframe and a transmission timing of the PDSCH are independently configured. Thus, a HARQ process number is used for associating a PDSCH which is transmitted firstly, with a PDSCH which is retransmitted. The base station apparatus 1 notifies the terminal device 2 of the HARQ process number by using the DCI which is included in the PDCCH and indicates the retransmitted PDSCH. The terminal device 2 performs HARQ combining of a PDSCH which is stored in a buffer and is associated with the HARQ process number, and the retransmitted PDSCH, from the HARQ process number included in the DCI. As the HARQ combining, chase combining (CC), an incremental redundancy (IR) method, or the like is used. The maximum number of downlink HARQ processes is 8 in FDD, and 15 in TDD. A bit field of the DCI for notification of the HARQ process number is configured in accordance with the maximum number of the downlink HARQ processes, so as to be 3 bits in an FDD cell, and is 4 bits in a TDD cell.

Processing or a configuration relating to a PUCCH resource of HARQ response information will be described below. The HARQ response information includes response information for PDSCH transmission, which is shown by detection of the control channel, and response information for the control channel, which includes control information indicating a release (end) of the semi-persistent scheduling (SPS). The HARQ response information corresponds to ACK indicating a normal reception, NACK indicating that normal reception is not possible, and/or DTX indicating that transmission is not performed (reception is not performed).

The terminal device 2 transmits the HARQ response information to the base station apparatus 1 through the PUCCH and/or PUSCH. The base station apparatus 1 receives the HARQ response information from the terminal device 2 through the PUCCH and/or PUSCH. Thus, the base station apparatus 1 recognizes whether or not the terminal device 2 enables correct reception of the PDSCH or the control channel.

Next, descriptions regarding the PUCCH resource configured in the base station apparatus 1 will be described. The HARQ response information is spread in a SC-FDMA sample region, by using pseudo constant-amplitude zero-autocorrelation (CAZAC) sequence which is cyclically shifted. The HARQ response information is spread into 4 SC-FDMA symbols in a slot, by using an orthogonal cover code (OCC) which has a code length of 4. Symbols spread by two codes are mapped on two RBs having different frequency. In this manner, the PUCCH resource is defined by three elements of the cyclic shift quantity, an orthogonal code, and/or the mapped RB. The cyclic shift in the SC-FDMA sample region may be expressed by phase rotation which is equally increased in the frequency domain.

An uplink control channel region (PUCCH region) used in transmission of the PUCCH is RB pairs of a predetermined number, and is constituted by using RB pairs at both ends of an uplink system bandwidth. A physical resource used in transmission of the PUCCH is constituted from two RBs having different frequencies in a first slot and in a second slot. The physical resource used in transmission of the PUCCH is indicated by m (m=0, 1, 2, . . . ). One PUCCH is allocated to any physical resource used in transmission of the PUCCH. Thus, since one PUCCH is transmitted by using resources having different frequency, a frequency diversity effect is obtained.

The PUCCH resource (uplink control channel logical resource) which is a resource used for transmitting a PUCCH is defined by using an orthogonal code, a cyclic shift quantity, and/or a frequency resource. For example, a PUCCH resource in a case where three orthogonal codes of OC0, OC1, and OC2, six cyclic shift quantities of CS0, CS2, CS4, CS6, CS8, and CS10, and m indicating the frequency resource are assumed as elements constituting the PUCCH resource may be used. A combination of orthogonal codes, cyclic shift quantities, and m which correspond to an nPUCCH which is an index indicating the PUCCH resource (uplink control channel logical resource) is defined. The index indicating the PUCCH resource is also referred to as a PUCCH resource number. The correspondence between the nPUCCH and the combination of the orthogonal codes, cyclic shift quantities, and m is an example, and other correspondences may be provided. For example, a correspondence may be provided so as to cause the cyclic shift quantities to be changed between continuous nPUCCHs, or a correspondence may be provided so as to cause m to be changed between continuous nPUCCHs. In addition, CS1, CS3, CS5, CS7, CS9, and CS11 which are cyclic shift quantities different from CS0, CS2, CS4, CS6, CS8, and CS10 may be used. Here, a case in which the value of m is equal to or more than NF2 is described. The frequency resource having m which is less than NF2 means frequency resources of NF2 pieces, which are reserved in transmission of the PUCCH for performing feedback of the channel state information.

Next, the transmission mode used in transmission of the HARQ response information will be described. The HARQ response information defines various transmission modes (transmission methods). The transmission mode used in transmission of the HARQ response information is determined by information or a configuration specific to the base station apparatus 1, information or a configuration specific to the terminal device 2, and/or information regarding a PDCCH which corresponds to the HARQ response information, a configuration of a higher layer, and the like. The transmission mode used in transmission of the HARQ response information corresponds to HARQ response information bundling (HARQ-ACK bundling), and HARQ response information multiplexing (HARQ-ACK multiplexing).

Plural pieces of HARQ response information may be transmitted in a certain uplink subframe. The number of pieces of HARQ response information transmitted in the certain uplink subframe is determined by the number of code words (transport blocks) transmitted on one PDSCH, a subframe configuration, and/or a configuration of carrier aggregation. For example, one PDSCH may transmit two code words which are the maximum, through Multi Input Multi Output (MIMO) transmission, and HARQ response information is generated with respect to each of the code words. For example, in TDD, the type of a subframe is determined based on the subframe configuration. Thus, in a case where HARQ response information in response to transmission of PDSCHs in a plurality of downlink subframes is transmitted in a certain uplink subframe, plural pieces of HARQ response information corresponding to code words of the PDSCHs in the downlink subframes are generated. For example, in a case where carrier aggregation by a plurality of cells is configured, plural pieces of HARQ response information corresponding to code words of PDSCHs in the cells are generated.

In a case where plural pieces of HARQ response information are transmitted in a certain uplink subframe, the pieces of HARQ response information are transmitted by using HARQ response information bundling and/or HARQ response information multiplexing.

In the HARQ response information bundling, a logical AND operation is performed on a plural pieces of HARQ response information. The HARQ response information bundling may be performed in various units. For example, the HARQ response information bundling is performed on all code words in a plurality of downlink subframes. The HARQ response information bundling is performed on all code words in one downlink subframe. Particularly, an operation in which the HARQ response information bundling is performed on all code words in one downlink subframe in one serving cell is also referred to spatial HARQ response information bundling. The HARQ response information bundling allows the information quantity of the HARQ response information to be reduced. In the HARQ response information multiplexing, multiplexing is performed on plural pieces of HARQ response information. Information subjected to the HARQ response information bundling may be subjected to multiplexing. In the following descriptions, information subjected to the HARQ response information bundling is also simply referred to HARQ response information.

A PUCCH for transmitting the HARQ response information may define plural types of formats. As a format of the PUCCH for transmitting the HARQ response information, PUCCH format 1a, PUCCH format 1b, PUCCH format 1b for selecting a channel (PUCCH 1b with channel selection), PUCCH format 3, and the like are provided. The transmission mode used in transmission of the HARQ response information also includes the PUCCH format to be transmitted.

The PUCCH format 1a is a PUCCH format used for transmitting 1-bit HARQ response information. In a case where the HARQ response information is transmitted in the PUCCH format 1a, one PUCCH resource is assigned, and the HARQ response information is transmitted by using the assigned PUCCH resource.

The PUCCH format 1b is a PUCCH format used for transmitting 2-bit HARQ response information. In a case where the HARQ response information is transmitted in the PUCCH format 1b, one PUCCH resource is assigned, and the HARQ response information is transmitted by using the assigned PUCCH resource.

The PUCCH format 1b for performing channel selection is a PUCCH format used for transmitting 2 pieces, 3 pieces, or 4 pieces of HARQ response information. Regarding the PUCCH format used for transmitting 2 pieces, 3 pieces, or 4 pieces of HARQ response information, 2, 3, or 4 PUCCH resources (channels) are configured. In the channel selection, any of a plurality of configured PUCCH resources is selected and the selected PUCCH resource is used as a portion of information. 2-bit information which can be transmitted by using the selected PUCCH resource is also used as a portion of the information. Since the 2-bit information is subjected to QPSK modulation, the 2-bit information is transmitted as one symbol. That is, in the PUCCH format 1b for performing the channel selection, 2 pieces, 3 pieces, or 4 pieces of HARQ response information are transmitted by using a combination of a PUCCH resource selected from a plurality of configured PUCCH resources, and 2-bit information which can be transmitted by using the selected PUCCH resource. The combination and each piece of the HARQ response information are defined in advance. The HARQ response information corresponds to ACK, NACK, DTX, or NACK/DTX. The NACK/DTX indicates NACK or DTX. For example, in a case where carrier aggregation is not configured, 2 pieces, 3 pieces, or 4 pieces of HARQ response information correspond to HARQ response information in response to PDSCH transmission in which transmission is performed in 2, 3, or 4 downlink subframes.

The PUCCH format 3 is a PUCCH format used for transmitting HARQ response information which has 20 bit as the maximum. One PUCCH resource is configured in the PUCCH format 3. The one PUCCH resource in the PUCCH format 3 is for transmitting the HARQ response information which has 20 bit as the maximum. The PUCCH resource in the PUCCH formats 1a/1b and the PUCCH resource in the PUCCH format 3 are independent. For example, the base station apparatus 1 preferably performs configuring so as to constitute the PUCCH resource in the PUCCH formats 1a/1b and the PUCCH resource in the PUCCH format 3 by using different physical resources (that is, two RBs for constituting a physical resource used in transmission of a PUCCH).

In a case where HARQ response information is transmitted on a PUCCH, the HARQ response information is mapped and transmitted on the PUCCH resource which is explicitly and/or implicitly configured. The PUCCH resource used in transmission of the HARQ response information is uniquely determined by information or a configuration specific to the base station apparatus 1, information or a configuration specific to the terminal device 2, and/or information regarding a PDCCH or an EPDCCH which corresponds to the HARQ response information, and the like. For example, a PUCCH resource number indicating PUCCH resources used in transmission of the HARQ response information is calculated by using parameters included in the pieces of information and/or parameters obtained from the pieces of information, and a predetermined method (operation).

In a general FDD cell (for example, FDD cell in which carrier aggregation is not performed, or FDD cell in which carrier aggregation is performed only with another FDD cell), HARQ response information which corresponds to a PDSCH transmitted in a downlink component carrier, or a PDCCH indicating a release of downlink semi-persistent scheduling (SPS) (SPS release) in a subframe (n−4) is transmitted by an uplink component carrier corresponding to the downlink component carrier. The HARQ response information corresponding to the PDSCH allocated in a subframe n is transmitted by using a PUCCH/PUSCH allocated in a subframe (n+4). That is, after the terminal device 2 receives a PDSCH in a certain subframe, the terminal device 2 transmits HARQ response information corresponding to the PDSCH, to the base station by using a PUCCH/PUSCH after four subframes. Thus, the base station can receive the HARQ response information which has been transmitted corresponding to the PDSCH, from the terminal device 2, and determine whether or not the PDSCH is retransmitted based on information of ACK/NACK.

That is, in FDD cells, in a case where one serving cell is configured for the terminal device 2, or in a case where serving cells of which the number is more than one are configured for the terminal device 2, and the primary cell is the FDD cell, when PDSCH transmission in which the terminal device 2 has been set as a target in the subframe (n−4), and the HARQ response information is given is detected, the terminal device 2 transmits the HARQ response information in the subframe n.

In a general TDD cell (for example, TDD cell in which carrier aggregation is not performed, or TDD cell in which carrier aggregation is performed only with another TDD cell), it is not necessary that an uplink subframe after four subframes from a downlink subframe is configured. Thus, an uplink subframe corresponding to the downlink subframe is defined. In an example of details of HARQ response information multiplexing in PDSCH transmission, which is shown by a PDCCH or an EPDCCH, a downlink association set illustrated in FIG. 6 is used. FIG. 6 is a diagram illustrating an example of an index K: $\{k_0, k_1, \ldots, k_{M-1}\}$ of the downlink association set. HARQ response information included in a PUCCH/PUSCH allocated in the subframe n corresponds to a PDSCH shown by detecting a PDCCH associated in a subframe (n−$k_i$), or to a PDCCH indicating a release of the downlink SPS in the subframe (n−$k_i$). In other words, HARQ response information which corresponds to the PDSCH shown in the subframe n by detecting a PDCCH, or to the PDCCH indicating a release of the downlink SPS is included in a PUCCH/PUSCH in a subframe (n+$k_j$), and is transmitted.

That is, in TDD cells, in a case where one serving cell is configured for the terminal device 2, or in a case where serving cells of which the number is more than one are configured for the terminal device 2, and all UL-DL configurations are the same, when PDSCH transmission in which the terminal device 2 has been set as a target in the subframe (n−k), and the HARQ response information is given is detected, the terminal device 2 transmits the HARQ response information in the uplink subframe n. Here, k belongs to a set K (k∈K), and the set K is defined by using the figure in FIG. 6.

Figure 4:
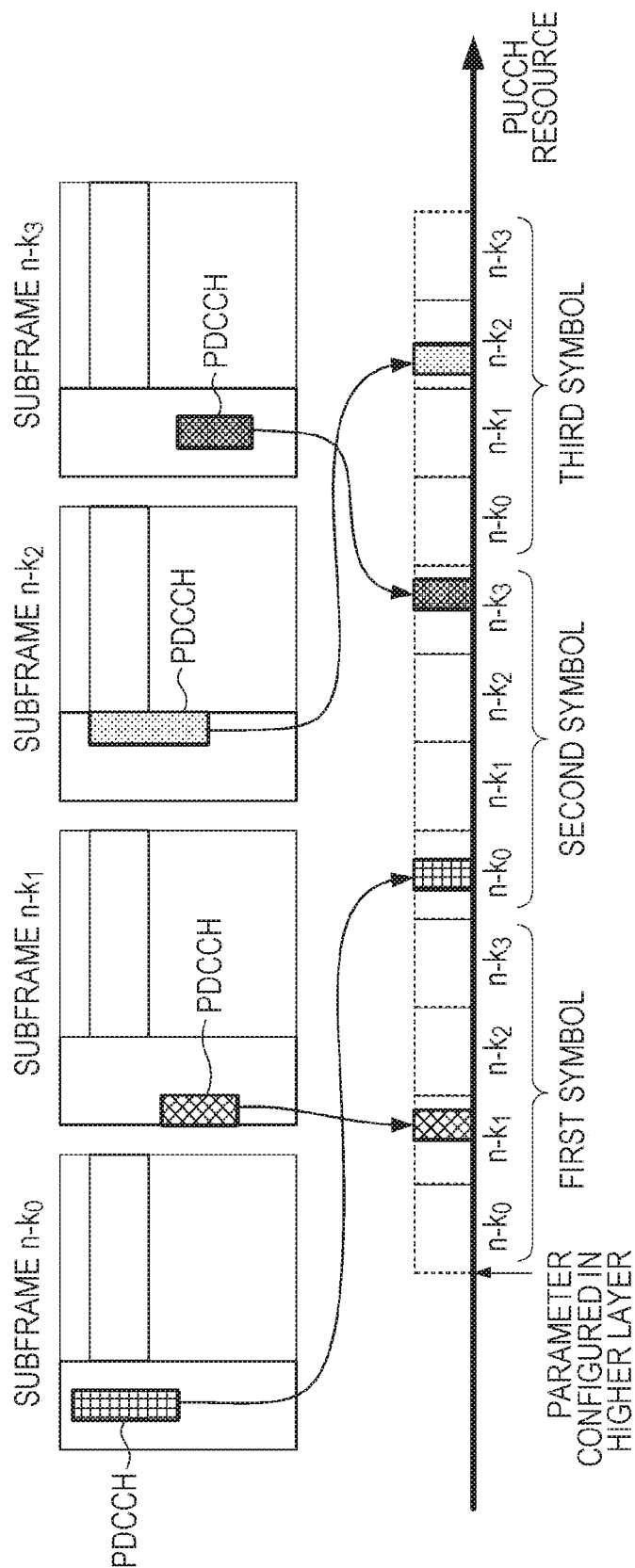
FIG. 4 is a diagram illustrating an example of mapping of a PUCCH resource for HARQ response information, which corresponds to a PDCCH according to the first embodiment of the present invention.

FIG. 4 is a diagram illustrating an example of HARQ response information multiplexing in PDSCH transmission shown by the PDCCH in a TDD cell. FIG. 4 illustrates PUCCH resources used for HARQ response information multiplexing in a case where HARQ response information is transmitted in four downlink subframes (4 bits) by using the PUCCH format 1b for performing channel selection. FIG. 4 illustrates a PUCCH resource extracted from a subframe (n−$k_i$) in a certain uplink subframe n. Here, the subframe (n−$k_i$) indicates a subframe ahead of $k_i$ pieces from the subframe n. If it is assumed that the number of subframes (bits) for performing the HARQ response information multiplexing is M, i is an integer which is equal to or more than 0 and equal to or less than (M−1). That is, in FIG. 4, in the subframe n, 4-bit HARQ response information is transmitted by using PUCCH resources extracted from four downlink subframes (subframe (n−$k_0$), subframe (n−$k_1$), subframe (n−$k_2$), and subframe n−$k_3$)). The value of M, and the value of $k_i$ are defined by the number of the subframe n and the subframe configuration. Here, a time window including a set of subframes expressed by (n−k) (k corresponds to each $k_i$ included in K) may be referred to as a bundling window. The number of subframes in the bundling window corresponds to M, and the subframes in the bundling window means subframes from a subframe (n−$k_0$) to a subframe (n−$k_{M-1}$). The size (time length) of the bundling window may vary depending on the subframe n having the corresponding uplink subframe. The size of the bundling window may vary depending on the subframe constitution (UL/DL configuration) in TDD.

Regarding an FDD cell, if definition and modification is performed again similarly to HARQ response information multiplexing in PDSCH transmission shown by the PDCCH in a TDD cell, rewriting as a downlink association set K may be performed so as to cause the values of M in all subframes n to be 1, to cause $k_0$ to be defined in all of the subframes n, and to cause $k_0$ in all of the subframes n to be 4.

The PUCCH resource used for the HARQ response information in PDSCH transmission shown by the PDCCH is determined based on at least a parameter $N^{(1)}_{PUCCH}$ configured in a higher layer, and the first CCE number $n_{CCE}$ used for transmitting the PDCCH associated with the HARQ response information. As illustrated in FIG. 4, indices of PUCCH resources used for the HARQ response information in PDSCH transmission shown by the PDCCH are given in order of OFDM symbols on which $n_{CCE}$ is mapped in subframes thereof. That is, block interleaving is performed between subframes which are subjected to HARQ response information multiplexing. Thus, since the number of OFDM symbols constituting a PDCCH region which is a region on which the PDCCH may be mapped may be set for each subframe, a probability of the PUCCH resources being integrated in front becomes high. Accordingly, the PUCCH resources used for the HARQ response information are efficiently used.

Figure 5:
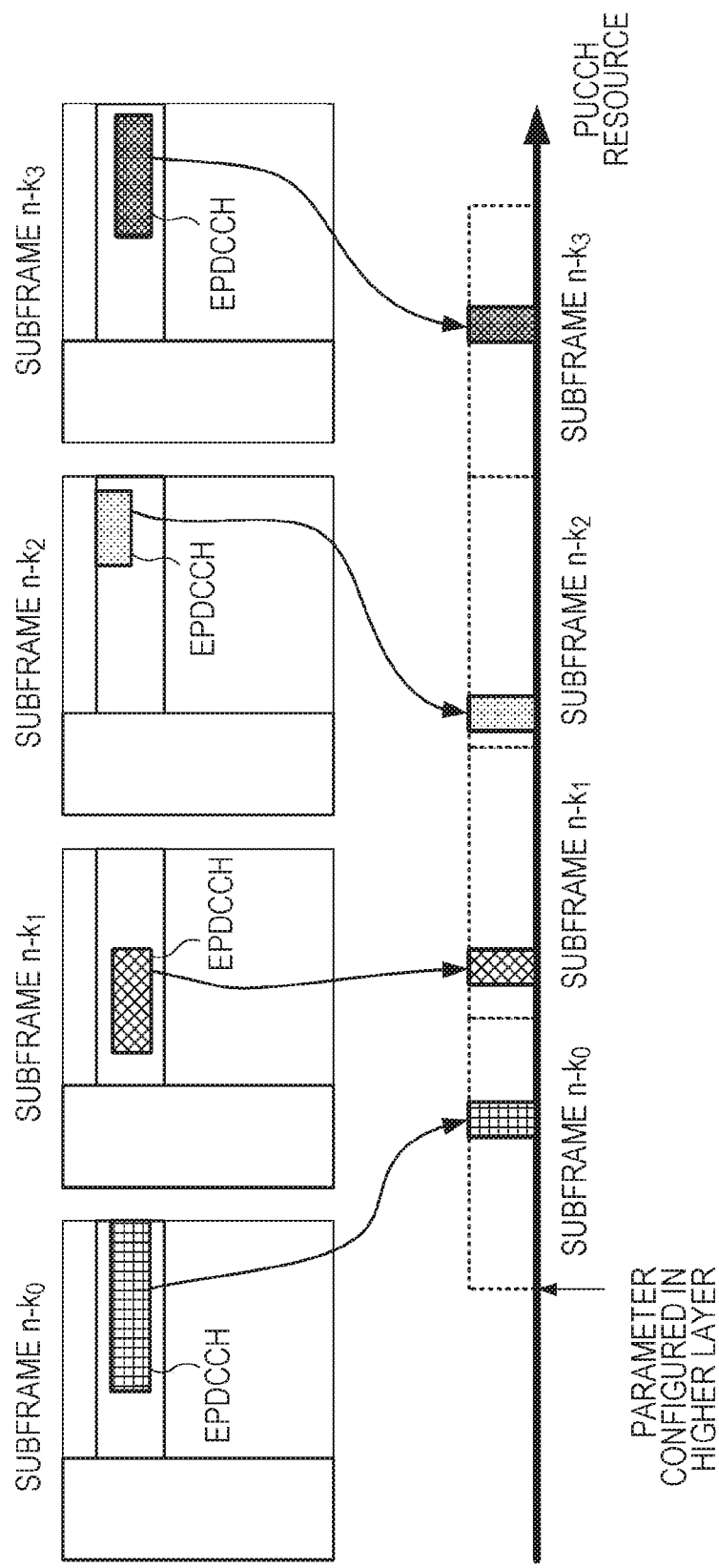
FIG. 5 is a diagram illustrating an example of mapping of a PUCCH resource for the HARQ response information, which corresponds to an EPDCCH according to the first embodiment of the present invention.

FIG. 5 is a diagram illustrating an example of HARQ response information multiplexing in PDSCH transmission shown by an EPDCCH. FIG. 5 illustrates PUCCH resources used for HARQ response information multiplexing in a case where HARQ response information is transmitted in four downlink subframes (4 bits) by using the PUCCH format 1b for performing channel selection. FIG. 5 illustrates a PUCCH resource extracted from a subframe $(n-k_i)$ in a certain uplink subframe n. Here, the subframe $(n-k_i)$ indicates a subframe ahead of $k_i$ pieces from the subframe n. If it is assumed that the number of subframes (bits) for performing the HARQ response information multiplexing is M, i is an integer which is equal to or more than 0 and equal to or less than (M−1). That is, in FIG. 5, in the subframe n, 4-bit HARQ response information is transmitted by using PUCCH resources extracted from four downlink subframes (subframe $(n-k_0)$, subframe $(n-k_1)$, subframe $(n-k_2)$, and subframe $(n-k_3)$). The value of M, and the value of $k_i$ are defined by the number of the subframe n and the subframe configuration.

The PUCCH resource used for the HARQ response information in PDSCH transmission shown by the EPDCCH is determined based on at least a parameter $N^{(e1)}_{PUCCH}$ configured in a higher layer, and the first CCE number $n_{ECCE}$ used for transmitting the EPDCCH associated with the HARQ response information. As illustrated in FIG. 5, indices of PUCCH resources used for the HARQ response information in PDSCH transmission shown by the EPDCCH are given in order from an EPDCCH mapped on the subframe $(n-k_0)$.

In the following descriptions, details of the HARQ response information multiplexing in PDSCH transmission shown by the PDCCH or the EPDCCH will be described.

In an example of the details of the HARQ response information multiplexing in PDSCH transmission shown by the PDCCH or the EPDCCH, a downlink association set illustrated in FIG. 6, and an operation of PUCCH resources which are used in transmission of the HARQ response information. The operation of PUCCH resources is illustrated in FIG. 7. FIG. 6 is a diagram illustrating an example of an index K: $\{k_0, k_1, \ldots, k_{M-1}\}$ of the downlink association set. FIG. 7 is a diagram illustrating an example of an expression for applying PUCCH resources used in transmission of the HARQ response information.

In a case where the HARQ response information multiplexing is performed in the subframe n having M which is more than 1, $n^{(1)}_{PUCCH, i}$ indicating a PUCCH resource extracted from the subframe $(n-k_i)$, and HARQ-ACK(i) indicating a response of ACK/NACK/DTX from the subframe $(n-k_i)$ will be described as follows. M is the number of elements in the set K defined in FIG. 6. M is the number obtained based on the HARQ response information which is subjected to multiplexing. $k_i$ is included in the set K, and i is from 0 to (M−1). For example, in a case where an uplink-downlink configuration is 2, the set K in the subframe 2 is $\{8, 7, 4, 6\}$, M is 4, $k_0$ is 8, $k_1$ is 7, $k_2$ is 4, and $k_3$ is 6.

PUCCH resources for a PDCCH which indicates PDSCH transmission shown by detecting the PDCCH associated in the subframe $(n-k_i)$ or release of downlink semi-persistent scheduling (downlink SPS) (SPS release) in the subframe $(n-k_1)$ are given by the expression (a) in FIG. 7. $n_{CCE, i}$ is the number (index) of the first CCE used for transmitting the PDCCH associated in the subframe $(n-k_i)$, and $N^{(1)}_{PUCCH}$ is a parameter configured in the higher layer. $N^{DL}_{RB}$ is the number of resource blocks in a downlink, and $N^{RB}_{sc}$ is the number of subcarriers per a resource block.

PUCCH resources for an EPDCCH which indicates PDSCH transmission shown by detecting the EPDCCH associated in the subframe $(n-k_i)$ or release of downlink semi-persistent scheduling (downlink SPS) (SPS release) in the subframe $(n-k_i)$ are given by the expression (b-1) and the expression (b-2) in FIG. 7. In a case where an EPDCCH set (EPDCCH-PRB-set) q is configured in distributed transmission, the expression (b-1) in FIG. 7 is used for the PUCCH resources. In a case where the EPDCCH set (EPDCCH-PRB-set) q is configured in localized transmission, the expression (b-2) in FIG. 7 is used for the PUCCH resources. $n_{ECCE, q}$ is the number (index) of the first CCE used for transmission of DCI allocation which is associated in the subframe $(n-k_i)$. That is, the number of the CCE is the smallest index of an ECCE used for constituting the EPDCCH. $N^{(e1)}_{PUCCH, q}$ is a parameter in the EPDCCH set q, which is configured in the higher layer. $N^{ECCE, q}_{RB}$ is the total number of resource blocks configured for the EPDCCH set q in the subframe $(n-k_i)$.

That is, M pieces of PUCCH resources are given in the subframe n. The M pieces of PUCCH resources are used for transmitting a PUCCH having the PUCCH format 1b for performing channel selection. For example, in a case where an uplink-downlink configuration is 2, four PUCCH resources are given in the subframe 2. The four PUCCH resources are used for transmitting a PUCCH having the PUCCH format 1b for performing channel selection.

Here, a subframe indicated by each set K in the downlink association set illustrated in FIG. 6 corresponds to a downlink subframe, a special subframe, and/or a flexible subframe. Thus, even in a case where the flexible subframe is configured in addition to the downlink subframe and the special subframe, it is possible to efficiently transmit the HARQ response information for the PDSCH, which is transmitted in the downlink subframe, the special subframe, and/or the flexible subframe.

In the following descriptions, an uplink reference UL-DL configuration and a downlink reference UL-DL configuration will be described.

If the base station apparatus 1 or the terminal device 2 satisfies a certain condition, one of the base station apparatus 1 and the terminal device 2 may perform configuring as an uplink reference UL-DL configuration, and another may perform configuring as a downlink reference UL-DL configuration. For example, the terminal device 2 may receive two pieces of information regarding a first configuration, and information regarding a second configuration, and may perform configuring of an uplink reference UL-DL configuration and a downlink reference UL-DL configuration. A DCI format associated with an uplink (for example, DCI format 0/4) may be transmitted in a downlink subframe configured in the uplink reference UL-DL configuration.

The uplink reference UL-DL configuration and the downlink reference UL-DL configuration may be configured by using the same table. In a case where indices of the uplink reference UL-DL configuration and the downlink reference UL-DL configuration are configured based on the same table, the uplink reference UL-DL configuration and the downlink reference UL-DL configuration are preferably configured so as to have indices different from each other. That is, regarding the uplink reference UL-DL configuration and the downlink reference UL-DL configuration, subframe patterns different from each other are preferably configured.

The uplink reference UL-DL configuration and the downlink reference UL-DL configuration for one serving cell may be independently configured. The uplink reference UL-DL configuration and the downlink reference UL-DL configuration may be individually configured for one serving cell in self-scheduling and cross carrier scheduling. In the self-scheduling, scheduling is performed on a PDSCH/PUSCH of a serving cell from the PDCCH/EPDCCH of the serving cell. In the cross carrier scheduling, scheduling is performed on a PDSCH/PUSCH of the serving cell from a PDCCH/EPDCCH of a serving cell different from the above serving cell.

In a case where a plurality of TDD UL/DL configurations are shown for one serving cell (primary cell, secondary cell), any one of the TDD UL/DL configurations may be configured as an uplink reference UL-DL configuration, and another one TDD UL/DL configuration may be configured as a downlink reference UL-DL configuration, in accordance with conditions. The uplink reference UL-DL configuration may be at least used for determining a correspondence between a subframe in which a physical downlink control channel is allocated, and a subframe in which a physical uplink shared channel corresponding to a physical downlink control channel is allocated. The uplink reference UL-DL configuration may be different from an actual transmission direction of a signal (that is, uplink or downlink). The downlink reference UL-DL configuration may be at least used for determining a correspondence between a subframe in which a physical downlink shared channel is allocated, and a subframe in which HARQ response information corresponding to the physical downlink shared channel is transmitted. The downlink reference UL-DL configuration may be different from an actual transmission direction of a signal (that is, uplink or downlink). That is, the uplink reference UL-DL configuration is used for specifying (selecting, determining) a correspondence between a subframe n in which a PDCCH/EPDCCH/PHICH is allocated, and a subframe (n+k) in which a PUSCH corresponding to the PDCCH/EPDCCH/PHICH is allocated. In a case where one primary cell is configured, or in a case where one primary cell and one secondary cell are configured, and an uplink reference UL-DL configuration for the primary cell and an uplink reference UL-DL configuration for the secondary cell are the same, the corresponding uplink reference UL-DL configuration in each of the two serving cells is used for determining a correspondence between a subframe in which a PDCCH/EPDCCH/PHICH is allocated, and a subframe in which a PUSCH corresponding to the PDCCH/EPDCCH/PHICH is allocated. The downlink reference UL-DL configuration is used for specifying (selecting, determining) a correspondence between a subframe n in which a PDSCH is allocated, and a subframe (n+k) in which HARQ response information corresponding to the PDSCH is transmitted. In a case where one primary cell is configured, or in a case where one primary cell and one secondary cell are configured, and a downlink reference UL-DL configuration for the primary cell and a downlink reference UL-DL configuration for the secondary cell are the same, the corresponding downlink reference UL-DL configuration in each of the two serving cells is used for specifying (selecting, determining) a correspondence between a subframe n in which a PDSCH is allocated, and a subframe (n+k) in which HARQ response information corresponding to the PDSCH is transmitted.

As an example in which the downlink reference UL-DL configuration is configured in the terminal device 2, there is a case where two or more TDD cells are configured in the terminal device 2, and UL-DL configurations of at least two serving cells are configured so as to be different from each other. At this time, the downlink reference UL-DL configuration of a serving cell is determined from a combination of either of the primary cell and the secondary cell, and a set number defined in FIG. 10, and a pair of a primary cell UL-DL configuration and a secondary cell UL-DL configuration. At this time, HARQ response information included in the PUCCH/PUSCH which is allocated in the subframe n corresponds to a PDSCH shown by detecting a PDCCH associated in a subframe (n−k), or to a PDCCH indicating a release of downlink SPS in the subframe (n−k). Here, regarding k, correlation is performed by using a value defined in FIG. 6, from the downlink reference UL-DL configuration.

That is, in TDD cells, in a case where serving cells of which the number is more than one are configured in the terminal device 2, at least two serving cells have UL-DL configurations different from each other, and the above serving cell is the primary cell, the UL-DL configuration of the primary cell is a downlink reference UL-DL configuration of the above serving cell.

That is, in TDD cells, in any of the following cases, the downlink reference UL-DL configuration of the above serving cell is defined in FIG. 10. The following cases are a case where serving cells of which the number is more than one are configured in the terminal device 2, at least two serving cells have UL-DL configurations different from each other, the above serving cell is the secondary cell, and thus a pair of the primary cell UL-DL configuration and the secondary cell UL-DL configuration belongs to a set 1 in FIG. 10; a case where monitoring of a PDCCH/EPDCCH from other serving cells is not configured for scheduling of the above serving cell, in the terminal device 2, and the pair of the primary cell UL-DL configuration and the secondary cell UL-DL configuration belongs to a set 2 or a set 3 in FIG. 10; and a case where monitoring of a PDCCH/EPDCCH from other serving cells is configured for scheduling of the above serving cell, in the terminal device 2, and the pair of the primary cell UL-DL configuration and the secondary cell UL-DL configuration belongs to a set 4 or a set 5 in FIG. 10.

That is, in TDD cells, in a case where serving cells of which the number is more than one are configured in the terminal device 2, at least two serving cells have UL-DL configurations different from each other, and the downlink reference UL-DL configuration of at least one serving cell is TDD UL-DL configuration 5, the terminal device 2 does not expect that serving cells of which the number is more than 2 are configured.

That is, in TDD cells, in a case where serving cells of which the number is more than one are configured for the terminal device 2, and at least two serving cells have UL-DL configurations different from each other, when PDSCH transmission in which the terminal device 2 has been set as a target for a serving cell c in the subframe (n−k), and the HARQ response information is given is detected, the terminal device 2 transmits the HARQ response information in the uplink subframe n. Here, k belongs to a set $K_c$ ($k \in K_c$), and the set K is defined by using the figure in FIG. 6. Here, the set $K_c$ includes the value of k belonging to the set K, so as to be for the subframe (n−k) corresponding to a downlink subframe or a special subframe for the serving cell c. Here, the UL-DL configuration in FIG. 6 refers to a downlink reference UL-DL configuration of this FDD cell.

In the following descriptions, a transmission timing of HARQ response information in a state of assuming a case where a plurality of cells to which different frame structure types are applied are aggregated.

Here, integration of the plurality of cells to which different frame structure types are applied includes, for example, a case where a cell in which a frame structure type is Type 1 (FDD), and a cell in which a frame structure type is Type 2 (TDD) are aggregated. The integration of the plurality of cells to which different frame structure types are applied includes, for example, a case where a plurality of cells in which a frame structure type is Type 1 (FDD), and a plurality of cells in which a frame structure type is Type 2 (TDD) are aggregated. That is, the integration of the plurality of cells to which different frame structure types are applied includes, for example, a case where one or more cells in which a frame structure type is Type 1 (FDD), and one or more cells in which a frame structure type is Type 2 (TDD) are aggregated. The descriptions for the frame structure type are an example, and may be similarly applied to a case where Type 3 or Type 4 is defined. A cell which is the primary cell of TDD is referred to as a TDD primary cell below. A cell which is the secondary cell of TDD is referred to as a TDD secondary cell below. A cell which is the primary cell of FDD is referred to as an FDD primary cell below. A cell which is the secondary cell of FDD is referred to as an FDD secondary cell below. In a case where carrier aggregation is configured, the terminal device 2 transmits a PUCCH in the primary cell, and the base station apparatus 1 receives the PUCCH from the terminal device 2 in the primary cell. The terminal device 2 is not required for transmitting the PUCCH in the secondary cell, and the base station apparatus 1 is not required for receiving the PUCCH from the terminal device 2 in the secondary cell.

Here, the uplink reference UL-DL configuration or the downlink reference UL-DL configuration may be also configured for an FDD cell. In addition, only the uplink reference UL-DL configuration may be configured for the FDD cell, and only the downlink reference UL-DL configuration may be configured for the FDD cell. The uplink reference UL-DL configuration and the downlink reference UL-DL configuration are individually configured by a scheduling method (self-scheduling and cross carrier scheduling). For example, in a case of self-scheduling, the uplink reference UL-DL configuration is not configured in an FDD cell. In a case of cross carrier scheduling, the uplink reference UL-DL configuration is configured in an FDD cell. In addition, configuring may be performed depending on the type of a serving cell (primary cell, secondary cell) or a combination of integrations of serving cells. For example, in a case where configuring as an FDD primary cell is performed in the terminal device 2, the downlink reference UL-DL configuration is not configured in the FDD primary cell. In a case where configuring as an FDD secondary cell is performed in the terminal device 2, and the primary cell is a TDD cell, the downlink reference UL-DL configuration is configured in the FDD secondary cell.

In a case where an uplink reference UL-DL configuration is not configured in an FDD cell, the base station apparatus 1 performs scheduling of a PUSCH and transmission of a PHICH at a transmission timing in FDD. In a case where a downlink reference UL-DL configuration is not configured in an FDD cell, the base station apparatus 1 performs scheduling of a PDSCH at a transmission timing in FDD, and the terminal device 2 transmits HARQ response information corresponding to the PDSCH at the transmission timing in FDD.

An example of the transmission timing of the HARQ response information in an FDD cell, in a case where the primary cell is a TDD cell will be described.

Regarding all UL-DL configurations, an uplink subframe is configured in the subframe 2. All pieces of HARQ response information corresponding to a PDSCH detected in an FDD secondary cell or a PDCCH indicating a release of downlink SPS in a case where the primary cell is a TDD cell are transmitted at a timing for the subframe 2. That is, the transmission timing of HARQ response information in an FDD secondary cell which performs carrier aggregation with a TDD primary cell cause transmission to be performed in accordance with TDD UL-DL configuration 5.

That is, in a case where serving cells of which the number is more than one are configured in the terminal device 2, and the primary cell is a TDD cell, the downlink reference UL-DL configuration of this FDD cell is TDD UL-DL configuration 5, and the terminal device 2 does not expect that serving cells of which the number is more than two are configured.

That is, in FDD cells, in a case where serving cells of which the number is more than one are configured in the terminal device 2, and the primary cell is a TDD cell, when PDSCH transmission in which the terminal device 2 has been set as a target in the subframe (n−k), and HARQ response information is given is detected, the terminal device 2 transmits the HARQ response information in the uplink subframe n. Here, k belongs to the set K (k∈K), and the set K is defined by the figure in FIG. 6. Here, the UL-DL configuration in FIG. 6 refers to a downlink reference UL-DL configuration of this FDD cell.

An example of a transmission timing of HARQ response information in an FDD cell, in a case where the primary cell is a TDD cell will be described.

In the above-described example, the transmission timing of the HARQ response information in a case of assuming that all TDD UL-DL configurations are used in the TDD primary cell is described, and configuring is performed in advance, at the transmission timing of the HARQ response information for TDD UL-DL configuration 5. The transmission timing of the HARQ response information may be set in a higher layer. For example, in a case where a use of the TDD UL-DL configuration is limited to 0, 1, or 2, the downlink reference UL-DL configuration may be set to be 2 by a higher layer. That is, the downlink reference UL-DL configuration for determining the transmission timing of HARQ response information in an FDD secondary cell which performs carrier aggregation with a TDD primary cell is configured in the higher layer.

That is, in FDD cells, in a case where serving cells of which the number is more than one are configured in the terminal device 2, and the primary cell is a TDD cell, the downlink reference UL-DL configuration of this FDD cell is configured in the higher layer.

That is, in FDD cells, in a case where serving cells of which the number is more than one are configured in the terminal device 2, the primary cell is a TDD cell, and thus at least one serving cell has the TDD UL-DL configuration 5, the terminal device 2 does not expect that serving cells of which the number is more than 2 are configured.

That is, in FDD cells, in a case where serving cells of which the number is more than one are configured in the terminal device 2, and the primary cell is a TDD cell, when PDSCH transmission in which the terminal device 2 has been set as a target in the subframe (n−k), and HARQ response information is given is detected, the terminal device 2 transmits the HARQ response information in the uplink subframe n. Here, k belongs to the set K (k∈K), and the set K is defined by the figure in FIG. 6. Here, the UL-DL configuration in FIG. 6 refers to a downlink reference UL-DL configuration of this FDD cell.

A virtual TDD UL-DL configuration (TDD-FDD UL-DL configuration) from a higher layer may be configured in an FDD cell, and the downlink reference UL-DL configuration for the FDD cell may be configured based on the virtual TDD UL-DL configuration. In this case, the downlink reference UL-DL configuration of the FDD cell is determined based on a pair of the TDD UL-DL configuration of the TDD primary cell, and the virtual TDD UL-DL configuration of the FDD secondary cell, by using the figure in FIG. 10.

An example of a transmission timing of HARQ response information in an FDD cell, in a case where the primary cell is a TDD cell will be described.

HARQ response information corresponding to a PDSCH detected in an FDD secondary cell or a PDCCH indicating a release of downlink SPS in a case may be transmitted by using a PUCCH. The PUCCH is transmitted from an uplink subframe of the TDD primary cell. That is, a downlink reference UL-DL configuration for determining a transmission timing of HARQ response information of the FDD secondary cell which performs carrier aggregation with the TDD primary cell tracks the TDD UL-DL configuration of the primary cell.

That is, in FDD cells, in a case where serving cells of which the number is more than one are configured in the terminal device 2, and the primary cell is a TDD cell, the downlink reference UL-DL configuration of this FDD cell corresponds to the TDD UL-DL configuration of the primary cell.

That is, in FDD cells, in a case where serving cells of which the number is more than one are configured in the terminal device 2, the primary cell is a TDD cell, and thus at least one serving cell has the TDD UL-DL configuration 5, the terminal device 2 does not expect that serving cells of which the number is more than 2 are configured.

That is, in FDD cells, in a case where serving cells of which the number is more than one are configured in the terminal device 2, and the primary cell is a TDD cell, when PDSCH transmission in which the terminal device 2 has been set as a target in the subframe (n–k), and HARQ response information is given is detected, the terminal device 2 transmits the HARQ response information in the uplink subframe n. Here, k belongs to the set K (k∈K), and the set K is defined by the figure in FIG. 6. Here, the UL-DL configuration in FIG. 6 refers to a downlink reference UL-DL configuration of this FDD cell.

An example of a transmission timing of HARQ response information in an FDD cell, in a case where the primary cell is a TDD cell will be described.

In a case where the HARQ response information of the FDD cell is transmitted in accordance with the TDD UL-DL configuration of the TDD primary cell, since the TDD primary cell may not be correlated in a subframe functioning as an uplink subframe, scheduling of the PDSCH or the PDCCH indicating the release of downlink SPS is not performed in the subframe even in the FDD secondary cell. A table in which the PDSCH, the PDCCH indicating the release of downlink SPS, and the transmission timing of the HARQ response information are correlated with each other is also used in the subframe which functions as the uplink subframe. FIGS. 9 and 15 illustrate an example of the transmission timing of the HARQ response information, which corresponds to each of a PDSCH of the FDD secondary cell and a PDCCH indicating the release of downlink SPS, in a case of the TDD primary cell. It is possible to also transmit the PDSCH and the PDCCH indicating the release of downlink SPS, in the FDD secondary cell even in a subframe which functions as an uplink subframe in the TDD primary cell by using the transmission timing defined in FIG. 9 or 15. In addition, the HARQ response information corresponding to the PDSCH and the PDCCH is transmitted in the uplink subframe of the TDD primary cell. That is, the downlink reference UL-DL configuration for determining the transmission timing of the HARQ response information in an FDD cell tracks the TDD UL-DL configuration of the primary cell, and the transmission timing is determined by using the table of the transmission timing of the HARQ response information for the FDD secondary cell which performs the carrier aggregation with the TDD primary cell.

A table in FIG. 9 has small delay in feedback of the HARQ response information, in comparison to a table in FIG. 15. Thus, throughput performance by HARQ becomes good. The table in FIG. 15 is defined so as to cause the number of Ms of which the value is the maximum, in the TDD UL-DL configuration to be smaller than that in the table in FIG. 9. Accordingly, since the value of M is equal to or less than 4 when the TDD UL-DL configuration is not 2, 4, and 5, feedback of the HARQ response information may be performed by using the PUCCH format 1b when the TDD UL-DL configuration is 0, 1, 3, and 6.

That is, in FDD cells, in a case where serving cells of which the number is more than one are configured in the terminal device 2, and the primary cell is a TDD cell, the downlink reference UL-DL configuration of this FDD cell corresponds to the TDD UL-DL configuration of the primary cell.

In FDD cells, in a case where serving cells of which the number is more than one are configured in the terminal device 2, the primary cell is a TDD cell, and thus at least one serving cell has TDD UL-DL configuration 5, the terminal device 2 does not expect that serving cells of which the number is more than 2 are configured.

In FDD cell, in a case where serving cells of which the number is more than one are configured in the terminal device 2, the primary cell is a TDD cell, when PDSCH transmission in which the terminal device 2 has been set as a target in the subframe (n–k), and the HARQ response information is given is detected, the terminal device 2 transmits the HARQ response information in the uplink subframe n. Here, k belongs to a set K (k∈K), and the set K is defined by using the figure in FIG. 9. Here, the UL-DL configuration in FIG. 9 refers to the downlink reference UL-DL configuration of this FDD cell.

The downlink reference UL-DL configuration of this FDD cell may be configured in a higher layer.

That is, in FDD cells, in a case where serving cells of which the number is more than one are configured in the terminal device 2, and the primary cell is a TDD cell, the downlink reference UL-DL configuration of this FDD cell may be configured in a higher layer.

A table in FIG. 11 may be used instead of the table in FIG. 9 or 15. FIG. 11 illustrates an example of the transmission timing of HARQ response information which corresponds to each of the PDSCH of the FDD secondary cell and the PDCCH indicating the release of downlink SPS, in a case of the TDD primary cell. In the table in FIG. 11, the transmission timing of HARQ response information for a subframe which functions as an uplink subframe in the TDD primary cell is defined in TDD UL-DL configurations 0, 1, 2, 3, 4, and 6. In TDD UL-DL configuration 5, the transmission timing of HARQ response information for a subframe which functions as an uplink subframe in the TDD primary cell is not defined. It is possible to perform configuring so as to cause the maximum number of downlink HARQ processes to be equal to or less than 16, by using this table. The TDD UL-DL configuration may be a downlink reference UL-DL configuration.

In a case where a set K of TDD UL-DL configuration 5 is configured by using the transmission timing which is defined in FIG. 9 or 15, the base station apparatus 1 may perform scheduling so as to limit the number of times of transmitting a PDSCH in one radio frame to 9 in a certain cell. The terminal device 2 does not expect reception of PDSCHs in subframes of which the number is equal to or more than 10, in one radio frame in a certain cell. Thus, it is possible to perform communication in a state where the maximum number of downlink HARQ processes is equal to or less than 16.

An example of the transmission timing of the HARQ response information in an FDD cell, in a case where the primary cell is a TDD cell will be described.

The maximum number of downlink HARQ processes may be required to be equal to or more than 17 at the transmission timing defined in FIG. 9 or 15. For example, TDD UL-DL configuration 5 in FIG. 9 needs to cause the maximum number of downlink HARQ processes to be 19. In a case where the maximum number of downlink HARQ processes exceeds a range of 17 or more, a bit field having 5 bits or more is required for the DCI for performing notification of a HARQ process number. Thus, a transmission timing defined in the set K in which the maximum number of downlink HARQ processes is not more than 17 is used. For example, TDD UL-DL configurations 0, 1, 2, 3, 4, and 6 use the set K defined in the table for the transmission timing, in FIG. 9 or 15, and TDD UL-DL configuration 5 uses the set K defined in the table for the transmission timing, in FIG. 6. Thus, it is possible to set the maximum number of downlink HARQ processes to be equal to or less than 16.

That is, in FDD cells, in a case where serving cells of which the number is more than one are configured in the terminal device 2, and the primary cell is a TDD cell, the downlink reference UL-DL configuration of this FDD cell is a TDD UL-DL configuration of the primary cell.

In FDD cells, in a case where serving cells of which the number is more than one are configured in the terminal device 2, the primary cell is a TDD cell, and thus at least one serving cell has the TDD UL-DL configuration 5, the terminal device 2 does not expect that serving cells of which the number is more than 2 are configured. In addition, in a case where serving cells of which the number is more than one are configured in the terminal device 2, the primary cell is a TDD cell, at least one serving cell is an FDD cell, and thus at least one serving cell has TDD UL-DL configuration 2 or 4, the terminal device 2 does not expect that serving cells of which the number is more than 4 are configured.

In FDD cells, in a case where serving cells of which the number is more than one are configured in the terminal device 2, and the primary cell is a TDD cell, when PDSCH transmission in which the terminal device 2 has been set as a target in the subframe (n−k), and HARQ response information is given is detected, the terminal device 2 transmits the HARQ response information in the uplink subframe n. Here, k belongs to the set K (k∈K), and the set K is defined by the table in FIG. 6 or 9. Here, in a case where the downlink reference UL-DL configuration of this FDD cell is 0, 1, 2, 3, 4, and 6, referring to the UL-DL configuration in FIG. 9 is performed. Here, referring to the UL-DL configuration in FIG. 6 is performed in a case where the downlink reference UL-DL configuration of this FDD cell is 5.

In the following descriptions, the number of component carriers (CCs) which allows carrier aggregation in a case where the table of the downlink association set which is different from that of the TDD primary cell is defined in the FDD secondary cell in a case where a plurality of cells to which different frame structure types are applied are aggregated will be described.

In PUCCH format 3, HARQ response information having 20 bits to the maximum can be transmitted. In a case where carrier aggregation is performed, spatial HARQ response information bundling is performed, and the number of bits used for transmitting the HARQ response information is compressed. However, in a case where the number of bits exceeds 20 even when spatial HARQ response information bundling is performed, transmission of the HARQ response information is not possible. For example, in a case where the primary cell is a TDD cell, carrier aggregation is performed between an FDD cell and a TDD cell, the table in FIG. 6 is applied to the primary cell, and the table in FIG. 9 is applied to the secondary cell, in a case where the TDD UL-DL configuration of the TDD primary cell is 2, and the TDD UL-DL configuration of the FDD secondary cell is 2, the number of bits after spatial HARQ response information bundling is performed on HARQ response information corresponding to a PDCCH/EPDCCH indicating PUSCH transmission or the release of downlink SPS is 9 to the maximum. However, in a case where four FDD cells in which the TDD UL-DL configuration is 2 are configured along with a TDD cell in which the TDD UL-DL configuration is 2, the number of bits after spatial HARQ response information bundling is performed is 24 to the maximum, and this value exceeds the number of bits allowing transmission of PUCCH format 3. Thus, the terminal device 2 does not enable transmission of the HARQ response information by using PUCCH format 3.

Thus, the number of serving cells allowing carrier aggregation is limited depending on the TDD UL-DL configuration.

For example, in a case where the primary cell is a TDD cell, and the table in FIG. 15 is applied to the FDD secondary cell, the base station apparatus 1 does not configure a TDD primary cell and two or more FDD secondary cells in the terminal device 2, in a case where the downlink reference UL-DL configuration is 5 in at least one FDD cell. The base station apparatus 1 does not configure a TDD primary cell and four or more FDD secondary cells in the terminal device 2, in a case where the downlink reference UL-DL configuration is 2 or 4 in at least one FDD cell.

In a case where serving cells of which the number is more than one are configured in the terminal device 2, and the primary cell is a TDD cell, at least one serving cell is an FDD cell, and thus at least one serving cell has the downlink reference UL-DL configuration 2 or 4, the terminal device 2 does not expect that serving cells of which the number is more than four are configured. In a case where at least one serving cell has the TDD UL-DL configuration 5, the terminal device 2 does not expect that serving cells of which the number is more than two are configured.

For example, in a case where the primary cell is a TDD cell, and the table in FIG. 9 is applied to the FDD secondary cell, the base station apparatus 1 does not configure two or more FDD secondary cells in the terminal device 2, in a case where the downlink reference UL-DL configuration is 5 in a TDD primary cell and at least one FDD cell. The base station apparatus 1 does not configure a TDD primary cell and three or more FDD secondary cells in the terminal device 2, in a case where the downlink reference UL-DL configuration is 3 or 4 in at least one FDD cell. The base station apparatus 1 does not configure a TDD primary cell and four or more FDD secondary cells in the terminal device 2, in a case where the downlink reference UL-DL configuration is 2 in at least one FDD cell.

In a case where serving cells of which the number is more than one are configured in the terminal device 2, and the primary cell is a TDD cell, at least one serving cell is an FDD cell, and thus at least one serving cell has the downlink reference UL-DL configuration 2, the terminal device 2 does not expect that serving cells of which the number is more than four are configured. In a case where serving cells of which the number is more than one are configured in the terminal device 2, and the primary cell is a TDD cell, at least one serving cell is an FDD cell, and thus at least one serving cell has the downlink reference UL-DL configuration 3 or 4, the terminal device 2 does not expect that serving cells of which the number is more than three are configured. In a case where at least one serving cell has the TDD UL-DL configuration 5, the terminal device 2 does not expect that serving cells of which the number is more than two are configured.

The number of serving cells allowing carrier aggregation may be limited depending on the maximum value of M in the TDD UL-DL configuration.

In a case where the maximum value of M in the TDD UL-DL configuration is equal to or more than 7, three or more serving cells are not configured. In a case where the maximum value of M in the TDD UL-DL configuration is 6, four or more serving cells are not configured. In a case where the maximum value of M in the TDD UL-DL configuration is 5, five or more serving cells are not configured.

In the following descriptions, supporting of PUCCH format 1b for performing channel selection in a case where the table of the downlink association set which is different from that of the TDD primary cell is defined in the FDD secondary cell in a case where a plurality of cells to which different frame structure types are applied are aggregated will be described.

In a case where carrier aggregation between a TDD cell and an FDD cell is configured, and the primary cell is a TDD cell, and in a case where the maximum value of M in the TDD UL-DL configuration is equal to or less than 4, the HARQ response information is transmitted by using PUCCH format 1b for performing channel selection or PUCCH format 3. In a case where the maximum value of M in the TDD UL-DL configuration is equal to or more than 5, the HARQ response information is transmitted only by using PUCCH format 3.

For example, in a case where the downlink association set is defined in the FDD secondary cell by using the table in FIG. 15, and in a case where the downlink reference UL-DL configuration is 2, 4, or 5, only PUCCH format 3 is supported, and PUCCH format 1b for performing channel selection is not supported.

In a case where serving cells of which the number is more than one are configured in the terminal device 2, the primary cell is a TDD cell, and the downlink reference UL-DL configuration of at least one serving cell is 5, only PUCCH format 3 is supported for the serving cells of which the maximum number is 2. In a case where serving cells of which the number is more than one are configured in the terminal device 2, the primary cell is a TDD cell, and the downlink reference UL-DL configuration of at least one serving cell is 2 or 4, only PUCCH format 3 is supported for the serving cells of which the maximum number is 4. In a case where serving cells of which the number is more than one are configured in the terminal device 2, the primary cell is a TDD cell, and the downlink reference UL-DL configuration of at least one serving cell is 2, 4, and 5, PUCCH format 1b for performing channel selection is not supported.

For example, in a case where the downlink association set is defined in the FDD secondary cell by using the table in FIG. 9, and in a case where the downlink reference UL-DL configuration is 2, 3, 4, or 5, only PUCCH format 3 is supported, and PUCCH format 1b for performing channel selection is not supported.

In a case where serving cells of which the number is more than one are configured in the terminal device 2, the primary cell is a TDD cell, and the downlink reference UL-DL configuration of at least one serving cell is 5, only PUCCH format 3 is supported for the serving cells of which the maximum number is 2. In a case where serving cells of which the number is more than one are configured in the terminal device 2, the primary cell is a TDD cell, and the downlink reference UL-DL configuration of at least one serving cell is 3 or 4, only PUCCH format 3 is supported for the serving cells of which the maximum number is 3. In a case where serving cells of which the number is more than one are configured in the terminal device 2, the primary cell is a TDD cell, and the downlink reference UL-DL configuration of at least one serving cell is 2, only PUCCH format 3 is supported for the serving cells of which the maximum number is 4. In a case where serving cells of which the number is more than one are configured in the terminal device 2, the primary cell is a TDD cell, and the downlink reference UL-DL configuration of at least one serving cell is 2, 4, and 5, PUCCH format 1b for performing channel selection is not supported.

Further, transmission of the PUCCH format may be switched for each subframe. For example, in a case where carrier aggregation between a TDD cell and an FDD cell is configured, and the primary cell is a TDD cell, and in a case where the maximum value of M is equal to or less than 4 in the subframe n, the HARQ response information is transmitted by using PUCCH format 1b for performing channel selection or PUCCH format 3. In a case where the value of M is equal to or more than 5 in the subframe n, the HARQ response information is transmitted only by using PUCCH format 3.

For example, in a case where the downlink association set is defined in the FDD secondary cell by using the table in FIG. 9, and the downlink reference UL-DL configuration is 3, in the subframe 2, the HARQ response information is transmitted only by using PUCCH format 3. In the subframe 3 or 4, the HARQ response information is transmitted by using PUCCH format 1b for performing channel selection or PUCCH format 3. In the subframe 3 or 4, selection of where transmission is performed by using PUCCH format 1b for performing channel selection or PUCCH format 3 is set in the higher layer. Regardless of setting of the higher layer, transmission by using PUCCH format 3 is configured in the subframe 2.

In a case where serving cells of which the number is more than one are configured in the terminal device 2, the primary cell is a TDD cell, and the downlink reference UL-DL configuration of at least one serving cell is 5, only PUCCH format 3 is supported for the serving cells of which the maximum number is 2. In a case where serving cells of which the number is more than one are configured in the terminal device 2, the primary cell is a TDD cell, and the downlink reference UL-DL configuration of at least one serving cell is 2, only PUCCH format 3 is supported for the serving cells of which the maximum number is 4. In a case where serving cells of which the number is more than one are configured in the terminal device 2, the primary cell is a TDD cell, and the downlink reference UL-DL configuration of at least one serving cell is 2 and 5, PUCCH format 1b for performing channel selection is not supported. In a case where serving cells of which the number is more than one are configured in the terminal device 2, the primary cell is a TDD cell, and the downlink reference UL-DL configuration of at least one serving cell is 3 and 4, the HARQ response information is transmitted in the subframe n by using the PUCCH format 3 in a case where M is more than 4. In a case where M is equal to or less than 4, the HARQ response information is transmitted by using PUCCH format 1b for performing channel selection, or PUCCH format 3.

An example of the transmission timing of the HARQ response information in a TDD cell, in a case where the primary cell is an FDD cell will be described.

In a case where the primary cell is an FDD cell, uplink resources (uplink component carriers) are configured in all subframes. Regarding a transmission timing of HARQ response information corresponding to a PDSCH or a PDCCH indicating a release of downlink SPS, transmission may be performed in accordance with the transmission timing of the HARQ response information, which is configured in an FDD cell. That is, even in the TDD cell, in a case where the primary cell is an FDD cell, the transmission timing is the same as the transmission timing of HARQ response information in a case where one FDD cell is configured, or in a case where carrier aggregation for only FDD cells is performed. That is, the terminal device 2 transmits a PDSCH in a certain subframe, and then transmits HARQ response information corresponding to the PDSCH, to the base station apparatus 1 on a PUCCH/PUSCH after 4 subframes.

That is, in TDD cells, serving cells of which the number is more than one are configured in the terminal device 2, at least two serving cells have frame constitution types different from each other, and the primary cell is an FDD cell, when PDSCH transmission in which the terminal device 2 has been set as a target in the subframe (n−4), and the HARQ response information is given is detected, the terminal device 2 transmits the HARQ response information in the subframe n.

An example of the transmission timing of the HARQ response information in a TDD cell, in a case where the primary cell is an FDD cell will be described.

Even when the primary cell is an FDD cell, and HARQ response information corresponding to a PDSCH transmitted in a TDD cell, or a PDCCH indicating the release of downlink SPS is transmitted in the FDD primary cell, transmission is performed by using a transmission timing of the TDD serving cell. That is, the terminal device 2 receives a PDSCH in the subframe n, and then transmits HARQ response information corresponding to the PDSCH, to the base station apparatus 1 by using on a PUCCH/PUSCH allocated in the subframe (n+k).

In a case where an FDD cell is the primary cell, and a TDD cell is the secondary cell, the base station apparatus 1 receives the HARQ response information corresponding to the PDSCH which has been transmitted in the TDD cell, in a subframe after 4 subframes in which the PDSCH has been transmitted. In a case where the FDD cell is the primary cell, and the TDD cell is the secondary cell, the terminal device 2 transmits the HARQ response information corresponding to the PDSCH which has been transmitted in the TDD cell, in a subframe after 4 subframes from a subframe in which the PDSCH has been transmitted in the TDD cell.

That is, in TDD cells, in a case where serving cells of which the number is more than one are configured for the terminal device 2, and the primary cell is an FDD cell, when PDSCH transmission in which the terminal device 2 has been set as a target in the subframe (n−k), and HARQ response information is given is detected, the terminal device 2 transmits the HARQ response information in the uplink subframe n. Here, k belongs to the set K (k∈K), and the set K is defined by the figure in FIG. 6. Here, the UL-DL configuration in FIG. 6 refers to a downlink reference UL-DL configuration of this TDD cell.

Thus, even when carrier aggregation between the TDD cell and the FDD cell is performed, the terminal device 2 can transmit the HARQ response information corresponding to the PDSCH or the PDCCH indicating the release of downlink SPS, with high efficiency.

Switching of uplink reference UL-DL configurations of an FDD cell and a TDD cell will be described below. The uplink reference UL-DL configuration is set depending on whether the types (FDD cell, TDD cell) of the aggregated cell are the same or different from each other, whether TDD UL-DL configurations are the same or different from each other, and whether or not cross carrier scheduling is configured.

In FDD cells, in a case where one or more FDD cells are configured in the terminal device 2, the uplink reference UL-DL configuration for this FDD cell is not configured.

In FDD cells, in a case where two or more serving cells are configured in the terminal device 2, this FDD cell is the primary cell, and monitoring a PDCCH/EPDCCH of another TDD cell for scheduling of this FDD cell is not configured in the terminal device 2, the uplink reference UL-DL configuration for this FDD cell is not configured.

In FDD cells, in a case where two or more serving cells are configured in the terminal device 2, this FDD cell is the secondary cell, and monitoring a PDCCH/EPDCCH of another TDD cell for scheduling of this FDD cell is configured in the terminal device 2, the uplink reference UL-DL configuration of this FDD cell is an UL-DL configuration of the TDD cell.

In TDD cells, in a case where one or more TDD cells are configured in the terminal device 2, and UL-DL configurations of all TDD cells are the same as each other, the uplink reference UL-DL configuration of this TDD cell is an UL-DL configuration of the TDD cell.

In TDD cells, in a case where two or more TDD cells are configured in the terminal device 2, UL-DL configurations of at least two TDD cells are different from each other, this TDD cell is the primary cell, and monitoring a PDCCH/EPDCCH of another TDD cell for scheduling of this TDD cell is not configured in the terminal device 2, the uplink reference UL-DL configuration of this TDD cell is an UL-DL configuration of the TDD cell.

In TDD cells, in a case where two or more TDD cells are configured in the terminal device 2, UL-DL configurations of at least two TDD cells are different from each other, this TDD cell is the secondary cell, and monitoring a PDCCH/EPDCCH of another TDD cell for scheduling of this TDD cell is configured in the terminal device 2, the uplink reference UL-DL configuration of this TDD cell is determined based on a table which has been defined in advance by combining UL-DL configurations of this TDD cell and another TDD cell (which is described above).

In TDD cells, in a case where two or more serving cells are configured in the terminal device 2, this TDD cell is the secondary cell, and monitoring a PDCCH/EPDCCH of another FDD cell for scheduling of this TDD cell is configured in the terminal device 2, the uplink reference UL-DL configuration of this TDD cell is not configured.

Thus, even when carrier aggregation between the TDD cell and the FDD cell is performed, the terminal device 2 can receive the PUSCH with high efficiency.

An downlink assignment index (DAI) will be described below.

The DAI is used for detecting a PDCCH/EPDCCH for assigning PDSCH transmission in which data transmitted from the base station apparatus 1 is lost in the middle of transmission, and for detecting a PDCCH/EPDCCH for performing an instruction of downlink SPS resource.

For example, in a situation in which plural pieces of HARQ response information in a plurality of downlink subframes is transmitted in one uplink subframe by HARQ response information bundling, even when a PDCCH/EPDCCH transmitted in a certain downlink subframe is lost, and detection of the PDCCH/EPDCCH by the terminal device 2 is not possible, the terminal device 2 responds to ACK in a case where reception of the PDSCH of which an instruction is performed by a PDCCH/EPDCCH transmitted in another downlink subframe. Thus, the base station apparatus 1 does not enable detection of the lost PDCCH/EPDCCH.

Thus, the base station apparatus 1 notifies the terminal device 2 of a value which is included in a DCI format, by using the DAI. The value of which the notification is performed is based on the number of times of transmitting a PDCCH/EPDCCH for performing an instruction of the release of downlink SPS, and based on the number of times of transmitting a PDCCH/EPDCCH among a plurality of downlink subframes corresponding to one uplink subframe in which HARQ response information can be transmitted in response to PDSCH transmission in the plurality of downlink subframes. The terminal device 2 acquires a value by using the DAI. The acquired value is based on the number of times of transmitting a PDCCH/EPDCCH for assigning PDSCH transmission, which has been transmitted by the base station apparatus 1, and based on the number of times of transmitting a PDCCH/EPDCCH for performing an instruction of the release of downlink SPS. The terminal device 2 compares the acquired value based on the number of times of transmitting the PDCCH/EPDCCH, to the actual reception success number of the PDCCH/EPDCCH. If the value of the number of times of transmission is different from the reception success number, the terminal device 2 determines that the PDCCH/EPDCCH transmitted in a certain downlink subframe is lost, and responds to the base station apparatus 1 with NACK. Since the base station apparatus 1 receives NACK, the base station apparatus 1 performs retransmission processing in a state where a PDSCH corresponding to the lost PDCCH/EPDCCH is included. Thus, even when the PDCCH/EPDCCH is lost in the middle of transmission, detection on the terminal device 2 side is possible, and retransmission processing can be performed.

When HARQ response information is transmitted in a state of being multiplexed, the DAI is used for determining the number of bits of the multiplexed HARQ response information. The DAI is used for determining the number of bits of the HARQ response information which is transmitted on the PUCCH/PUSCH. The DAI is used for determining bit allocation of the HARQ response information transmitted on the PUCCH/PUSCH.

The DAI of which notification is performed in a state of being included in the downlink grant indicates an accumulated value of PDCCH/EPDCCHs for assigning PDSCH transmission and PDCCH/EPDCCHs for performing an instruction of the release of downlink SPS until the current subframe among a plurality of downlink subframes corresponding to one uplink subframe in which HARQ response information can be transmitted in response to the PDSCH transmission in a plurality of downlink subframes. In other words, the DAI included in the downlink grant for triggering PDSCH transmission in a subframe $(n-k_i)$ indicates the number of subframes in which PDSCH transmission toward the terminal device 2 is performed among subframes (from $n-k_0$ to $n-k_{i-1}$) ahead of the subframe $(n-k_i)$ in a bundling window corresponding to the subframe n. The PDSCH transmission includes PDSCH transmission by dynamic scheduling and/or PDSCH transmission by semi-persistent scheduling. In a case where a DAI field has two bits, replacement with the actual number of subframes may be performed, and the remainder with respect to 4 of the number of subframes may be indicated.

The DAI of which notification is performed in a state of being included in an uplink grant indicates the value of a PDCCH/EPDCCH for assigning transmission of all PDSCHs and the value of a PDCCH/EPDCCH for performing an instruction of the release of downlink SPS among a plurality of downlink subframes corresponding to one uplink subframe in which HARQ response information can be transmitted in response to the PDSCH transmission in a plurality of downlink subframes. In other words, the DAI included in the uplink grant for triggering PUSCH transmission in the subframe n indicates the number of subframes in which PDSCH transmission toward the terminal device 2 is performed in a bundling window corresponding to the subframe n.

In the carrier aggregation between an FDD cell and a TDD cell, a relationship between a plurality of downlink subframes corresponding to one uplink subframe in which HARQ response information can be transmitted in response to the PDSCH transmission will be described. FIG. 8 illustrates an example of the relationship between an uplink subframe and a downlink subframe in transmission of HARQ response information in response to the PDSCH transmission. In FIG. 8, it is assumed that Serving cell 1 is a TDD cell and Serving cell 2 is an FDD cell. HARQ response information in response to the PDSCH transmission which has been transmitted in a downlink subframe of the subframe 1 is transmitted in an uplink subframe of Serving cell 1, and HARQ response information in response to the PDSCH transmission which has been transmitted in a downlink subframe of Serving cell 2 is also transmitted in the uplink subframe of Serving cell 1. In the example of FIG. 8, HARQ response information in response to PDSCH transmission of the subframes 0 and 1 of Serving cell 1 is transmitted by using an uplink subframe of the subframe 7 of Serving cell 1. Since a plurality of downlink subframes is associated with one uplink subframe, detection of losing the PDCCH/EPDCCH is performed by using information of the DAI. HARQ response information in response to PDSCH transmission of the subframes 0, 1, 2, and 3 of Serving cell 2 is also transmitted by using the uplink subframe of the subframe 7 of Serving cell 1. In this case, a plurality of downlink subframes is also associated with one uplink subframe. That is, the information of the DAI is also included in a PDCCH/EPDCCH indicating PDSCH transmission in an FDD cell, and thus losing the PDCCH/EPDCCH can be detected, and communication with high efficiency can be performed.

The DAI is configured for each terminal.

The DAI of which notification is performed in a state of being included in an uplink grant is commonly configured between cells which have been subjected to carrier aggregation. The DAI of which notification is performed in a state of being included in the uplink grant may be configured for each of the cells which have been subjected to carrier aggregation. A case where the DAI is configured for each of the cells which have been subjected to carrier aggregation corresponds to, for example, a case where transmission of a PUCCH in the secondary cell is allowable.

The DAI of which notification is performed in a state of being included in a downlink grant is configured for each of the cells which have been subjected to carrier aggregation.

In the following descriptions, the presence of the field of the DAI and application of the DAI assuming a case where a plurality of cells to which different frame structure types are applied are aggregated will be described.

Setting of the DAI is switched in accordance with the frame constitution type of a cell in which the HARQ response information is transmitted. For example, in a case where HARQ response information in an FDD cell is transmitted as a response in a TDD cell, a DAI field is set in the DCI transmitted in the FDD cell. In a case where HARQ response information in a TDD cell is transmitted as a response in an FDD cell, a DAI field may not be set in the DCI transmitted in the TDD cell.

Further, setting of the DAI may be switched in accordance with the transmission timing of HARQ response information. For example, in a case where HARQ response information of an FDD cell is transmitted as a response in a TDD cell by using the transmission timing of HARQ response information in the TDD cell, the HARQ response information is transmitted as a response for plurality of downlink subframes in one uplink subframe. Thus, the DAI field is set. In a case where HARQ response information of a TDD cell is transmitted as a response in an FDD cell by using the transmission timing of HARQ response information in the FDD cell, the HARQ response information corresponding to one downlink subframe is transmitted as a response in one uplink subframe. Thus, the DAI field is not set. In a case where HARQ response information of a TDD cell is transmitted as a response in an FDD cell by using the transmission timing of HARQ response information in the TDD cell, the HARQ response information corresponding to a plurality of downlink subframes is transmitted as a response in one uplink subframe. Thus, the DAI field is set. In addition, in a case where the transmission timing of the HARQ response information of the TDD cell is also applied to the FDD cell, if the HARQ response information of the FDD cell is transmitted as a response in the FDD cell, the DAI field is set in the DCI.

That is, in a case where the HARQ response information of the FDD cell is transmitted as a response in the TDD cell by using the transmission timing of the HARQ response information of the TDD cell, the DAI field is set in the DCI. In a case where the HARQ response information of the TDD cell is transmitted as a response in the FDD cell by using the transmission timing of the HARQ response information of the TDD cell, the DAI field is set in the DCI. In a case where the HARQ response information of the FDD cell is transmitted as a response in the FDD cell by using the transmission timing of the HARQ response information of the TDD cell, the DAI field is set in the DCI. In a case where the HARQ response information of the TDD cell is transmitted as a response in the FDD cell by using the transmission timing of the HARQ response information of the FDD cell, the DAI field may not be set in the DCI.

The base station apparatus 1 performs transmission on a PDCCH by using a first DCI format or a second DCI format. The terminal device 2 performs reception on the PDCCH which has been transmitted by using the first DCI format or the second DCI format. In a case where the total number of cells of FDD and cells of TDD is set in the terminal device 2, a first DAI indicates the accumulated number of PDCCHs or EPDCCHs indicating PDSCH transmission or the release of downlink semi-persistent scheduling in subframes until now in a predetermined subframe. The first DAI is provided in the first DCI format in the FDD cell, is applied to the FDD cell. A second DAI is provided in the second DCI format in the FDD cell, and is applied to the FDD cell.

An example of the presence of the field of the DAI and the application of the DAI by combining the primary cell and the secondary cell will be described below.

An example of the presence of the field of the DAI included in the DCI relating to a downlink grant will be described.

In a case where a PDSCH is transmitted in a TDD cell, the DAI is included in the DCI relating to the downlink grant, and is transmitted. In addition, in a case where a TDD cell is configured so as to be the primary cell, and the PDSCH is transmitted in an FDD cell, the DAI is also included in the DCI relating to the downlink grant, and is transmitted.

That is, a 2-bit field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells by all UL-DL configurations or for FDD secondary cells (FDD cells aggregated in the TDD primary cell) in which the primary cell is operated by TDD.

That is, the field of the DAI is not provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for FDD cells (FDD cells which are not aggregated in the TDD primary cell) in which the primary cell is not operated by TDD. In other words, the field of the DAI is not provided in the DCI transmitted in the FDD cell for the terminal device 2, in which the primary cell is configured by FDD.

An example of the presence of the field of the DAI included in the DCI relating to a downlink grant will be described.

For example, in the terminal device 2 in which the FDD primary cell and the TDD secondary cell are configured, the number of downlink subframes of the TDD secondary cell is smaller than the number of uplink subframes of the FDD primary cell. Thus, the value of the DAI is generally set to 1. In such a situation, since the information of the DAI is not required, the information of the DAI may be excluded from the DCI for controlling PDSCH scheduling of TDD cells. That is, in a case where the primary cell is an FDD cell, the DAI field is not configured in a TDD cell and an FDD cell.

At a time of the TDD primary cell, in a case where a PDSCH is transmitted in the TDD cell, and in a case where a PDSCH is transmitted in the FDD cell, the DAI is also included in the DCI relating to the downlink grant, and is transmitted. At a time of the FDD primary cell, in both of a case where a PDSCH is transmitted in the TDD cell, and a case where a PDSCH is transmitted in the FDD cell, the DAI is transmitted without being included in the DCI relating to the downlink grant.

That is, only when the primary cell is a TDD cell, a 2-bit field of the DAI is provided for a serving cell (FDD cell or TDD cell) in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order. When the primary cell is an FDD cell, the field of the DAI is not provided in the DCI.

An example of the presence of the field of the DAI included in the DCI relating to a downlink grant will be described.

The DAI being required to be assigned in the FDD cell corresponds to a case where carrier aggregation between a TDD cell and an FDD cell is performed, and the primary cell is a TDD cell. At this time, the DAI field is assigned in the DCI for the FDD secondary cell. That is, only an USS is configured in the secondary cell. The presence of the field of the DAI is determined depending on the USS in which a PDCCH/EPDCCH for performing an instruction of scheduling of an FDD cell is allocated.

That is, the field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order. The DCI is assigned in an USS for TDD cells by all UL-DL configurations or an FDD cell in which a TDD-FDD-CA configuration is configured in a higher layer.

An example in which the DAI is included in a DCI format included in a PDCCH/EPDCCH which is transmitted in an USS of an FDD cell in a case where TDD-FDD-CA configuration is configured in a higher layer is described. However, in a case where the TDD-FDD-CA configuration is configured in a higher layer, the DAI may be included in a DCI format transmitted in a CSS of the FDD cell, and be transmitted.

An example of the presence of the field of the DAI included in the DCI relating to a downlink grant will be described.

A PUCCH including HARQ response information is mainly transmitted by using PUCCH resources of an uplink subframe of the primary cell. Since the number of downlink subframes of the FDD secondary cell is more than the number of uplink subframes of the TDD primary cell, the information of the DAI is also required in the DCI for performing an instruction of an FDD cell. In a case where a PUCCH including HARQ response information can be transmitted in an uplink subframe of the FDD secondary cell, the information of the DAI is not required in the DCI for performing an instruction of an FDD cell.

That is, a 2-bit field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells by all UL-DL configurations or for FDD secondary cells (FDD cells aggregated in the TDD primary cell) in which configuring of a PUCCH being transmitted in the FDD secondary cell is not performed by the higher layer, and the primary cell is operated by TDD.

That is, in a case where configuring of a PUCCH being transmitted in the FDD secondary cell is performed by the higher layer, the field of the DAI is not provided in the DCI transmitted to the FDD cell.

An example of the presence of the field of the DAI included in the DCI relating to a downlink grant will be described.

A 2-bit field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells in which configuring of a PUCCH being transmitted in the FDD secondary cell is performed by the higher layer, or for serving cells (FDD cells or TDD cells) in which configuring of a PUCCH being transmitted in the FDD secondary cell is not performed by the higher layer, and the primary cell is a TDD cell.

The field of the DAI is not provided in the DCI transmitted to the FDD cell in which configuring of a PUCCH being transmitted in the secondary cell is performed by the higher layer, or to a serving cell in which transmission of a PUCCH in the secondary cell is not configured by the higher layer, and the primary cell is not a TDD cell.

An example of the presence of the field of the DAI included in the DCI relating to an uplink grant will be described.

When a PDSCH is transmitted in a TDD cell in which the UL-DL configuration is configured so as to be (1-6), the DAI is transmitted with being included in the DCI relating to an uplink grant. In a case where the TDD cell is configured as the primary cell, and a PDSCH is transmitted in an FDD cell, the DAI is also transmitted with being included in the DCI relating to an uplink grant.

That is, a 2-bit field of the DAI is provided in the DCI transmitted by DCI format 0/4, for TDD cells in which the UL-DL configuration is configured so as to be (1-6), or for FDD secondary cells (FDD cells aggregated in the TDD primary cell) in which the primary cell is operated by TDD.

That is, the field of the DAI is not provided in the DCI transmitted by DCI format 0/4, for TDD cells in which the UL-DL configuration is not configured so as to be (1-6), or for FDD cells (FDD cells which are not aggregated in the TDD primary cell) in which the primary cell is not operated by TDD.

An example of the presence of the field of the DAI included in the DCI relating to an uplink grant will be described.

When the primary cell is a TDD cell, in a case where a PDSCH is transmitted in a TDD cell in which the UL-DL configuration is configured so as to be (1-6), and in a case where a PDSCH is transmitted in an FDD cell, the DAI is also transmitted with being included in the DCI relating to the uplink grant. When the primary cell is an FDD cell, in a case where a PDSCH is transmitted in a TDD cell, and in a case where a PDSCH is transmitted in an FDD cell, the DAI is also transmitted without being included in the DCI relating to the uplink grant.

That is, only when the primary cell is a TDD cell, a 2-bit field of the DAI is provided in the DCI transmitted by DCI format 0/4, for an FDD cell or a TDD cell in which the UL-DL configuration is configured so as to be (1-6).

That is, when the primary cell is not a TDD cell, the field of the DAI is not provided in the DCI transmitted by DCI format 0/4.

An example of the presence of the field of the DAI included in the DCI relating to an uplink grant will be described.

Also in a case of the uplink grant, the presence of the field of the DAI is determined depending on a USS in which a PDCCH/EPDCCH for performing an instruction of scheduling of an FDD cell is allocated.

That is, a 2-bit field of the DAI is provided in the DCI transmitted to TDD cells in which the UL-DL configuration is configured so as to be (1-6), or is provided in the DCI transmitted by DCI format 0/4. The DCI is assigned in an USS of an FDD cell in which a TDD-FDD-CA configuration is configured in a higher layer.

An example in which the DAI is included in a DCI format included in a PDCCH/EPDCCH which is transmitted in an USS of an FDD cell in a case where TDD-FDD-CA configuration is configured in a higher layer is described. However, in a case where the TDD-FDD-CA configuration is configured in a higher layer, the DAI may be included in a DCI format transmitted in a CSS of the FDD cell, and be transmitted.

That is, the field of the DAI is not provided in the DCI transmitted by DCI format 0/4, for to a TDD cell in which the UL-DL configuration is set to be 0, or for an FDD cell in which the TDD-FDD-CA configuration is not configured in a higher layer.

An example of the presence of the field of the DAI included in the DCI relating to an uplink grant will be described.

In a case where configuring of a PUCCH being transmitted in the FDD secondary cell is not performed by the higher layer, a 2-bit field of the DAI is provided in the DCI transmitted by DCI format 0/4, for FDD secondary cells (FDD cell aggregated in the TDD primary cell) in which the primary cell is operated by TDD, or for TDD cells in which the UL-DL configuration is configured so as to be (1-6).

In a case where configuring of a PUCCH being transmitted in the FDD secondary cell is performed by the higher layer, the field of the DAI is not provided in the DCI transmitted by DCI format 0/4 for an FDD cell or a TDD cell in which the UL-DL configuration is configured so as to be 0.

An example of the presence of the field of the DAI included in the DCI relating to an uplink grant will be described.

In a case where configuring of a PUCCH being transmitted in the FDD secondary cell is performed by the higher layer, a 2-bit field of the DAI is provided in the DCI transmitted by DCI format 0/4, for TDD cells in which the UL-DL configuration is configured so as to be (1-6).

In a case where configuring of a PUCCH being transmitted in the FDD secondary cell is performed by the higher layer, the field of the DAI is not provided in the DCI transmitted by DCI format 0/4, for TDD cells in which the UL-DL configuration is configured so as to be 0 and FDD cells.

An example of the application of the field of the DAI included in the DCI relating to a downlink grant will be described.

When carrier aggregation between a TDD cell and an FDD cell is performed, the DAI field may be generally applied to an FDD cell.

In a case where one or more TDD cells are configured, and UL-DL configurations of all TDD cells are the same as each other, the field of the DAI in the DCI relating to the downlink grant is applied in a TDD cell in which the UL-DL configuration is configured so as to be (1-6). In addition, in a case where two or more TDD cells are configured, and at least two TDD cells are configured so as to have UL-DL configurations different from each other, the field of the DAI in the DCI relating to the downlink grant is applied in a TDD cell in which the downlink reference UL-DL configuration is configured so as to be (1-6). In addition, in a case where the primary cell is a TDD cell, and at least one secondary cell is an FDD cell, the field of the DAI in the DCI relating to the downlink grant is applied in an FDD cell.

That is, in a case where one TDD cell is configured in the terminal device 2, or in a case where TDD cells of which the number is more than one are configured in the terminal device 2 and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the downlink reference UL-DL configuration is configured so as to be (1-6).

An example of the application of the field of the DAI included in the DCI relating to a downlink grant will be described.

The downlink reference UL-DL configuration is mainly configured in a TDD cell. When carrier aggregation between a TDD cell and an FDD cell is performed, the downlink reference UL-DL configuration may be applied to an FDD cell. At this time, the DAI field is applied in accordance with the downlink reference UL-DL configuration.

In a case where one or more TDD cells are configured in the terminal device 2, and UL-DL configurations of all TDD cells are the same as each other, the field of the DAI in the DCI relating to the downlink grant is applied to a TDD cell in which the UL-DL configuration is configured so as to be (1-6). In addition, in a case where two or more TDD cells are configured, and at least two TDD cells are configured so as to have UL-DL configurations different from each other, the field of the DAI in the DCI relating to the downlink grant is applied to a TDD cell in which the downlink reference UL-DL configuration is configured so as to be (1-6). In addition, in a case where the primary cell is a TDD cell, and at least one secondary cell is an FDD cell, the field of the DAI in the DCI relating to the downlink grant is applied to an FDD cell in which the downlink reference UL-DL configuration is configured so as to be (1-6).

That is, in a case where one serving cell is configured in the terminal device 2, or in a case where serving cells of which the number is more than one are configured in the terminal device 2, and UD-DL configurations of all serving cells are the same as each other, the field of the DAI is applied only to a serving cell in which the UL-DL configuration is configured so as to be (1-6). In a case where serving cells of which the number is more than one are configured in the terminal device 2, and at least two serving cells have UL-DL configurations different from each other, or in a case where at least one serving cell is an FDD cell, the DAI field is applied to a serving cell (FDD cell, TDD cell) in which the downlink reference UL-DL configuration is configured so as to be (1-6).

An example of the application of the field of the DAI included in the DCI relating to an uplink grant will be described.

In a case where one or more TDD cells are configured, and UL-DL configurations of all TDD cells are the same as each other, the field of the DAI in the DCI relating to an uplink grant is applied in a TDD cell in which the UL-DL configuration is configured so as to be (1-6). In addition, in a case where two or more TDD cells are configured, and at least two TDD cells are configured so as to have UL-DL configurations different from each other, the field of the DAI in the DCI relating to the uplink grant is applied to a TDD cell in which the uplink reference UL-DL configuration is configured so as to be (1-6). In addition, in a case where the primary cell is a TDD cell, and at least one secondary cell is an FDD cell, the field of the DAI in the DCI relating to the uplink grant is applied to an FDD cell.

That is, in a case where one TDD cell is configured in the terminal device 2, or in a case where TDD cells of which the number is more than one are configured in the terminal device 2 and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the uplink reference UL-DL configuration is configured so as to be (1-6).

An example of the application of the field of the DAI included in the DCI relating to an uplink grant will be described.

In a case where one or more TDD cells are configured in the terminal device 2, and UL-DL configurations of all TDD cells are the same as each other, the field of the DAI in the DCI relating to the uplink grant is applied to a TDD cell in which the UL-DL configuration is configured so as to be (1-6). In addition, in a case where two or more TDD cells are configured, and at least two TDD cells are configured so as to have UL-DL configurations different from each other, the field of the DAI in the DCI relating to the uplink grant is applied in a TDD cell in which the uplink reference UL-DL configuration is configured so as to be (1-6). In addition, in a case where the primary cell is a TDD cell, and at least one secondary cell is an FDD cell, the field of the DAI in the DCI relating to the uplink grant is applied in an FDD cell in which the uplink reference UL-DL configuration is configured so as to be (1-6).

That is, in a case where one TDD cell is configured in the terminal device 2, or in a case where TDD cells of which the number is more than one are configured in the terminal device 2 and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the uplink reference UL-DL configuration is configured so as to be (1-6).

A combination of the presence of the field of the DAI included in the DCI relating to the downlink grant or the uplink grant, and the application of the DAI is not limited. However, an example of a preferable combination thereof will be described below.

An example of a combination of the presence of the field of the DAI included in the DCI relating to the downlink grant or the uplink grant, and the application of the DAI will be described.

In a case where one TDD cell is configured in the terminal device 2, or in a case where serving cells of which the number is more than one are configured in the terminal device 2, and the primary cell is a TDD cell, the base station apparatus 1 configures the DAI field in the DCI included in a PDCCH/EPDCCH which is transmitted in association with a TDD cell and an FDD cell.

A 2-bit field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells by all UL-DL configurations or for FDD secondary cells (FDD cells aggregated in the TDD primary cell) in which the primary cell is operated by TDD.

Thus, in a case where one TDD cell is configured in the terminal device 2, or in a case where TDD cells of which the number is more than one are configured in the terminal device 2, and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the downlink reference UL-DL configuration is configured so as to be (1-6). In other words, in a case where one TDD cell is configured in the terminal device 2, or in a case where serving cells of which the number is more than one are configured in the terminal device 2, and UD-DL configurations of all serving cells are the same as each other, the field of the DAI is not applied to a serving cell in which the UL-DL configuration is configured so as to be 0. In a case where serving cells of which the number is more than one are configured in the terminal device 2, and at least two serving cells have UL-DL configurations different from each other, the DAI field is not applied to a serving cell in which the downlink reference UL-DL configuration is configured so as to be 0.

The field of the DAI is not provided in the DCI transmitted to FDD cells (FDD cells which are not aggregated in the TDD primary cell) in which the primary cell is not operated by TDD. In other words, the field of the DAI is not provided in the DCI transmitted in an FDD cell to the terminal device 2 in which the primary cell is configured by FDD.

A 2-bit field of the DAI is provided for a TDD cell in the DCI transmitted by DCI format 1A in which CRC is scrambled by the RA-RNTI, the P-RNTI, or the SI-RNTI.

The field of the DAI is not provided for an FDD cell in the DCI transmitted by DCI format 1A in which CRC is scrambled by the RA-RNTI, the P-RNTI, or the SI-RNTI.

A 2-bit field of the DAI is provided in the DCI transmitted by DCI format 0/4, for TDD cells in which the UL-DL configuration is configured so as to be (1-6), or for FDD secondary cells (FDD cells aggregated in the TDD primary cell) in which the primary cell is operated by TDD.

In a case where one TDD cell is configured in the terminal device 2, or in a case where TDD cells of which the number is more than one are configured in the terminal device 2 and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the uplink reference UL-DL configuration is configured so as to be (1-6).

The field of the DAI is not provided in the DCI transmitted by DCI format 0/4, for TDD cells in which the UL-DL configuration is not configured so as to be (1-6), or for FDD cells (FDD cells which are not aggregated in the TDD primary cell) in which the primary cell is not operated by TDD. In other words, the field of the DAI is not provided in the DCI transmitted by DCI format 0/4, for a TDD cell in which the UL-DL configuration is configured so as to be 0, or for an FDD cell in which the primary cell is operated by FDD.

An example of a combination of the presence of the field of the DAI included in the DCI relating to the downlink grant or the uplink grant, and the application of the DAI will be described.

In a case where one TDD cell is configured in the terminal device 2, or in a case where serving cells of which the number is more than one are configured in the terminal device 2, and the primary cell is a TDD cell, the base station apparatus 1 configures the DAI field in the DCI included in a PDCCH/EPDCCH which is transmitted in association with a serving cell (TDD cell, FDD cell).

Only when the primary cell is a TDD cell, a 2-bit field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for serving cells (FDD cells or TDD cells). When the primary cell is an FDD cell, the field of the DAI is not provided in the DCI.

Regardless of whether or not the primary cell is a TDD cell, a 2-bit field may be reserved in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells in which the UL-DL configuration is configured so as to be 0.

In a case where one serving cell is configured in the terminal device 2, or in a case where serving cells of which the number is more than one are configured in the terminal device 2, and UD-DL configurations of all serving cells are the same as each other, the field of the DAI is applied to a serving cell in which the UL-DL configuration is configured so as to be (1-6). In a case where serving cells of which the number is more than one are configured in the terminal device 2, and at least two serving cells have UL-DL configurations different from each other, or in a case where at least one serving cell is an FDD cell, the DAI field is applied to an FDD cell or a TDD cell in which the downlink reference UL-DL configuration is configured so as to be (1-6). In other words, in a case where one serving cell is configured in the terminal device 2, or in a case where serving cells of which the number is more than one are configured in the terminal device 2, and UD-DL configurations of all serving cells are the same as each other, the field of the DAI is not applied to a serving cell in which the UL-DL configuration is configured so as to be 0. In a case where serving cells of which the number is more than one are configured in the terminal device 2, and at least two serving cells have UL-DL configurations different from each other, or in a case where at least one serving cell is an FDD cell, the DAI field is not applied to a serving cell in which the downlink reference UL-DL configuration is configured so as to be 0.

A 2-bit field of the DAI is provided for a TDD cell in the DCI transmitted by DCI format 1A in which CRC is scrambled by the RA-RNTI, the P-RNTI, or the SI-RNTI.

The field of the DAI is not provided for an FDD cell in the DCI transmitted by DCI format 1A in which CRC is scrambled by the RA-RNTI, the P-RNTI, or the SI-RNTI.

Only when the primary cell is a TDD cell, a 2-bit field of the DAI is provided in the DCI transmitted by DCI format 0/4, for an FDD cell or a TDD cell in which the UL-DL configuration is not configured so as to be (1-6). When the primary cell is not a TDD cell, the field of the DAI is not provided in the DCI transmitted by DCI format 0/4.

Thus, in a case where one TDD cell is configured in the terminal device 2, or in a case where TDD cells of which the number is more than one are configured in the terminal device 2, and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the uplink reference UL-DL configuration is configured so as to be (1-6).

The field of the DAI may not be reserved in the DCI transmitted by DCI format 0/4, for TDD cells in which the UL-DL configuration is configured so as to be 0.

An example of a combination of the presence of the field of the DAI included in the DCI relating to the downlink grant or the uplink grant, and the application of the DAI will be described.

In a case where one TDD cell is configured in the terminal device 2, in a case where serving cells of which the number is more than one are configured in the terminal device 2, in a case where all serving cells are TDD cells, or in a case where serving cells of which the number is more than one are configured in the terminal device 2 and at least one thereof is configured as the FDD secondary cell, the base station apparatus 1 configures the DAI field in the DCI included in a PDCCH/EPDCCH which is transmitted in association with the TDD cell and the FDD cell. A timing (subframe) at which HARQ response information corresponding to the PDCCH/EPDCCH which is associated with the FDD cell is transmitted in the terminal device 2 is determined in accordance with the downlink reference UL-DL configuration.

The field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells by all UL-DL configurations or for FDD secondary cells (FDD cells aggregated in the TDD primary cell) in which the primary cell is operated by TDD.

Thus, in a case where one serving cell is configured in the terminal device 2, or in a case where serving cells of which the number is more than one are configured in the terminal device 2, and UD-DL configurations of all serving cells are the same as each other, the field of the DAI is applied only to a serving cell in which the UL-DL configuration is configured so as to be (1-6). In a case where serving cells of which the number is more than one are configured in the terminal device 2, and at least two serving cells have UL-DL configurations different from each other, or in a case where at least one serving cell is an FDD cell, the DAI field is applied to a serving cell in which the downlink reference UL-DL configuration is configured so as to be (1-6). In other words, in a case where one serving cell is configured in the terminal device 2, or in a case where serving cells of which the number is more than one are configured in the terminal device 2, and UD-DL configurations of all serving cells are the same as each other, the field of the DAI is not applied to a serving cell in which the UL-DL configuration is configured so as to be 0. In a case where serving cells of which the number is more than one are configured in the terminal device 2, and at least two serving cells have UL-DL configurations different from each other, the DAI field is not applied to a serving cell in which the downlink reference UL-DL configuration is configured so as to be 0.

The field of the DAI is not provided in the DCI transmitted to FDD cells (FDD cells which are not aggregated in the TDD primary cell) in which the primary cell is not operated by TDD. In other words, the field of the DAI is not provided in the DCI transmitted to the terminal device 2 in which the primary cell is configured by FDD.

A 2-bit field of the DAI is provided for a TDD cell in the DCI transmitted by DCI format 1A in which CRC is scrambled by the RA-RNTI, the P-RNTI, or the SI-RNTI.

The field of the DAI is not provided for an FDD cell in the DCI transmitted by DCI format 1A in which CRC is scrambled by the RA-RNTI, the P-RNTI, or the SI-RNTI.

The 2-bit field of the DAI is provided in the DCI transmitted by DCI format 0/4, for TDD cells in which the UL-DL configuration is configured so as to be (1-6), or for FDD secondary cells (FDD cells aggregated in the TDD primary cell) in which the primary cell is operated by TDD.

In a case where one TDD cell is configured in the terminal device 2, or in a case where TDD cells of which the number is more than one are configured in the terminal device 2 and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to a serving cell in which the uplink reference UL-DL configuration is configured so as to be (1-6).

The field of the DAI is not provided in the DCI transmitted by DCI format 0/4, for TDD cells in which the UL-DL configuration is configured so as to be 0, or for FDD cells (FDD cells which are not aggregated in the TDD primary cell) in which the primary cell is not operated by TDD.

An example of a combination of the presence of the field of the DAI included in the DCI relating to the downlink grant or the uplink grant, and the application of the DAI will be described.

In a case where one TDD cell is configured in the terminal device 2, or in a case where serving cells of which the number is more than one are configured in the terminal device 2, and the primary cell is a TDD cell, the base station apparatus 1 configures the DAI field in the DCI included in a PDCCH/EPDCCH which is transmitted in association with a TDD cell and an FDD cell. A timing (subframe) at which HARQ response information corresponding to the PDCCH/EPDCCH which is associated with the FDD cell is transmitted in the terminal device 2 is determined in accordance with the downlink reference UL-DL configuration.

Only when the primary cell is a TDD cell, the field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order. When the primary cell is not a TDD cell, the field of the DAI is not provided in the DCI.

The 2-bit field may be reserved in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells in which the UL-DL configuration is configured so as to be 0.

In a case where one serving cell is configured in the terminal device 2, or in a case where serving cells of which the number is more than one are configured in the terminal device 2, and UD-DL configurations of all serving cells are the same as each other, the field of the DAI is applied to a serving cell in which the UL-DL configuration is configured so as to be (1-6). In a case where serving cells of which the number is more than one are configured in the terminal device 2, and at least two serving cells have UL-DL configurations different from each other, or in a case where at least one serving cell is an FDD cell, the DAI field is applied to a serving cell in which the downlink reference UL-DL configuration is configured so as to be (1-6). In other words, in a case where one serving cell is configured in the terminal device 2, or in a case where serving cells of which the number is more than one are configured in the terminal device 2, and UD-DL configurations of all serving cells are the same as each other, the field of the DAI is not applied to a serving cell in which the UL-DL configuration is configured so as to be 0. In a case where serving cells of which the number is more than one are configured in the terminal device 2, and at least two serving cells have UL-DL configurations different from each other, or in a case where at least one serving cell is an FDD cell, the DAI field is not applied to a serving cell in which the downlink reference UL-DL configuration is configured so as to be 0.

The 2-bit field of the DAI is provided for a TDD cell in the DCI transmitted by DCI format 1A in which CRC is scrambled by the RA-RNTI, the P-RNTI, or the SI-RNTI.

The field of the DAI is not provided for an FDD cell in the DCI transmitted by DCI format 1A in which CRC is scrambled by the RA-RNTI, the P-RNTI, or the SI-RNTI.

Only when the primary cell is a TDD cell, the 2-bit field of the DAI is provided for a serving cell in the DCI transmitted by DCI format 0/4. When the primary cell is not a TDD cell, the field of the DAI is not provided in the DCI transmitted by DCI format 0/4.

In a case where one TDD cell is configured in the terminal device 2, or in a case where TDD cells of which the number is more than one are configured in the terminal device 2, and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to a serving cell in which the uplink reference UL-DL configuration is configured so as to be (1-6).

An example of a combination of the presence of the field of the DAI included in the DCI relating to the downlink grant or the uplink grant, and the application of the DAI will be described.

In a case where one TDD cell is configured in the terminal device 2, and in a case where serving cells of which the number is more than one are configured in the terminal device 2, and all serving cells are TDD cells, the base station apparatus 1 configures the DAI field in the DCI included in a PDCCH/EPDCCH which is transmitted in association with the TDD cell. In a case where the TDD-FDD-CA configuration is configured in the terminal device 2 by a higher layer, and at least one is configured as an FDD cell, the base station apparatus 1 configures the DAI field in the DCI included in a PDCCH/EPDCCH which is allocated and transmitted in an USS which is associated with the FDD cell.

The TDD-FDD-CA configuration is a configuration in which frame constitution types of at least two serving cells are allowed to be different from each other in the terminal device 2.

The field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order. The DCI is assigned in an USS for TDD cells by all UL-DL configurations or an FDD cell in which a TDD-FDD-CA configuration is configured in a higher layer.

Thus, in a case where one serving cell is configured in the terminal device 2, or in a case where serving cells of which the number is more than one are configured in the terminal device 2, and UD-DL configurations of all serving cells are the same as each other, the field of the DAI is applied only to a serving cell in which the UL-DL configuration is configured so as to be (1-6). In a case where serving cells of which the number is more than one are configured in the terminal device 2, and at least two serving cells have UL-DL configurations different from each other, or in a case where at least one secondary cell is an FDD cell, the DAI field is applied to an FDD cell or a TDD cell in which the downlink reference UL-DL configuration is configured so as to be (1-6). In other words, in a case where one serving cell is configured in the terminal device 2, or in a case where serving cells of which the number is more than one are configured in the terminal device 2, and UD-DL configurations of all serving cells are the same as each other, the field of the DAI is not applied to a serving cell in which the UL-DL configuration is configured so as to be 0. In a case where serving cells of which the number is more than one are configured in the terminal device 2, and at least two serving cells have UL-DL configurations different from each other, the DAI field is not applied to a serving cell in which the downlink reference UL-DL configuration is configured so as to be 0.

Thus, the TDD-FDD-CA configuration is not configured in the higher layer, and the field of the DAI is not provided in the DCI transmitted to the FDD cell.

The 2-bit field of the DAI is provided for a TDD cell in the DCI transmitted by DCI format 1A in which CRC is scrambled by the RA-RNTI, the P-RNTI, or the SI-RNTI.

The field of the DAI is not provided for an FDD cell in the DCI transmitted by DCI format 1A in which CRC is scrambled by the RA-RNTI, the P-RNTI, or the SI-RNTI.

The 2-bit field of the DAI is provided for TDD cells in which the UL-DL configuration is configured so as to be (1-6) in the DCI or is provided in the DCI transmitted by DCI format 0/4, which is assigned in the USS of the FDD cell in which the TDD-FDD-CA configuration is configured in the higher layer.

The field of the DAI is not provided in the DCI transmitted by DCI format 0/4, for TDD cells in which the UL-DL configuration is configured so as to be 0, or for FDD cells in which the TDD-FDD-CA configuration is not configured in the higher layer.

An example of a combination of the presence of the field of the DAI included in the DCI relating to the downlink grant or the uplink grant, and the application of the DAI will be described.

In a case where the configuring of allowing the PUCCH to be transmitted in the secondary cell is not performed by the higher layer, and further in a case where one TDD cell is configured in the terminal device 2, or in a case where serving cells of which the number is more than one are configured in the terminal device 2, and the primary cell is a TDD cell, the base station apparatus 1 configures the DAI field in the DCI included in a PDCCH/EPDCCH which is transmitted in association with the TDD cell and the FDD cell. In other words, in a case where configuring of allowing the PUCCH to be transmitted in the secondary cell is performed by the higher layer, the base station apparatus 1 does not configure the DAI field in the DCI included in a PDCCH/EPDCCH which is transmitted in association with the FDD cell.

The 2-bit field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells by all UL-DL configurations or for FDD secondary cells (FDD cells aggregated in the TDD primary cell) in which configuring of a PUCCH being transmitted in the FDD secondary cell is not performed by the higher layer, and the primary cell is operated by TDD.

In a case where one TDD cell is configured in the terminal device 2, or in a case where TDD cells of which the number is more than one are configured in the terminal device 2 and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the downlink reference UL-DL configuration is configured so as to be (1-6). In other words, in a case where one TDD cell is configured in the terminal device 2, or in a case where serving cells of which the number is more than one are configured in the terminal device 2, and UD-DL configurations of all serving cells are the same as each other, the field of the DAI is not applied to a serving cell in which the UL-DL configuration is configured so as to be 0. In a case where serving cells of which the number is more than one are configured in the terminal device 2, and at least two serving cells have UL-DL configurations different from each other, the DAI field is not applied to a serving cell in which the downlink reference UL-DL configuration is configured so as to be 0.

In a case where configuring of a PUCCH being transmitted in the FDD secondary cell is performed by the higher layer, the field of the DAI is not provided in the DCI transmitted to the FDD cell.

The 2-bit field of the DAI is provided for a TDD cell in the DCI transmitted by DCI format 1A in which CRC is scrambled by the RA-RNTI, the P-RNTI, or the SI-RNTI.

The field of the DAI is not provided for an FDD cell in the DCI transmitted by DCI format 1A in which CRC is scrambled by the RA-RNTI, the P-RNTI, or the SI-RNTI.

In a case where configuring of a PUCCH being transmitted in the FDD secondary cell is not performed by the higher layer, a 2-bit field of the DAI is provided in the DCI transmitted by DCI format 0/4, for FDD secondary cells (FDD cell aggregated in the TDD primary cell) in which the primary cell is operated by TDD, or for TDD cells in which the UL-DL configuration is configured so as to be (1-6).

Thus, in a case where one TDD cell is configured in the terminal device 2, or in a case where TDD cells of which the number is more than one are configured in the terminal device 2, and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the uplink reference UL-DL configuration is configured so as to be (1-6).

in a case where configuring of a PUCCH being transmitted in the FDD secondary cell is performed by the higher layer, the field of the DAI is not provided in the DCI transmitted by DCI format 0/4 for an FDD cell and a TDD cell in which the UL-DL configuration is configured so as to be 0.

An example of a combination of the presence of the field of the DAI included in the DCI relating to the downlink grant or the uplink grant, and the application of the DAI will be described.

In a case where a PUCCH including HARQ response information is configured so as to be allowed to be transmitted in the uplink subframe of the FDD secondary cell, and in a case where the PUCCH including the DAI for the TDD cell or the PUCCH including HARQ response information is not configured so as to be allowed to be transmitted in the uplink subframe of the FDD secondary cell, when the primary cell is a TDD cell, the PUCCH is transmitted with including the DAI for a serving cell (FDD cell, TDD cell).

That is, in a case where configuring of allowing the PUCCH to be transmitted in the secondary cell is not performed by the higher layer, in a case where one TDD cell is configured in the terminal device 2, or in a case where serving cells of which the number is more than one are configured in the terminal device 2, and the primary cell is a TDD cell, the base station apparatus 1 configures the DAI field in the DCI included in a PDCCH/EPDCCH which is transmitted in association with the serving cell (FDD cell, TDD cell).

The 2-bit field of the DAI is provided in the DCI transmitted by DCI format 1/1B/1D/2/2A/2B/2C/2D or DCI format 1A used for compact scheduling of a code word for one PDSCH in a certain cell, and a random access procedure which is initialized by a PDCCH order, for TDD cells in which configuring of a PUCCH being transmitted in the FDD secondary cell is performed by the higher layer, or for serving cells (FDD cells or TDD cells) in which configuring of a PUCCH being transmitted in the FDD secondary cell is not performed by the higher layer, and the primary cell is a TDD cell.

In a case where one TDD cell is configured in the terminal device 2, or in a case where TDD cells of which the number is more than one are configured in the terminal device 2 and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the downlink reference UL-DL configuration is configured so as to be (1-6). In other words, in a case where one TDD cell is configured in the terminal device 2, or in a case where serving cells of which the number is more than one are configured in the terminal device 2, and UD-DL configurations of all serving cells are the same as each other, the field of the DAI is not applied to a serving cell in which the UL-DL configuration is configured so as to be 0. In a case where serving cells of which the number is more than one are configured in the terminal device 2, and at least two serving cells have UL-DL configurations different from each other, the DAI field is not applied to a serving cell in which the downlink reference UL-DL configuration is configured so as to be 0.

The field of the DAI is not provided in the DCI transmitted to the FDD cell in which configuring of a PUCCH being transmitted in the secondary cell is not performed by the higher layer, or to a serving cell in which transmission of a PUCCH in the secondary cell is not configured by the higher layer, and the primary cell is not a TDD cell.

The 2-bit field of the DAI is provided for a TDD cell in the DCI transmitted by DCI format 1A in which CRC is scrambled by the RA-RNTI, the P-RNTI, or the SI-RNTI.

The field of the DAI is not provided for an FDD cell in the DCI transmitted by DCI format 1A in which CRC is scrambled by the RA-RNTI, the P-RNTI, or the SI-RNTI.

In a case where configuring of a PUCCH being transmitted in the FDD secondary cell is performed by the higher layer, a 2-bit field of the DAI is provided in the DCI transmitted by DCI format 0/4, for TDD cells in which the UL-DL configuration is configured so as to be (1-6).

In a case where one TDD cell is configured in the terminal device 2, or in a case where TDD cells of which the number is more than one are configured in the terminal device 2, and UD-DL configurations of all TDD cells are the same as each other, the field of the DAI is applied to a serving cell in which the UL-DL configuration is configured so as to be (1-6). In a case where serving cells of which the number is more than one are configured in the terminal device 2, and at least two TDD cells have UL-DL configurations different from each other, or in a case where at least one serving cell is an FDD cell, the DAI field is applied to an FDD cell or a TDD cell in which the uplink reference UL-DL configuration is configured so as to be (1-6).

In a case where configuring of a PUCCH being transmitted in the FDD secondary cell is performed by the higher layer, the field of the DAI is not provided in the DCI transmitted by DCI format 0/4, for TDD cells in which the UL-DL configuration is configured so as to be 0 and FDD cells.

In a case where carrier aggregation is performed between the TDD cell and the FDD cell, a field having three bits or more may be configured in the DAI of which notification is performed with being included in the uplink grant. A field having three bits or more may be configured in the DAI of which notification is performed with being included in the downlink grant.

An example of using the DAI will be described.

In the configured serving cell, in a case where the downlink reference UL-DL configuration is 0, the DAI included in DCI format 1/1A/1B/1D/2/2A/2B/2C/2D is not used. In the configured serving cell, in a case where the uplink reference UL-DL configuration is 0, the DAI included in DCI format 0/4 is not used.

An example of using the DAI will be described.

In the configured serving cell, in a case where the downlink reference UL-DL configuration of the TDD primary cell is 0, the DAI included in DCI format 1/1A/1B/1D/2/2A/2B/2C/2D is not used. In the configured serving cell, in a case where the uplink reference UL-DL configuration of the TDD primary cell is 0, the DAI included in DCI format 0/4 is not used.

An example of using the DAI will be described.

In the configured serving cell, in a case where the primary cell is an FDD cell or the downlink reference UL-DL configuration of the serving cell is 0, the DAI included in DCI format 1/1A/1B/1D/2/2A/2B/2C/2D is not used. In the configured serving cell, in a case where the primary cell is an FDD cell, or the uplink reference UL-DL configuration of the serving cell is 0, the DAI included in DCI format 0/4 is not used.

An example of using the DAI will be described.

In the configured serving cell, in a case where the primary cell is an FDD cell or the downlink reference UL-DL configuration of the TDD primary cell is 0, the DAI included in DCI format 1/1A/1B/1D/2/2A/2B/2C/2D is not used. In the configured serving cell, in a case where the primary cell is an FDD cell, or the uplink reference UL-DL configuration of the TDD primary cell is 0, the DAI included in DCI format 0/4 is not used.

In the TDD cell, the value of the DAI of which notification is performed with being included in the uplink grant is used for determining $V^{UL}_{DAI}$ and $W^{UL}_{DAI}$. In a case where PUCCH format 3 is not configured in the terminal device 2 in which one TDD serving cell is configured, $V^{UL}_{DAI}$ is determined by using the value of the DAI of which notification is performed with being included in the uplink grant. In a case where serving cells of which the number is more than one are configured in the terminal device 2, or in a case where one serving cell and PUCCH format 3 is configured in the terminal device 2, $W^{UL}_{DAI}$ is determined by using the value of the DAI of which notification is performed with being included in the uplink grant.

The base station apparatus 1 transmits the uplink grant including the DAI, in accordance with the table in FIG. 13. FIG. 13 illustrates an example of an uplink association index. An uplink association index k' is defined by using the table in FIG. 13. In a case where the uplink grant including the DAI is transmitted in the subframe n, a PUSCH is transmitted in a subframe (n+k'). In a case where the terminal device 2 transmits HARQ response information in the subframe in which the PUSCH is transmitted, the HARQ response information is constituted by using the information of the DAI, and is transmitted in the PUSCH.

That is, in a serving cell in which the TDD UL-DL configuration is configured so as to one of 1 to 6, in a case where PUCCH format 3 is not configured in the terminal device 2, the value $V^{UL}_{DAI}$ of the DAI is detected by the terminal device 2 in a subframe (n−k'), and the value $V^{UL}_{DAI}$ of the DAI included in DCI format 0/4 indicates the total number of subframes including a PDCCH/EPDCCH which indicates PDSCH transmission corresponding to the terminal device 2, and indicates the release of downlink SPS, among all subframes (n−k). Here, k' is defined in the table in FIG. 13, and k belongs to K (k∈K). The value of $V^{UL}_{DAI}$ includes the total number of times of performing PDSCH transmission corresponding to the PDCCH/EPDCCH and performing PDSCH transmission which does not correspond to the PDCCH/EPDCCH, in all subframes. In a case where both of PDCCH/EPDCCH indicating PDSCH transmission for instructing the terminal device 2, and the release of downlink SPS resources are none, the terminal device 2 can expect that the value of the DAI in the transmitted DCI format is set to 4.

That is, in a TDD cell in which serving cells of which the number is more than one are configured in the terminal device 2, and the TDD UL-DL configuration is from 1 to 6, or in a TDD cell in which one serving cell and PUCCH format 3 are configured in the terminal device 2, and the TDD UL-DL configuration is from 1 to 6, the value of $W^{UL}_{DAI}$ is determined by the DAI in DCI format 0/4 in the subframe (n−k'). Here, k' is defined in the table of FIG. 13. In a case where both of PDCCH/EPDCCH indicating PDSCH transmission for instructing the terminal device 2, and the release of downlink SPS resources are none, the terminal device 2 can expect that $W^{UL}_{DAI}$ is set to 4 by the DAI in the transmitted DCI format.

That is, in a case where the uplink reference UL-DL configuration of a certain serving cell belongs to any of {1, 2, 3, 4, 5, 6}, the value of $W^{UL}_{DAI}$ is determined by the DAI in DCI format 0/4 which corresponds to the PUSCH transmitted in the serving cell, and is transmitted in the subframe (n−k'). Here, k' is defined in the table in FIG. 13, and the TDD UL-DL configuration in the table of FIG. 13 refers to the uplink reference UL-DL configuration of the serving cell. In a case where both of PDCCH/EPDCCH indicating PDSCH transmission for instructing the terminal device 2, and the release of downlink SPS resources are none, the terminal device 2 can expect that $W^{UL}_{DAI}$ is set to 4 by the DAI in the transmitted DCI format.

In the following descriptions, determination of $W^{UL}_{DAI}$ in a case where a plurality of cells to which different frame structure types are applied will be described.

In a case where the primary cell is the TDD cell, even in the FDD cell, $W^{UL}_{DAI}$ may be set by the value of the DAI included in the uplink grant.

An example in a case where the DAI field may be configured in a serving cell only in a case of being the TDD primary cell, and the uplink reference UL-DL configuration is configured in the FDD cell will be described.

In a case where the primary cell is the TDD cell, and the uplink reference UL-DL configuration of a certain serving cell belongs to any of {1, 2, 3, 4, 5, 6}, the value of $W^{UL}_{DAI}$ is determined by the DAI in DCI format 0/4 which corresponds to the PUSCH transmitted in the serving cell, and is transmitted in the subframe (n−k'). Here, k' is defined in the table of FIG. 13, and the TDD UL-DL configuration in the table of FIG. 13 refers to the uplink reference UL-DL configuration of the serving cell. In a case where both of PDCCH/EPDCCH indicating PDSCH transmission for instructing the terminal device 2, and the release of downlink SPS resources are none, the terminal device 2 can expect that $W^{UL}_{DAI}$ is set to 4 by the DAI in the transmitted DCI format.

An example in a case where the DAI field may be configured in a serving cell only in a case of being the TDD primary cell, and the uplink reference UL-DL configuration is not configured in the FDD cell will be described.

In a case where the primary cell is the TDD cell, and the uplink reference UL-DL configuration of a certain configured TDD cell belongs to any of {1, 2, 3, 4, 5, 6}, the value of $W^{UL}_{DAI}$ is determined by the DAI in DCI format 0/4 which corresponds to the PUSCH transmitted in the TDD cell, and is transmitted in the subframe (n−k'), or is determined by the DAI in DCI format 0/4 which corresponds to the PUSCH transmitted in the FDD cell, and is transmitted in the subframe (n−4). Here, k' is defined in the table of FIG. 13, and the TDD UL-DL configuration in the table of FIG. 13 refers to the uplink reference UL-DL configuration of the TDD cell. In a case where both of PDCCH/EPDCCH indicating PDSCH transmission for instructing the terminal device 2, and the release of downlink SPS resources are none, the terminal device 2 can expect that $W^{UL}_{DAI}$ is set to 4 by the DAI in the transmitted DCI format.

An example in a case where the DAI field may be configured for the FDD secondary cell configured in the TDD cell and the TDD primary cell, and the uplink reference UL-DL configuration is configured in the FDD cell will be described.

In the FDD secondary cell aggregated with the TDD cell or the TDD primary cell, in a case where the uplink reference UL-DL configuration of a certain serving cell belongs to any of {1, 2, 3, 4, 5, 6}, the value of $W^{UL}_{DAI}$ is determined by the DAI in DCI format 0/4 which corresponds to the PUSCH transmitted in the serving cell, and is transmitted in the subframe (n−k'). Here, k' is defined in the table of FIG. 13, and the TDD UL-DL configuration in the table of FIG. 13 refers to the uplink reference UL-DL configuration of the serving cell. In a case where both of PDCCH/EPDCCH indicating PDSCH transmission for instructing the terminal device 2, and the release of downlink SPS resources are none, the terminal device 2 can expect that $W^{UL}_{DAI}$ is set to 4 by the DAI in the transmitted DCI format.

An example in a case where the DAI field may be configured for the FDD secondary cell configured in the TDD cell and the TDD primary cell, and the uplink reference UL-DL configuration is not configured in the FDD cell will be described.

In the TDD cell or the FDD secondary cell aggregated with the TDD primary cell, in a case where the uplink reference UL-DL configuration of a certain TDD cell belongs to any of {1, 2, 3, 4, 5, 6}, the value of $W^{UL}_{DAI}$ is determined by the DAI in DCI format 0/4 which corresponds to the PUSCH transmitted on the TDD cell and is transmitted in the subframe (n−k'), or by the DAI in DCI format 0/4 which corresponds to the PUSCH transmitted on the FDD cell and is transmitted in the subframe (n−4). Here, k' is defined in the table of FIG. 13, and the TDD UL-DL configuration in the table of FIG. 13 refers to the uplink reference UL-DL configuration of the TDD cell. In a case neither PDSCH transmission nor PDCCH/EPDCCH indicating the downlink SPS resource release is intended to the terminal device 2, the terminal device 2 can expect that $W^{UL}_{DAI}$ is set to 4 by the DAI in the transmitted DCI format.

In the TDD cell, the value of the DAI of which notification is performed with being included in the downlink grant is used for determining $V^{DL}_{DAI}$.

In a TDD cell in which the TDD UL-DL configuration is from 1 to 6 in a case where one TDD cell or two or more TDD cells having the same TDD UL-DL configuration are configured in the terminal device 2, or in a TDD cell in which the downlink reference UL-DL configuration belongs to any of {1, 2, 3, 4, 5, 6} in a case where two or more TDD cell are configured in the terminal device 2 and at least two TDD cells have TDD UL-DL configurations different from each other, the value of the DAI included in DCI format 1/1A/1B/1D/2/2A/2B/2C/2D indicates the accumulated number of PDCCHs or EPDCCHs indicating PDSCH transmission or the release of downlink semi-persistent scheduling (SPS) in subframes until now among subframes (n−k) in each configured serving cell. The value of the DAI is updated for each subframe. $V^{DL}_{DAI,c}$ is indicated as the value of the DAI in a PDCCH/EPDCCH which is transmitted with appending DCI format 1/1A/1B/1D/2/2A/2B/2C/2D detected by the terminal device 2 in a subframe (n−$k_m$) in a serving cell c. Here, $k_m$ is the minimum value among $k_m$ detected in the set K defined in the table in FIG. 6, by the terminal device 2 and by using 1/1A/1B/1D/2/2A/2B/2C/2D. In a case where one serving cell is configured, the mark of c in $V^{DL}_{DAI,c}$ may be deleted.

In the following descriptions, determination of $V^{DL}_{DAI,c}$ in a case where a plurality of cells to which different frame structure types are applied will be described.

In a case where the primary cell is the TDD cell, even in the FDD cell, $V^{DL}_{DAI,c}$ may also be set by the value of the DAI included in the downlink grant.

An example in a case where the DAI field may be configured in a serving cell only in a case of being the TDD primary cell, and a table defining the downlink association set is dedicatedly configured in the TDD cell and the FDD cell will be described.

In a case where the primary cell is a TDD cell, in an FDD cell or a TDD cell in which the downlink reference UL-DL configuration is from 1 to 6, the value of the DAI included in DCI format 1/1A/1B/1D/2/2A/2B/2C/2D indicates the accumulated number of PDCCHs or EPDCCHs indicating PDSCH transmission or the release of downlink semi-persistent scheduling (SPS) in subframes until now among subframes (n−k) in each configured serving cell. The value of the DAI is updated for each subframe. $V^{DL}_{DAI,c}$ is indicated as the value of the DAI in a PDCCH/EPDCCH which is transmitted with appending DCI format 1/1A/1B/1D/2/2A/2B/2C/2D detected by the terminal device 2 in a subframe (n−$k_m$) in a serving cell c. Here, $k_m$ is the minimum value among $k_m$ detected in the set K defined in the table in FIG. 9 in the FDD cell, and in the set K defined in the table in FIG. 6 in the TDD cell, by the terminal device 2 and by using 1/1A/1B/1D/2/2A/2B/2C/2D.

An example in a case where the DAI field may be configured for the FDD secondary cell configured in the TDD cell and the TDD primary cell, and a table defining the downlink association set is dedicatedly configured in the TDD cell and the FDD cell will be described.

In the FDD secondary cell aggregated with the TDD primary cell or in the TDD cell in which the downlink reference UL-DL configuration is from 1 to 6, the value of the DAI included in DCI format 1/1A/1B/1D/2/2A/2B/2C/2D indicates the accumulated number of PDCCHs or EPDCCHs indicating PDSCH transmission or the release of downlink semi-persistent scheduling (SPS) in subframes until now among subframes (n−k) in each configured serving cell. The value of the DAI is updated for each subframe. $V^{DL}_{DAI,c}$ is indicated as the value of the DAI in a PDCCH/EPDCCH which is transmitted with appending DCI format 1/1A/1B/1D/2/2A/2B/2C/2D detected by the terminal device 2 in a subframe (n−$k_m$) in a serving cell c. Here, $k_m$ is the minimum value among $k_m$ detected in the set K defined in the table in FIG. 9 in the FDD cell, and in the set K defined in the table in FIG. 6 in the TDD cell, by the terminal device 2 and by using 1/1A/1B/1D/2/2A/2B/2C/2D.

An example in a case where the DAI field may be configured in a serving cell only in a case of being the TDD primary cell, and a table defining the downlink association set is commonly configured in the TDD cell and the FDD cell will be described.

In a case where the primary cell is a TDD cell, in an FDD cell or a TDD cell in which the downlink reference UL-DL configuration is from 1 to 6, the value of the DAI included in DCI format 1/1A/1B/1D/2/2A/2B/2C/2D indicates the accumulated number of PDCCHs or EPDCCHs indicating PDSCH transmission or the release of downlink semi-persistent scheduling (SPS) in subframes until now among subframes (n−k) in each configured serving cell. The value of the DAI is updated for each subframe. $V^{DL}_{DAI,c}$ is indicated as the value of the DAI in a PDCCH/EPDCCH which is transmitted with appending DCI format 1/1A/1B/1D/2/2A/2B/2C/2D detected by the terminal device 2 in a subframe (n−$k_m$) in a serving cell c. Here, $k_m$ is the minimum value among $k_m$ detected in the set K defined in the table in FIG. 6, by the terminal device 2 and by using 1/1A/1B/1D/2/2A/2B/2C/2D.

An example in a case where the DAI field may be configured for the FDD secondary cell configured in the TDD cell and the TDD primary cell, and a table defining the downlink association set is commonly configured in the TDD cell and the FDD cell will be described.

In the FDD secondary cell aggregated with the TDD primary cell or in the TDD cell in which the downlink reference UL-DL configuration is from 1 to 6, the value of the DAI included in DCI format 1/1A/1B/1D/2/2A/2B/2C/2D indicates the accumulated number of PDCCHs or EPDCCHs indicating PDSCH transmission or the release of downlink semi-persistent scheduling (SPS) in subframes until now among subframes (n–k) in each configured serving cell. The value of the DAI is updated for each subframe. $V^{DL}_{DAI,c}$ is indicated as the value of the DAI in a PDCCH/EPDCCH which is transmitted with appending DCI format 1/1A/1B/1D/2/2A/2B/2C/2D detected by the terminal device 2 in a subframe (n–$k_m$) in a serving cell c. Here, $k_m$ is the minimum value among $k_m$ detected in the set K defined in the table in FIG. 6, by the terminal device 2 and by using 1/1A/1B/1D/2/2A/2B/2C/2D.

In TDD, $U_{DAI,c}$ indicates the total number of PDCCHs/EPDCCHs for assigning PDSCH transmission in TDD serving cells, and PDCCHs/EPDCCHs indicating the release of downlink SPS, and $U_{DAI,c}$ is configured.

That is, in all TDD cells having a TDD UL-DL configuration, $U_{DAI,c}$ indicates the total number of PDCCHs/EPDCCHs for assigning PDSCH transmission, which are detected by the terminal device 2 in the subframes (n–k) of the subframe c, and PDCCHs/EPDCCHs indicating the release of downlink SPS. Here, k belongs to K (k∈K). $N_{SPS}$ indicates the number of times of performing PDSCH transmission without accordance with the PDCCH/EPDCCH in the subframes (n–k). $N_{SPS}$ has a value of 0 or 1. Here, k belongs to K (k∈K).

In the following descriptions, determination of $U_{DAI,c}$ in a case where a plurality of cells to which different frame structure types are applied will be described.

An example in a case where the DAI field is configured in a serving cell only in a case of being the TDD primary cell will be described.

In all TDD cells having a TDD UL-DL configuration, $U_{DAI,c}$ indicates the total number of PDCCHs/EPDCCHs for assigning PDSCH transmission, which are detected by the terminal device 2 in the subframes (n–k) of the subframe c, and PDCCHs/EPDCCHs indicating the release of downlink SPS. Here, k belongs to K (k∈K). $N_{SPS}$ indicates the number of times of performing PDSCH transmission without accordance with the PDCCH/EPDCCH in the subframes (n–k). $N_{SPS}$ has a value of 0 or 1. Here, k belongs to K (k∈K).

In a serving cell, in a case where the primary cell is a TDD cell, $U_{DAI,c}$ indicates the total number of PDCCHs/EPDCCHs for assigning PDSCH transmission, which are detected by the terminal device 2 in the subframes (n–k) of the subframe c, and PDCCHs/EPDCCHs indicating the release of downlink SPS. Here, k belongs to K (k∈K). $N_{SPS}$ indicates the number of times of performing PDSCH transmission without accordance with the PDCCH/EPDCCH in the subframes (n–k). $N_{SPS}$ has a value of 0 or 1. Here, k belongs to K (k∈K).

An example in a case where the DAI field is configured for the FDD secondary cell configured in the TDD cell and the TDD primary cell will be described.

In the TDD cell or in the FDD secondary cell aggregated with the TDD primary cell, $U_{DAI,c}$ indicates the total number of PDCCHs/EPDCCHs for assigning PDSCH transmission, which are detected by the terminal device 2 in the subframes (n–k) of the subframe c, and PDCCHs/EPDCCHs indicating the release of downlink SPS. Here, k belongs to K (k∈K). $N_{SPS}$ indicates the number of times of performing PDSCH transmission without accordance with the PDCCH/EPDCCH in the subframes (n–k). $N_{SPS}$ has a value of 0 or 1. Here, k belongs to K (k∈K).

In the following descriptions, a constitution of one or a plurality of HARQ-ACK feedback bits {$O^{ACK}_{c,0}, O^{ACK}_{c,1}, \ldots, O^{ACK}_{c,OACKc-1}$} (HARQ-ACK feedback bit string) in a case where PUCCH format 3 is configured for transmitting HARQ response information will be described.

The number of bits of the HARQ-ACK feedback bits is determined based on the value of the DAI included in the uplink grant.

Assignment of the HARQ-ACK feedback bit is determined based on the value of the DAI included in the downlink grant.

A terminal communicates with a base station by using an FDD cell and a TDD cell, the terminal includes a reception unit that performs reception on the transmitted PDCCH by using a first DCI format or a second DCI format. In a case where the total number of cells of FDD and cells of TDD is set in the base station, a first DAI indicates the accumulated number of PDCCHs or EPDCCHs indicating PDSCH transmission or the release of downlink semi-persistent scheduling in subframes until now in a predetermined subframe. The first DAI is received with being included in the first DCI format. The first DAI is used for determining PDSCH transmission in the FDD cell, or for determining the HARQ-ACK feedback bits corresponding to the PDCCH or the EPDCCH. A second DAI different from the first DAI is received with being included in the second DCI format. The second DAI is used for determining the size of the HARQ-ACK feedback bits in the FDD cell. The HARQ response information is transmitted by using PUCCH format 3. The TDD cell is the primary cell, and the FDD cell is the secondary cell. A table of defining the downlink association set in the TDD cell is different from a table of defining the downlink association set in the FDD cell. The first DAI is used in all downlink reference uplink-downlink configurations in the FDD cell.

In a case where PUCCH format 3 is configured for transmitting the HARQ response information, the HARQ-ACK feedback bits {$O^{ACK}_{c,0}, O^{ACK}_{c,1}, \ldots, O^{ACK}_{c,OACKc-1}$} for the c-th serving cell which is configured by RRC are constructed under the following conditions. c is 0 or more than 0. In a case where the transmission mode configured in the c-th serving cell supports one transport block or spatial HARQ response information bundling is applied, $O^{ACK}_c$ is equal to $B^{DL}_c$ ($O^{ACK}_c = B^{DL}_c$). In other cases, $O^{ACK}_c$ is equal to twice $B^{DL}_c$ ($O^{ACK}_c = 2B^{DL}_c$). Here, $B^{DL}_c$ is the number of downlink subframes required for causing the terminal device 2 to perform feedback of a HARQ response information bit to the c-th serving cell.

In the following descriptions, determination of $B^{DL}_c$ in a case where one TDD cell is configured in the terminal device 2 or two or more TDD cells are configured and TDD UL-DL configurations of all TDD cells are the same as each other will be described.

In the subframe n, in a case where HARQ response information is transmitted on the PUCCH, the PUSCH which does not correspond to the DCI format is transmitted, or the PUSCH corresponding to the DCI format is transmitted in a serving cell in which the TDD UL-DL configuration is 0, the expression (a-1) in FIG. 14 is applied. In a case where the PUSCH corresponding to the DCI format is transmitted in a serving cell in which the TDD UL-DL configuration is configured so as to be any of 1 to 6, the expression (a-2) in FIG. 14 is applied. In a case where the PUSCH corresponding to the DCI format is transmitted in a serving cell in which the TDD UL-DL configuration is configured so as to be from 1 to 6, the expression (a-3) in FIG. 14 is applied.

In a case where the terminal device 2 performs transmission on the PUCCH, $B^{DL}_c$ is equal to M (expression (a-1) in FIG. 14).

In a TDD cell having the TDD UL-DL configuration 0, or a PUSCH which has not been adjusted based on DCI format 0/4 which is detected with association, $B^{DL}_c$ is equal to $M_c$ (expression (a-1) in FIG. 14). In a case where the terminal device 2 does not receive a PDSCH or a PDCCH/EPDCCH indicating the release of downlink SPS in the subframe (n–k), the terminal device 2 does not transmit the HARQ response information on the PUSCH. Here, k belongs to K (k∈K).

In a TDD cell in which the TDD UL-DL configuration corresponds to any of {0, 1, 2, 3, 4, 6}, or for PUSCH transmission of the subframe n, which is adjusted based on the detected PDCCH/EPDCCH, and appends DCI format 0/4, the terminal device 2 assumes that $W^{UL}_{DAI}$ is substituted with $S^{DL}_c$ (expression (a-2) in FIG. 14). In a case where $W^{UL}_{DAI}$ is 4 ($W^{UL}_{DAI}=4$), and the terminal device 2 does not receive a PDSCH or a PDCCH/EPDCCH indicating the release of downlink SPS in the subframe (n–k), the terminal device 2 does not transmit HARQ-ACK on the PUSCH. Here, k belongs to K (k∈K).

In a TDD cell having the TDD UL-DL configuration 5, or in PUSCH transmission of the subframe n, which is adjusted based on the detected PDCCH/EPDCCH, and appends DCI format 0/4, the terminal device 2 assumes that the decimal point of a value which is obtained by dividing a difference between U and $W^{UL}_{DAI}$ by 4, is rolled in a positive infinite direction, the value obtained by rolling is multiplied by 4, and a value obtained by adding $W^{UL}_{DAI}$ to the value which is obtained by multiplication is substituted with $B^{DL}_c$ (expression (a-3) in FIG. 14). Here, U indicates the maximum value of $U_c$ in all configured serving cell, and $U_c$ is the total number of PDSCHs received in the subframe (n–k) of the c-th serving cell which is determined by k belonging to the set K, and PDCCHs/EPDCCHs indicating the release of downlink SPS. In a case where $W^{UL}_{DAI}$ is 4 ($W^{UL}_{DAI}=4$), and the terminal device 2 does not receive both of the PDSCH and the PDCCH/EPDCCH indicating the release of downlink SPS, in the subframe (n–k), the terminal device 2 does not transmit HARQ-ACK by using the PUSCH.

In the following descriptions, determination of $B^{DL}_c$ in a case where two or more TDD cells are configured in the terminal device 2 and at least two TDD cells have TDD UL-DL configurations different from each other will be described.

In the subframe n, in a case where HARQ response information is transmitted on a PUCCH, a PUSCH which does not correspond to the DCI format is transmitted, or a PUSCH corresponding to the DCI format is transmitted in a serving cell in which the uplink reference UL-DL configuration is 0, the expression (b-1) in FIG. 14 is applied. In a case where a PUSCH corresponding to the DCI format is transmitted in a serving cell in which the uplink reference UL-DL configuration is configured so as to be from 1 to 6, and the downlink reference UL-DL configuration is configured so as to be any of 0, 1, 2, 3, 4, and 6, the expression (b-2) in FIG. 14 is applied. In a case where a PUSCH corresponding to the DCI format is transmitted in a serving cell in which the uplink reference UL-DL configuration is configured so as to be from 1 to 6, and the downlink reference UL-DL configuration 5 is configured, the expression (b-3) in FIG. 14 is applied.

That is, in a case where a PUCCH, a PUSCH which is not adjusted based on the detected DCI format 0/4, or a PUSCH adjusted based on the DCI format 0/4 which has the uplink reference UL-DL configuration 0 and is detected with association is transmitted in the subframe n in the terminal device 2, $B^{DL}_c$ is equal to $M_c$ (expression (b-1) in FIG. 14). In a case where the terminal device 2 does not receive a PDSCH or a PDCCH/EPDCCH indicating the release of downlink SPS in the subframe (n–k), the terminal device 2 does not transmit the HARQ response information on the PUSCH. Here, k belongs to K (k∈K).

That is, in a case where the downlink reference UL-DL configuration of each of configured serving cells belongs to any of {0, 1, 2, 3, 4, 6}, in the PUSCH transmission of the subframe n which appends DCI format 0/4 by using a TDD cell in which the uplink reference UL-DL configuration belongs to any of {1, 2, 3, 4, 5, 6}, and is adjusted based on the detected PDCCH/EPDCCH, the terminal device 2 assumes that a value which is small one of $W^{UL}_{DAI}$ and $M_c$, is substituted with $B^{DL}_c$ (expression (b-2) in FIG. 14). In a case where the terminal device 2 does not receive a PDSCH or a PDCCH/EPDCCH indicating the release of downlink SPS in the subframe (n–k), the terminal device 2 does not transmit HARQ-ACK on the PUSCH. Here, k belongs to K (k∈K).

That is, in a case where the downlink reference UL-DL configuration of at least one serving cell is 5, in the PUSCH transmission of the subframe n which appends DCI format 0/4 by using a TDD cell in which the uplink reference UL-DL configuration belongs to any of {1, 2, 3, 4, 5, 6}, and is adjusted based on the detected PDCCH/EPDCCH, the terminal device 2 assumes that the decimal point of a value which is obtained by dividing a difference between U and $W^{UL}_{DAI}$ by 4, is rolled in a positive infinite direction, the value obtained by rolling is multiplied by 4, and a value obtained by adding $W^{UL}_{DAI}$ to the value which is obtained by multiplication is compared to $M_c$, and as a result, the smaller is substituted with $B^{DL}_c$ (expression (b-3) in FIG. 14). Here, U indicates the maximum value of $U_c$ in all configured serving cell, and $U_c$ is the total number of PDSCHs received in the subframe (n–k) of the c-th serving cell which is determined in advance by k belonging to the set K, and PDCCHs/EPDCCHs indicating the release of downlink SPS. In a case where $W^{UL}_{DAI}$ is 4 ($W^{UL}_{DAI}=4$), and the terminal device 2 does not receive both of the PDSCH and the PDCCH/EPDCCH indicating the release of downlink SPS, in the subframe (n–k), the terminal device 2 does not transmit HARQ-ACK by using the PUSCH.

In the following descriptions, determination of $B^{DL}_c$ in a case where two or more serving cells are configured in the terminal device 2 and at least two serving cells have frame constitutions different from each other will be described.

In a case where the primary cell is the TDD cell, even in the FDD cell, the size of the HARQ-ACK feedback bits is determined based on the value of the DAI included in the uplink grant and the value of the downlink association set M.

An example in which an expression to be applied is switched by the downlink reference UL-DL configuration in a case where the DAI field may be configured in a serving cell only in a case of being the TDD primary cell, and a table defining the downlink association set is dedicatedly configured in the TDD cell and the FDD cell will be described.

In a case where the primary cell is a TDD cell, in the subframe n, in a case where HARQ response information is transmitted on a PUCCH, a PUSCH which does not correspond to the DCI format is transmitted, or a PUSCH corresponding to the DCI format is transmitted in a serving cell in which the uplink reference UL-DL configuration is 0, the expression (b-1) in FIG. 14 is applied. In a case where the primary cell is a TDD cell, in the subframe n, the expression (b-2) in FIG. 14 is applied in a case where a PUSCH corresponding to the DCI format is transmitted in an FDD cell in which the uplink reference UL-DL configuration is configured so as to be from 1 to 6, and the downlink reference UL-DL configuration is configured so as to be any of 0, 1, 3, and 6, or in a TDD cell in which the downlink reference UL-DL configuration is configured so as to be any of 0, 1, 2, 3, 4, and 6. In a case where the primary cell is a TDD cell, in the subframe n, the expression (b-3) in FIG. 14 is applied in a case where a PUSCH corresponding to the DCI format is transmitted in an FDD cell in which the uplink reference UL-DL configuration is configured so as to be from 1 to 6, and the downlink reference UL-DL configuration is configured so as to be any of 2, 4, and 5, or in a TDD cell in which the downlink reference UL-DL configuration 5 is configured. In a case where the primary cell is an FDD cell, the expression (b-4) in FIG. 14 is applied.

In a case where the primary cell is a TDD cell, in a case where a PUCCH, a PUSCH which is not adjusted based on the detected DCI format 0/4, or a PUSCH adjusted based on the DCI format 0/4 which has the uplink reference UL-DL configuration 0 and is detected with association is transmitted in the subframe n in the terminal device 2, $B^{DL}_c$ is equal to $M_c$ (expression (b-1) in FIG. 14). In a case where the terminal device 2 does not receive a PDSCH or a PDCCH/EPDCCH indicating the release of downlink SPS in the subframe (n−k), the terminal device 2 does not transmit the HARQ response information on the PUSCH. Here, k belongs to K (k∈K).

In a case where the primary cell is a TDD cell, in a case where the downlink reference UL-DL configuration of each of configured FDD cells belongs to any of {0, 1, 3, 6}, or the downlink reference UL-DL configuration of each of configured TDD cells belongs to any of {0, 1, 2, 3, 4, 6}, in the PUSCH transmission of the subframe n which appends DCI format 0/4 by using a serving cell in which the uplink reference UL-DL configuration belongs to any of {1, 2, 3, 4, 5, 6}, and is adjusted based on the detected PDCCH/EPDCCH, the terminal device 2 assumes that a value which is small one of $W^{UL}_{DAI}$ and $M_c$, is substituted with $B^{DL}_c$ (expression (b-2) in FIG. 14). In a case where the terminal device 2 does not receive a PDSCH or a PDCCH/EPDCCH indicating the release of downlink SPS in the subframe (n−k), the terminal device 2 does not transmit HARQ-ACK on the PUSCH. Here, k belongs to K (k∈K).

In a case where the primary cell is a TDD cell, in a case where the downlink reference UL-DL configuration of at least one FDD cell is {2, 4, 5} or the downlink reference UL-DL configuration of at least one TDD cell is 5, in the PUSCH transmission of the subframe n which appends DCI format 0/4 by using a serving cell in which the uplink reference UL-DL configuration belongs to any of {1, 2, 3, 4, 5, 6}, and is adjusted based on the detected PDCCH/EPDCCH, the terminal device 2 assumes that the decimal point of a value which is obtained by dividing a difference between U and $W^{UL}_{DAI}$ by 4, is rolled in a positive infinite direction, the value obtained by rolling is multiplied by 4, and a value obtained by adding $W^{UL}_{DAI}$ to the value which is obtained by multiplication is compared to $M_c$, and as a result, the smaller is substituted with $B^{BL}_c$ (expression (b-3) in FIG. 14). Here, U indicates the maximum value of $U_c$ in all configured serving cell, and $U_c$ is the total number of PDSCHs received in the subframe (n−k) of the c-th serving cell which is determined in advance by k belonging to the set K, and PDCCHs/EPDCCHs indicating the release of downlink SPS. In a case where $W^{UL}_{DAI}$ is 4 ($W^{UL}_{DAI}$=4), and the terminal device 2 does not receive both of the PDSCH and the PDCCH/EPDCCH indicating the release of downlink SPS, in the subframe (n−k), the terminal device 2 does not transmit HARQ-ACK by using the PUSCH.

In a case where the primary cell is an FDD cell, 1 is substituted with $B^{DL}_c$ (expression (b-4) in FIG. 14). In a case where the terminal device 2 does not receive a PDSCH in a subframe (n−4) or a PDCCH/EPDCCH indicating the release of downlink SPS, the terminal device 2 does not transmit HARQ response information on the PUSCH.

In a case where the primary cell is an FDD cell, $M_c$=1 may be set and the expression (b-1) in FIG. 14 may be applied. In a case where the primary cell is an FDD cell, the expression (b-2) in FIG. 14 may be also applied in a case where the DAI is configured in the TDD secondary cell, and in a case where the primary cell is an FDD cell.

An example in which an expression to be applied is switched by the size of M in a case where the DAI field may be configured in a serving cell only in a case of being the TDD primary cell, and a table defining the downlink association set is dedicatedly configured in the TDD cell and the FDD cell will be described.

In a case where the primary cell is a TDD cell, in the subframe n, in a case where HARQ response information is transmitted on a PUCCH, a PUSCH which does not correspond to the DCI format is transmitted, or a PUSCH corresponding to the DCI format is transmitted in a serving cell in which the uplink reference UL-DL configuration is 0, the expression (b-1) in FIG. 14 is applied. In a case where the primary cell is a TDD cell, in a case where M is equal to or less than 4 in the subframe n, the expression (b-2) in FIG. 14 is applied in a case where a PUSCH corresponding to the DCI format is transmitted in a serving cell in which the uplink reference UL-DL configuration is configured so as to be from 1 to 6. In a case where the primary cell is a TDD cell, in a case where M is equal to or more than 5 in the subframe n, the expression (b-3) in FIG. 14 is applied in a case where a PUSCH corresponding to the DCI format is transmitted in a serving cell in which the uplink reference UL-DL configuration is configured so as to be from 1 to 6, and the downlink reference UL-DL configuration is configured so as to be any of 2, 4, and 5. In a case where the primary cell is an FDD cell, the expression (b-4) in FIG. 14 is applied.

In a case where the primary cell is a TDD cell, in a case where a PUCCH, a PUSCH which is not adjusted based on the detected DCI format 0/4, or a PUSCH adjusted based on the DCI format 0/4 which has the uplink reference UL-DL configuration 0 and is detected with association is transmitted in the subframe n in the terminal device 2, $B^{DL}_c$ is equal to $M_c$ (expression (b-1) in FIG. 14). In a case where the terminal device 2 does not receive a PDSCH or a PDCCH/EPDCCH indicating the release of downlink SPS in the subframe (n−k), the terminal device 2 does not transmit the HARQ response information on the PUSCH. Here, k belongs to K (k∈K).

In a case where the primary cell is a TDD cell, and in a case where $M_c$ is equal to or less than 4 in the PUSCH transmission of the subframe n which appends DCI format 0/4 by using a TDD cell in which the uplink reference UL-DL configuration belongs to any of {1, 2, 3, 4, 5, 6}, and is adjusted based on the detected PDCCH/EPDCCH, the terminal device 2 assumes that a value which is small one of $W^{UL}_{DAI}$ and $M_c$, is substituted with $B^{DL}_c$ (expression (b-2) in FIG. 14). In a case where the terminal device 2 does not receive a PDSCH or a PDCCH/EPDCCH indicating the release of downlink SPS in the subframe (n−k), the terminal device 2 does not transmit HARQ-ACK on the PUSCH. Here, k belongs to K (k∈K).

In a case where the primary cell is a TDD cell, in a case where $M_c$ is more than 4 in the PUSCH transmission of the subframe n which appends DCI format 0/4 by using a TDD cell in which the uplink reference UL-DL configuration belongs to any of {1, 2, 3, 4, 5, 6}, and is adjusted based on the detected PDCCH/EPDCCH, the terminal device 2 assumes that the decimal point of a value which is obtained by dividing a difference between U and $W^{UL}_{DAI}$ by 4, is rolled in a positive infinite direction, the value obtained by rolling is multiplied by 4, and a value obtained by adding $W^{UL}_{DAI}$ to the value which is obtained by multiplication is compared to $M_c$, and as a result, the smaller is substituted with $B^{DL}_c$ (expression (b-3) in FIG. 14). Here, U indicates the maximum value of $U_c$ in all configured serving cell, and $U_c$ is the total number of PDSCHs received in the subframe (n−k) of the c-th serving cell which is determined in advance by k belonging to the set K, and PDCCHs/EPDCCHs indicating the release of downlink SPS. In a case where $W^{UL}_{DAI}$ is 4 ($W^{UL}_{DAI}$=4), and the terminal device 2 does not receive both of the PDSCH and the PDCCH/EPDCCH indicating the release of downlink SPS, in the subframe (n−k), the terminal device 2 does not transmit HARQ-ACK by using the PUSCH.

In a case where the primary cell is an FDD cell, 1 is substituted with $B^{DL}_c$ (expression (b-4) in FIG. 14). In a case where the terminal device 2 does not receive a PDSCH in a subframe (n−4) or a PDCCH/EPDCCH indicating the release of downlink SPS, the terminal device 2 does not transmit HARQ response information on the PUSCH.

In a case where the primary cell is an FDD cell, $M_c$=1 may be set and the expression (b-1) in FIG. 14 may be applied. In a case where the primary cell is an FDD cell, the expression (b-2) in FIG. 14 may be also applied in a case where the DAI is configured in the TDD secondary cell, and in a case where the primary cell is an FDD cell.

In the following descriptions, determination of assignment of the HARQ-ACK feedback bit in a case where one or more TDD cells are configured in the terminal device 2 will be described.

HARQ-ACK for PDSCH transmission corresponding to a PDCCH/EPDCCH or a PDCCH/EPDCCH indicating the release of downlink SPS is assigned in order of the value of the DAI included in the PDCCH/EPDCCH.

In a case where PUCCH format 3 is configured for transmitting HARQ-ACK, and in a case where the downlink reference UL-DL configuration belongs to any of {1, 2, 3, 4, 5, 6}, HARQ-ACK for PDSCH transmission corresponding to a PDCCH/EPDCCH of the subframe (n−k) or a PDCCH/EPDCCH indicating the release of downlink SPS is assigned to $o^{ACK}_{c,DAI(k)-1}$ in a case where the transmission mode configured in the c-th serving cell supports one transport block, or spatial HARQ-ACK bundling is applied. In other cases, the HARQ-ACK is assigned to $o^{ACK}_{c,DAI(k)-2}$ and $o^{ACK}_{c,DAI(k)-1}$. Here, DAI(k) is the value of the DAI in DCI format 1A/1B/1D1/2/2A/2C/2D detected in the subframe (n−k). Each of $o^{ACK}_{c,2DAI(k)-2}$ and $o^{ACK}_{c,2DAI(k)-1}$ corresponds to HARQ-ACK feedback for the code word 0 and the code word 1. In a case where $N_{SPS}$ has a value ($N_{SPS}$>0) more than 0, HARQ-ACK in response to the PDSCH transmission which does not correspond to the PDCCH/EPDCCH is mapped on $o^{ACK}_{c,OACKc-1}$. The HARQ-ACK feedback bit in a case where PDSCH transmission is performed not at all, and the PDCCH/EPDCCH indicating the release of downlink SPS is detected not at all is set as NACK.

In a case where PUCCH format 3 is configured for transmitting HARQ-ACK, and in a case where the downlink reference UL-DL configuration is 0, HARQ-ACK for PDSCH transmission corresponding to a PDCCH/EPDCCH of the subframe (n−k) or a PDCCH/EPDCCH indicating the release of downlink SPS is assigned to $o^{ACK}_{c,0}$ in a case where the transmission mode configured in the c-th serving cell supports one transport block, or spatial HARQ-ACK bundling is applied. In other cases, the HARQ-ACK is assigned to $O^{ACK}_{c,0}$ and $o^{ACK}_{c,1}$. Each of $o^{ACK}_{c,0}$ and $o^{ACK}_{c,1}$ corresponds to HARQ-ACK feedback for the code word 0 and the code word 1. The HARQ-ACK feedback bit in a case where PDSCH transmission is performed not at all, and the PDCCH/EPDCCH indicating the release of downlink SPS is detected not at all is set as NACK.

In the following descriptions, determination of assignment of the HARQ-ACK feedback bit in a case where two or more serving cells are configured in the terminal device 2 and at least two serving cells have frame constitutions different from each other will be described.

In an FDD cell, the HARQ-ACK feedback bit is assigned by using the value of the DAI included in the downlink grant.

An example in a case where the DAI field may be configured in a serving cell only in a case of being the TDD primary cell, and a table defining the downlink association set is dedicatedly configured in the TDD cell and the FDD cell will be described.

In a case where PUCCH format 3 is configured for transmitting HARQ-ACK, and in a case where the primary cell is a TDD cell, in an FDD cell or in a TDD cell in which the downlink reference UL-DL configuration belongs to any of {1, 2, 3, 4, 5, 6}, HARQ-ACK for PDSCH transmission corresponding to a PDCCH/EPDCCH of the subframe (n−k) or a PDCCH/EPDCCH indicating the release of downlink SPS is assigned to $O^{ACK}_{c,DAI(k)-1}$ in a case where the transmission mode configured in the c-th serving cell supports one transport block, or spatial HARQ-ACK bundling is applied. In other cases, the HARQ-ACK is assigned to $o^{ACK}_{c,2DAI(k)-2}$ and $o^{ACK}_{c,2DAI(k)-1}$. Here, DAI(k) is the value of the DAI in DCI format 1A/1B/1D1/2/2A/2C/2D detected in the subframe (n−k). Each of $o^{ACK}_{c,2DAI(k)-2}$ and $O^{ACK}_{c,2DAI(k)-1}$ corresponds to HARQ-ACK feedback for the code word 0 and the code word 1. In a case where $N_{SPS}$ has a value ($N_{SPS}$>0) more than 0, HARQ-ACK in response to the PDSCH transmission which does not correspond to the PDCCH/EPDCCH is mapped on $o^{ACK}_{c,OACKc-1}$. The HARQ-ACK feedback bit in a case where PDSCH transmission is performed not at all, and the PDCCH/EPDCCH indicating the release of downlink SPS is detected not at all is set as NACK.

In a case where PUCCH format 3 is configured for transmitting HARQ-ACK, in a TDD cell in which the downlink reference UL-DL configuration is 0, HARQ-ACK for PDSCH transmission corresponding to a PDCCH/EPDCCH of the subframe (n−k) or a PDCCH/EPDCCH indicating the release of downlink SPS is assigned to $o^{ACK}_{c,0}$ in a case where the transmission mode configured in the c-th serving cell supports one transport block, or spatial HARQ-ACK bundling is applied. In other cases, the HARQ-ACK is assigned to $o^{ACK}_{c,0}$ and $o^{ACK}_{c,1}$. Each of $o^{ACK}_{c,0}$ and $o^{ACK}_{c,1}$ corresponds to HARQ-ACK feedback for the code word 0 and the code word 1. The HARQ-ACK feedback bit in a case where PDSCH transmission is performed not at all, and the PDCCH/EPDCCH indicating the release of downlink SPS is detected not at all is set as NACK.

In a case where PUCCH format 3 is configured for transmitting HARQ-ACK, and in a case where the primary cell is an FDD cell, in a serving cell, HARQ-ACK for PDSCH transmission corresponding to a PDCCH/EPDCCH of the subframe (n−4) or a PDCCH/EPDCCH indicating the release of downlink SPS is assigned to $o^{ACK}_{c,0}$ in a case where the transmission mode configured in the c-th serving cell supports one transport block, or spatial HARQ-ACK bundling is applied. In other cases, the HARQ-ACK is assigned to $o^{ACK}_{c,0}$ and $o^{ACK}_{c,1}$. Each of $o^{ACK}_{c,0}$ and $o^{ACK}_{c,1}$ corresponds to HARQ-ACK feedback for the code word 0 and the code word 1. The HARQ-ACK feedback bit in a case where PDSCH transmission is performed not at all, and the PDCCH/EPDCCH indicating the release of downlink SPS is detected not at all is set as NACK.

In a case where the DAI field is configured for the FDD secondary cell configured in the TDD cell and the TDD primary cell, the HARQ-ACK feedback bit may be assigned by using the value of the DAI.

An example in a case where the DAI field may be configured in a serving cell only in a case of being the TDD primary cell, and a table defining the downlink association set is commonly configured in the TDD cell and the FDD cell will be described.

In a case where PUCCH format 3 is configured for transmitting HARQ-ACK, and in a case where the primary cell is a TDD cell, in a serving cell in which the downlink reference UL-DL configuration belongs to any of {1, 2, 3, 4, 5, 6}, HARQ-ACK for PDSCH transmission corresponding to a PDCCH/EPDCCH of the subframe (n−k) or a PDCCH/EPDCCH indicating the release of downlink SPS is assigned to $O^{ACK}_{c,DAI(k)-1}$ in a case where the transmission mode configured in the c-th serving cell supports one transport block, or spatial HARQ-ACK bundling is applied. In other cases, the HARQ-ACK is assigned to $o^{ACK}_{c,2DAI(k)-2}$ and $o^{ACK,2DAI(k)-1}$. Here, DAI(k) is the value of the DAI in DCI format 1A/1B/1D1/2/2A/2C/2D detected in the subframe (n−k). Each of $o^{ACK}_{c,2DAI(k)-2}$ and $o^{ACK,2DAI(k)-1}$ corresponds to HARQ-ACK feedback for the code word 0 and the code word 1. In a case where $N_{SPS}$ has a value ($N_{SPS}>0$) more than 0, HARQ-ACK in response to the PDSCH transmission which does not correspond to the PDCCH/EPDCCH is mapped on $O^{ACK}_{c,OACKc-1}$. The HARQ-ACK feedback bit in a case where PDSCH transmission is performed not at all, and the PDCCH/EPDCCH indicating the release of downlink SPS is detected not at all is set as NACK.

In a case where PUCCH format 3 is configured for transmitting HARQ-ACK, in a serving cell in which the downlink reference UL-DL configuration is 0, HARQ-ACK for PDSCH transmission corresponding to a PDCCH/EPDCCH of the subframe (n−k) or a PDCCH/EPDCCH indicating the release of downlink SPS is assigned to $o^{ACK}_{c,0}$ in a case where the transmission mode configured in the c-th serving cell supports one transport block, or spatial HARQ-ACK bundling is applied. In other cases, the HARQ-ACK is assigned to $o^{ACK}_{c,0}$ and $o^{ACK}_{c,1}$. Each of $o^{ACK}_{c,0}$ and $o^{ACK}_{c,1}$ corresponds to HARQ-ACK feedback for the code word 0 and the code word 1. The HARQ-ACK feedback bit in a case where PDSCH transmission is performed not at all, and the PDCCH/EPDCCH indicating the release of downlink SPS is detected not at all is set as NACK.

In a case where PUCCH format 3 is configured for transmitting HARQ-ACK, and in a case where the primary cell is an FDD cell, in a serving cell, HARQ-ACK for PDSCH transmission corresponding to a PDCCH/EPDCCH of the subframe (n−4) or a PDCCH/EPDCCH indicating the release of downlink SPS is assigned to $o^{ACK}_{c,0}$ in a case where the transmission mode configured in the c-th serving cell supports one transport block, or spatial HARQ-ACK bundling is applied. In other cases, the HARQ-ACK is assigned to $o^{ACK}_{c,0}$ and $o^{ACK}_{c,1}$. Each of $o^{ACK}_{c,0}$ and $o^{ACK}_{c,1}$ corresponds to HARQ-ACK feedback for the code word 0 and the code word 1. The HARQ-ACK feedback bit in a case where PDSCH transmission is performed not at all, and the PDCCH/EPDCCH indicating the release of downlink SPS is detected not at all is set as NACK.

In a case where the DAI field is configured for the FDD secondary cell configured in the TDD cell and the TDD primary cell, the HARQ-ACK feedback bit may be assigned by using the value of the DAI.

The above descriptions are descriptions for PUCCH format 3. However, the constitution of the HARQ-ACK feedback bit in a case where HARQ-ACK feedback of two or more serving cells is transmitted by using PUCCH format 1b for performing channel selection, and in a case where two or more serving cells are configured, UL-DL configurations of all serving cells are the same as each other may be assigned similarly to the case of PUCCH format 3 in the TDD UL-DL configuration belongs to any of {1, 2, 3, 4, 6}, the DAI included in an uplink grant in which $W^{UL}_{DAI}$ is 1 or 2 is received, and the uplink grant is an instruction for PUSCH transmission.

That is, in a case where TDD UL-DL configuration belongs to any of {1, 2, 3, 4, 6}, in PUSCH transmission adjusted based on the PDCCH/EPDCCH which is detected with appending DCI format 0/4 in which $W^{UL}_{DAI}$ is 1 or 2, $o^{ACK}_{j}$ is determined similarly to a case where PUCCH format 3 is configured for transmitting HARQ-ACK. Such a case excludes a case where spatial HARQ-ACK bundling is performed for all serving cells in which a downlink transmission mode in which the maximum two transport blocks are supported in a case of $W^{UL}_{DAI}=2$ is configured, over a plurality of code words in one downlink subframe.

The constitution of the HARQ-ACK feedback bit in a case where HARQ-ACK feedback of two or more serving cells is transmitted by using PUCCH format 1b for performing channel selection, and in a case where two or more serving cells are configured, UL-DL configurations of at least two serving cells are different from each other may be assigned similarly to the case of PUCCH format 3 in the uplink reference UL-DL configuration belongs to any of {1, 2, 3, 4, 6}, the DAI included in an uplink grant in which $W^{UL}_{DAI}$ is 1 or 2 is received, and the uplink grant is an instruction for PUSCH transmission.

That is, in a case where uplink reference UL-DL configuration belongs to any of {1, 2, 3, 4, 6}, in PUSCH transmission adjusted based on the PDCCH/EPDCCH which is detected with appending DCI format 0/4 in which $W^{UL}_{DAI}$ is 1 or 2, $o^{ACK}_{j}$ is determined similarly to a case where PUCCH format 3 is configured for transmitting HARQ-ACK. Such a case excludes a case where spatial HARQ-ACK bundling is performed for all serving cells in which a downlink transmission mode in which the maximum two transport blocks are supported in a case of $W^{UL}_{DAI}=2$ is configured, over a plurality of code words in one downlink subframe. Here, the uplink reference UL-DL configuration is an uplink reference UL-DL configuration of a serving cell corresponding to PUSCH transmission.

The constitution of the HARQ-ACK feedback bit in a case where HARQ-ACK feedback of two or more serving cells is transmitted by using PUCCH format 1b for performing channel selection, and in a case where two or more serving cells are configured and at least two serving cells have frame constitutions different from each other may be assigned similarly to the case of PUCCH format 3 in a case where the primary cell is a TDD cell, the uplink reference UL-DL configuration belongs to any of {1, 2, 3, 4, 6}, the DAI included in an uplink grant in which $W^{UL}_{DAI}$ is 1 or 2 is received, and the uplink grant is an instruction for PUSCH transmission.

That is, in a case where the primary cell is a TDD cell, and in a case where the uplink reference UL-DL configuration belongs to any of {1, 2, 3, 4, 6}, in PUSCH transmission adjusted based on the PDCCH/EPDCCH which is detected with appending DCI format 0/4 in which $W^{UL}_{DAI}$ is 1 or 2, $o^{ACK}_j$ is determined similarly to a case where PUCCH format 3 is configured for transmitting HARQ-ACK. Such a case excludes a case where spatial HARQ-ACK bundling is performed for all serving cells in which a downlink transmission mode in which the maximum two transport blocks are supported in a case of $W^{UL}_{DAI}=2$ is configured, over a plurality of code words in one downlink subframe. Here, the uplink reference UL-DL configuration is an uplink reference UL-DL configuration of a serving cell corresponding to PUSCH transmission.

The constitution of the HARQ-ACK feedback bit in a case where HARQ-ACK feedback of two or more serving cells is transmitted by using PUCCH format 1b for performing channel selection, and in a case where two or more serving cells are configured and at least two serving cells have frame constitutions different from each other may be assigned similarly to the case of PUCCH format 3 in a case where the uplink reference UL-DL configuration belongs to any of {1, 2, 3, 4, 6}, the DAI included in an uplink grant in which $W^{UL}_{DAI}$ is 1 or 2 is received, and the uplink grant is an instruction for PUSCH transmission, in the TDD cell or in the FDD secondary cell aggregated with the TDD primary cell.

That is, in the TDD cell or in the FDD secondary cell aggregated with the TDD primary cell, in a case where the uplink reference UL-DL configuration belongs to any of {1, 2, 3, 4, 6}, in PUSCH transmission adjusted based on the PDCCH/EPDCCH which is detected with appending DCI format 0/4 in which $W^{UL}_{DAI}$ is 1 or 2, $o^{ACK}_j$ is determined similarly to a case where PUCCH format 3 is configured for transmitting HARQ-ACK. Such a case excludes a case where spatial HARQ-ACK bundling is performed for all serving cells in which a downlink transmission mode in which the maximum two transport blocks are supported in a case of $W^{UL}_{DAI}=2$ is configured, over a plurality of code words in one downlink subframe. Here, the uplink reference UL-DL configuration is an uplink reference UL-DL configuration of a serving cell corresponding to PUSCH transmission.

With the above-described constitution method of the HARQ-ACK feedback bit, it is possible to constitute a plurality of HARQ-ACK feedback bits even in an FDD cell.

Thus, the terminal device 2 can perform efficient communication by using the DAI.

In a case where frame structure types (FDD (Type 1) and TDD (Type 2)) which are different from each other are applied in the primary cell and at least one secondary cell, the terminal device 2 which performs cell aggregation (carrier aggregation) does not perform simultaneous transmission and reception between the primary cell and the secondary cell as long as a function (performance, capacity) for performing simultaneous transmission and reception between bands supported in the terminal device 2 by each of the primary cell and the secondary cell is not provided.

The embodiment may be also applied for a different band (E-UTRA Operating Band, E-UTRA Band, Band).

Here, a band in which a duplex mode is TDD may be also referred to as a TDD band, and a band in which a duplex mode is FDD may be also referred to as an FDD band. Similarly, a cell (carrier) of which the frame structure type is FDD (Type 1) may be also referred to as an FDD cell (FDD carrier), and a cell (carrier) of which the frame structure type is TDD (Type 2) may be also referred to as a TDD cell (TDD carrier).

FIG. 1 is a schematic block diagram illustrating a configuration of the base station apparatus 1 according to the present invention. As illustrated in FIG. 1, the base station apparatus 1 includes a higher layer processing unit 101, a control unit 103, a reception unit 105, a transmission unit 107, a channel measurement unit 109, and a transmit/receive antenna 111. The reception unit 105 includes a decoding portion 1051, a demodulation portion 1053, a demultiplexing portion 1055, and a radio reception portion 1057. Reception processing of the base station apparatus 1 is performed by the higher layer processing unit 101, the control unit 103, the reception unit 105, and the transmit/receive antenna 111. The transmission unit 107 includes a coding portion 1071, a modulation portion 1073, a multiplexing portion 1075, a radio transmission portion 1077, and a downlink reference signal generation portion 1079. Transmission processing of the base station apparatus 1 is performed by the higher layer processing unit 101, the control unit 103, the transmission unit 107, and the transmit/receive antenna 111.

The higher layer processing unit 101 performs processing of a medium access control (MAC) layer, a packet data convergence protocol (PDCP) layer, a radio link control (RLC) layer, and a radio resource control (RRC) layer.

The higher layer processing unit 101 generates information assigned in each channel of a downlink, or acquires the information from a higher node, and then outputs the information to the transmission unit 107. The higher layer processing unit 101 assigns radio resources for causing the terminal device 2 to allocate a physical uplink shared channel (PUSCH) which is data information of an uplink, from radio resources of the uplink. The higher layer processing unit 101 determines radio resources for allocating a physical downlink shared channel (PDSCH) which is data information of a downlink, from radio resources of the downlink.

The higher layer processing unit 101 generates downlink control information indicating assignment of the radio resources, and transmits the generated information to the terminal device 2 through the transmission unit 107.

The higher layer processing unit 101 preferentially allocates radio resources having good channel quality, based on a channel measurement result of the uplink, which is input from the channel measurement unit 109 when radio resources for allocating the PUSCH are assigned. That is, the higher layer processing unit 101 generates information regarding configurations of various downlink signals, and information regarding configurations of various uplink signals for a certain terminal device or a certain cell.

The higher layer processing unit 101 may generates information regarding setting of various downlink signals, and information regarding setting of various uplink signals for each cell. The higher layer processing unit 101 may generates information regarding configurations of various downlink signals, and information regarding configurations of various uplink signals for each terminal device 2.

The higher layer processing unit 101 may generate plural pieces of information from information regarding a first configuration to information regarding an n-th configuration (n is natural number), and may transmit the generated pieces of information to the terminal device 2 through the transmission unit 107. The pieces of information are generated for a certain terminal device 2 or a certain cell, that is, are generated so as to be terminal device-specific or cell-specific. For example, the information regarding configurations of the downlink signal and/or the uplink signal may include parameters relating to resource assignment.

The information regarding configurations of the downlink signal and/or the uplink signal may include parameters used in calculating a sequence. The radio resources may be also referred to time-frequency resources, subcarriers, resource elements (RE), a resource element group (REG), control channel elements (CCE), a resource block (RB), a resource block group (RBG), and the like.

Each of the configuration information and the control information may be defined as an information element. Each of the configuration information and the control information may be defined as an RRC message. Each of the configuration information and the control information may be transmitted as system information, to the terminal device 2. The configuration information and the control information may be transmitted to the terminal device 2 by dedicated signaling.

The higher layer processing unit 101 configures at least one TDD UL/DL configuration (TDD UL/DL configuration(s), TDD config, tdd-Config, and uplink-downlink configuration(s)) in the system information block Type 1. The TDD UL/DL configuration may be defined as in FIG. 3. The constitution of TDD may be shown by configuring an index. A second TDD UL/DL configuration may be configured as a downlink reference. The system information block may prepare a plurality of types. For example, the system information block Type 1 includes an information element regarding the TDD UL/DL configuration.

The system information block Type 2 includes an information element regarding a radio resource control. A parameter relating to an information element thereof may be included as an information element in certain information elements. For example, referring to a parameter may be performed in a physical layer, but in a higher layer, definition as an information element may be performed.

In the present invention, an identity, an identifier, and identification are referred to as an ID (identifier, identification sign, and identification number). As an ID (UEID) configured so as to be terminal-specific, a cell radio network temporary identifier (C-RNTI), a semi-persistent scheduling C-RNTI (SPS C-RNTI), a Temporary C-RNTI, a TPC-PUSCH RNTI, a TPC-PUCCH RNTI, and a random value for contention resolution are provided. The IDs are used in a unit of a cell. The IDs are configured by the higher layer processing unit 101.

The higher layer processing unit 101 configures various identifiers for the terminal device 2. The higher layer processing unit 101 notifies the terminal device 2 of the various configured identifiers through the transmission unit 107. For example, the higher layer processing unit 101 configures the RNTI and notifies the terminal device 2 of the configured RNTI. The higher layer processing unit 101 configures a physical layer cell ID, a virtual cell ID, or an ID corresponding to the virtual cell ID, and notifies the terminal device 2. For example, as the ID corresponding to the virtual cell ID, IDs (PUSCH ID, PUCCH ID, scrambling initialization ID, reference signal ID (RSID), and the like) which may be configured so as to be specific to a physical channel are provided. The physical layer cell ID or the virtual cell ID may be used in generating a physical channel and a sequence of a physical signal.

The higher layer processing unit 101 generates downlink control information (DCI) of which notification is performed on a physical downlink control channel (PDCCH) or an enhanced physical downlink control channel (EPDCCH), and generates control information for controlling the reception unit 105 and the transmission unit 107. The higher layer processing unit 101 outputs the generated information to the control unit 103.

The higher layer processing unit 101 generates the control information for controlling the reception unit 105 and the transmission unit 107 based on uplink control information (UCI) of which notification is performed on a physical uplink control channel (PUCCH) from the terminal device 2, and a situation of a buffer of which notification is performed from the terminal device 2, or various types of configuration information (RRC message, system information, parameter, and information element) of each terminal device 2, which are configured by the higher layer processing unit 101. The higher layer processing unit 101 outputs the generated information to the control unit 103. The UCI includes at least one of ACK/NACK, a scheduling request (SR), and channel state information (CSI). The CSI includes at least one of the CQI, the PMI, and the RI.

The higher layer processing unit 101 configures transmitted power of an uplink signal (PRACH, PUCCH, PUSCH, UL DMRS, P-SRS, and A-SRS), and a parameter relating to the transmitted power. The higher layer processing unit 101 transmits transmitted power of a downlink signal (CRS, DL DMRS, CSI-RS, PDSCH, PDCCH/EPDCCH, and the like), and a parameter relating to the transmitted power, to the terminal device 2 through the transmission unit 107. That is, the higher layer processing unit 101 transmits information regarding power control of the uplink and the downlink to the terminal device 2 through the transmission unit 107. In other words, the higher layer processing unit 101 generates information regarding transmitted power control of the base station apparatus 1 and the terminal device 2. For example, the higher layer processing unit 101 transmits a parameter relating to transmitted power of the base station apparatus 1, to the terminal device 2.

The higher layer processing unit 101 transmits parameters used for configuring the maximum transmitted power $P_{CMAX,c}$ and the total maximum output power $P_{CMAX}$ of the terminal device 2, to the terminal device 2. The higher layer processing unit 101 transmits information regarding transmitted power control of various physical channels, to the terminal device 2.

The higher layer processing unit 101 sets transmitted power of the terminal device 2 in accordance with information indicating the interference quantity from the adjacent base station apparatus, information indicating the interference quantity of which notification is performed from the adjacent base station apparatus, and which is applied to the adjacent base station apparatus 1, quality of a channel, which is input from the channel measurement unit 109, and the like. The higher layer processing unit 101 sets transmitted power of the terminal device 2 so as to cause a PUSCH and the like to satisfy predetermined channel quality, considering interference to the adjacent base station apparatus 1. The higher layer processing unit 101 transmits information indicating the above setting, to the terminal device 2 through the transmission unit 107.

Specifically, the higher layer processing unit 101 transmits standard powers ($P_{O\_NOMINAL\_PUSCH}$, $P_{O\_NOMINAL\_PUCCH}$) for a PUSCH and PUCCH, a pathloss compensation coefficient (attenuation coefficient) α, power offset for Message 3, power offset defined for each PUCCH format, and the like in system information. The above-described pieces of information are transmitted as information (information of a shared parameter relating to uplink power control) shared between terminal devices 2 or information which is configured as a common parameter between terminal devices 2. At this time, the power offset of PUCCH format 3 and power offset of delta-PUCCH format 1bCS may be added and notification thereof may be performed. Notification of the information of the shared parameters may be performed in a RRC message.

The higher layer processing unit 101 performs notification of terminal device-specific PUSCH power $P_{O\_UE\_PUSCH}$, a parameter (deltaMCS-Enabled) for an instruction of whether or not a delta-MCS is effective, a parameter (accumulation-Enabled) for an instruction of whether or not accumulation is effective, terminal device-specific PUCCH power $P_{O\_UE\_PUCCH}$, P-SRS power offset $P_{SRS\_OFFSET}(0)$, and a filter coefficient, as information which may be configured for each terminal device 2 (information of a dedicated parameter relating to uplink power control) in the RRC message. At this time, notification of power offset of transmission diversity in each PUCCH format, and A-SRS power offset $P_{SRS\_OFFSET}(1)$ may be performed. α described herein is a coefficient (attenuation coefficient, pathloss compensation coefficient) which is used for setting the transmitted power along with a pathloss value, and indicates the extent for compensating the pathloss. In other words, a is a coefficient for determining the extent that the transmitted power is increased or decreased in accordance with pathloss (that is, the degree of transmitted power to be compensated). α is normally set to have a value of 0 to 1. If a is 0, compensation of power in accordance with pathloss is not performed. If α is 1, compensation of the transmitted power of the terminal device 2 is performed so as to cause no influence of the pathloss to occur in the base station apparatus 1. The pieces of information may be transmitted to the terminal device 2 as reconfiguration information. The shared parameter and the dedicated parameter may be independently configured in the primary cell and the secondary cell, or in a plurality of serving cells.

In a case where the reception unit 105 receives function information of the terminal device 2 from the terminal device 2, the higher layer processing unit 101 performs various configurations based on the received function information of the terminal device 2. For example, the higher layer processing unit 101 determines a carrier frequency of an uplink and a carrier frequency of a downlink, from a band (EUTRA Operating Band) supported by the terminal device 2, based on the received function information of the terminal device 2. The higher layer processing unit 101 determines whether or not the MIMO communication is performed for the terminal device 2, based on the received function information of the terminal device 2. The higher layer processing unit 101 determines whether or not the carrier aggregation is performed, based on the received function information of the terminal device 2. The higher layer processing unit 101 determines whether or not the carrier aggregation is performed by using component carriers having different frame structure types, based on the received function information of the terminal device 2. That is, the higher layer processing unit 101 determines whether or not a secondary cell is configured, and determines various parameters used for the secondary cell. The higher layer processing unit 101 notifies the terminal device 2 of the determined information. Notification of the information regarding the carrier frequency may be performed in the RRC message. That is, notification of the information regarding the carrier frequency may be in the system information. Notification of the information regarding the carrier frequency, with being included in mobility control information may be performed. Notification of the information regarding the carrier frequency may be performed as RRC information by a higher layer.

In a case where the higher layer processing unit 101 configures a secondary cell for the terminal device 2, the higher layer processing unit 101 assigns a cell index except for a specific value (for example, "0" or information bit corresponding to "0") to the secondary cell, and transmits the configuration information thereof to the terminal device 2. In a case where the secondary cell is configured, the terminal device 2 considers the cell index of the primary cell as the specific value.

The higher layer processing unit 101 may configure transmitted power of a downlink signal/uplink signal, or parameters relating to the transmitted power for each terminal device 2. The higher layer processing unit 101 may configure transmitted power of a common downlink/uplink signal between terminal devices 2, or parameters relating to the transmitted power. The higher layer processing unit 101 may transmit information regarding the parameters to the terminal device 2, as information (information of the parameter relating to the uplink power control) regarding the uplink power control, and/or information (information of the parameter relating to the downlink power control) regarding the downlink power control. The information of the parameter relating to the uplink power control and the information of the parameter relating to the downlink power control include at least one parameter, and are transmitted to the terminal device 2.

The higher layer processing unit 101 configures various IDs relating to various physical channels/physical signals. The higher layer processing unit 101 outputs information regarding the configuration of the IDs to the reception unit 105 and the transmission unit 107 through the control unit 103. For example, the higher layer processing unit 101 configures the value of the RNTI (UEID) for scrambling CRC included in the downlink control information format.

The higher layer processing unit 101 may configure values of various identifiers such as the cell radio network temporary identifier (C-RNTI), the Temporary C-RNTI, Paging-RNTI (P-RNTI), a random access RNTI (RA-RNTI), the semi-persistent scheduling C-RNTI (SPS C-RNTI), and a system information RNTI (SI-RNTI).

The higher layer processing unit 101 configures the value of an ID such as a physical cell ID, a virtual cell ID, and a scrambling initialization ID. The configuration information is output to each processing unit through the control unit 103. The configuration information may be transmitted to the terminal device 2, as a RRC message or system information, dedicated information specific to a terminal device, and an information element. Some of RNTIs may be transmitted by using a MAC control element (CE).

The control unit 103 generates a control signal for controlling the reception unit 105 and the transmission unit 107, based on control information from the higher layer processing unit 101. The control unit 103 outputs the generated control signal to the reception unit 105 and the transmission unit 107, so as to control the reception unit 105 and the transmission unit 107.

The reception unit 105 separates, demodulates, and decodes a reception signal which has been received from the terminal device 2 through the transmit/receive antenna 111, in accordance with the control signal input from the control unit 103. The reception unit 105 outputs the decoded information to the higher layer processing unit 101. The radio reception portion 1057 converts (down-converts) the frequency of the signal of an uplink which has been received through the transmit/receive antenna 111 into an intermediate frequency (IF), and removes an unnecessary frequency component. The radio reception portion 1057 controls an amplification level so as to appropriately maintain the signal level, performs orthogonal demodulation, and converts the analog signal subjected to orthogonal demodulation, into a digital signal. Such demodulation and conversion is performed based on the same phase component and the orthogonal component of the received signal. The radio reception portion 1057 removes a portion corresponding to a guard interval (GI) from the converted digital signal. The radio reception portion 1057 performs Fast Fourier Transform (FFT) on a signal obtained by removing the guard interval. The radio reception portion 1057 extracts the signal in the frequency domain, and outputs the extracted signal to the demultiplexing portion 1055.

The demultiplexing portion 1055 separates the signal input from the radio reception portion 1057 into signals of a PUCCH, a PUSCH, a UL DMRS, a SRS, and the like. The separation is performed based on assignment information of radio resources. The assignment information is determined in advance by the base station apparatus 1, and each terminal device 2 is notified of the assignment information. The demultiplexing portion 1055 performs channel compensation of the PUCCH and the PUSCH from an estimated value of the channel, which is input from the channel measurement unit 109. The demultiplexing portion 1055 outputs the separated UL DMRS and SRS to the channel measurement unit 109.

The demodulation portion 1053 performs inverse discrete Fourier transform (IDFT) on the PUSCH, and acquires modulation symbols. The demodulation portion 1053 demodulates the reception signal with the modulation symbols of the PUCCH and the PUSCH, by using a modulation scheme which is determined in advance, or of which each terminal device 2 is notified in advance in the downlink control information by the base station apparatus 1. Such a modulation scheme includes binary phase shift keying (BPSK), quadrature phase shift keying (QPSK), 16 quadrature amplitude modulation (16QAM), 64 quadrature amplitude modulation (64QAM), and the like.

The decoding portion 1051 decodes coded bits of the PUCCH and the PUSCH, which have been demodulated, at a coding rate of the predetermined coding scheme. The coding rate is determined in advance, or the base station apparatus 1 notifies the terminal device 2 of the coding rate in advance in the uplink grant (UL grant). The decoding portion 1051 outputs the decoded data information and the decoded uplink control information to the higher layer processing unit 101.

The channel measurement unit 109 measures the estimated value of the channel, the quality of the channel, and the like, based on the uplink demodulation reference signal (UL DMRS) input from the demultiplexing portion 1055, and the SRS. The channel measurement unit 109 outputs a result of the measurement to the demultiplexing portion 1055 and the higher layer processing unit 101. The channel measurement unit 109 measures received power of signals from a first signal to the n-th signal, and/or reception quality thereof. The channel measurement unit 109 outputs a result of the measurement to the demultiplexing portion 1055 and the higher layer processing unit 101.

The transmission unit 107 generates a reference signal of a downlink (downlink reference signal), based on the control signal input from the control unit 103. The transmission unit 107 codes and modulates data information and downlink control information input from the higher layer processing unit 101. The transmission unit 107 performs multiplexing on the PDCCH (EPDCCH), the PDSCH, and the downlink reference signal using the DCI format. The transmission unit 107 transmits a downlink signal obtained by multiplexing to the terminal device 2 through the transmit/receive antenna 111. The transmission unit transmits the PDCCH by using a first DCI format or a second DCI format.

The coding portion 1071 performs coding such as turbo-coding, convolutional coding, and block coding, on the downlink control information input from the higher layer processing unit 101, and data information. The modulation portion 1073 modulates the coded bits by using a modulation scheme such as QPSK, 16QAM, and 64QAM. The downlink reference signal generation portion 1079 performs generation as a downlink reference signal with a sequence known by the terminal device 2. The downlink reference signal is obtained by using a rule which is determined based on a cell identifier (Cell ID, Cell Identity, Cell Identifier, Cell Identification), and the like for identifying the base station apparatus 1. The multiplexing portion 1075 performs multiplexing on the modulated channel and the generated downlink reference signal.

The radio transmission portion 1077 performs Inverse Fast Fourier Transform (IFFT) on the multiplexed modulation symbol, and performs modulation of the OFDM scheme. The radio transmission portion 1077 adds a guard interval to OFDM symbols obtained by OFDM modulation, and generates a baseband digital signal. The radio transmission portion 1077 converts the baseband digital signal into an analog signal, and generates the same-phase component and the orthogonal component of an intermediate frequency, from the analog signal. The radio transmission portion 1077 removes an extra frequency component from the intermediate frequency band, and converts (up-converts) a signal having an intermediate frequency into a signal having a high frequency. The radio transmission portion 1077 removes an extra frequency component, amplifies power, and outputs the signal to the transmit/receive antenna 111 so as to perform transmission.

Figure 2:
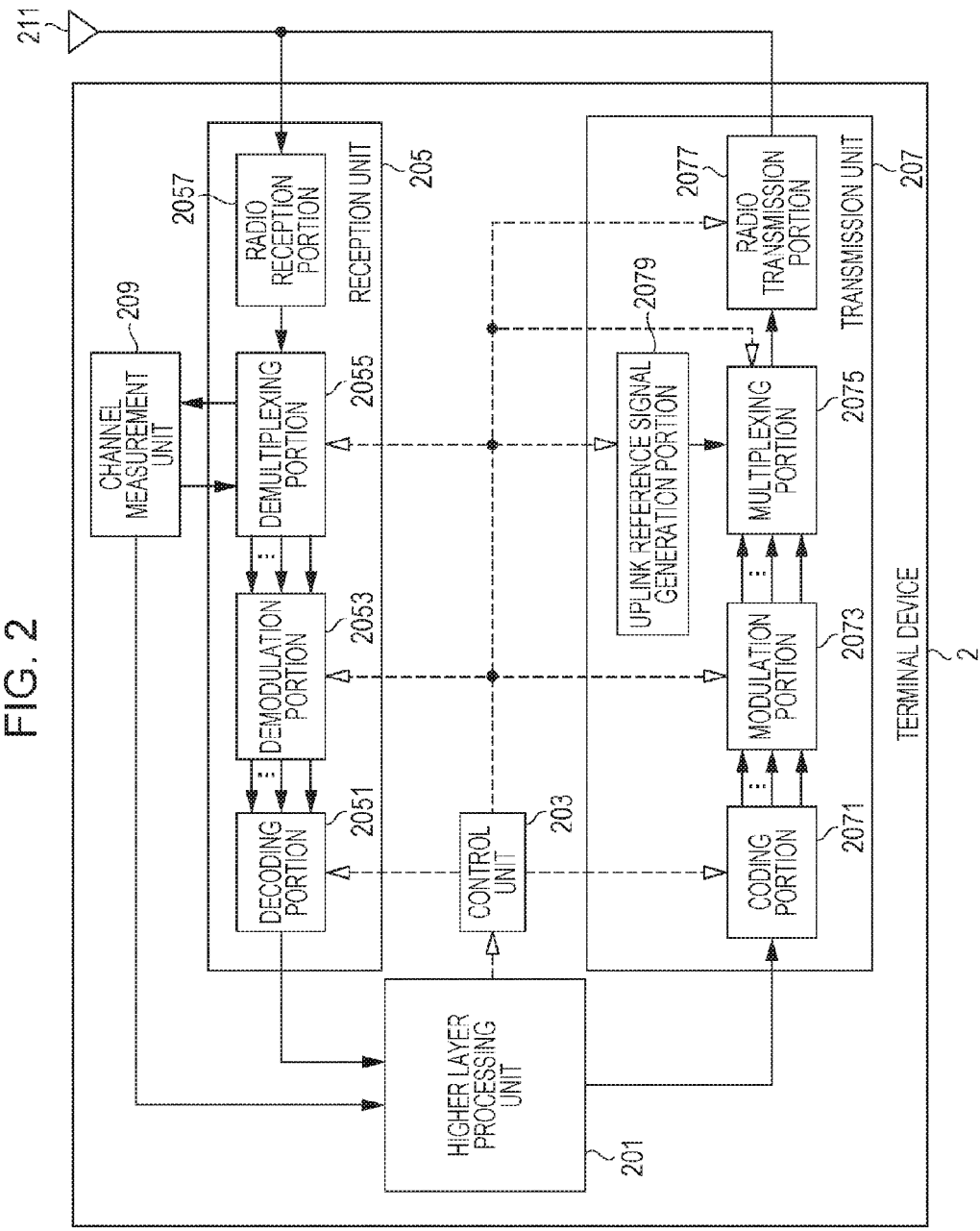
FIG. 2 is a schematic block diagram illustrating a configuration of a terminal device 2 according to the first embodiment of the present invention.

FIG. 2 is a schematic block diagram illustrating a configuration of the terminal device 2 according to the embodiment. As illustrated in FIG. 2, the terminal device 2 includes a higher layer processing unit 201, a control unit 203, a reception unit 205, a transmission unit 207, a channel measurement unit 209, and a transmit/receive antenna 211. The reception unit 205 includes a decoding portion 2051, a demodulation portion 2053, a demultiplexing portion 2055, and a radio reception portion 2057. Reception processing of the terminal station apparatus 2 is performed by the higher layer processing unit 201, the control unit 203, the reception unit 205, and the transmit/receive antenna 211. The transmission unit 207 includes a coding portion 2071, a modulation portion 2073, a multiplexing portion 2075, and a radio transmission portion 2077. Transmission processing of the terminal device 2 is performed by the higher layer processing unit 201, the control unit 203, the transmission unit 207, and the transmit/receive antenna 211.

The higher layer processing unit 201 outputs data information of an uplink, which is generated by an operation of a user, and the like, to the transmission unit. The higher layer processing unit 201 performs processing of a medium access control (MAC) layer, a packet data convergence protocol (PDCP) layer, a radio link control (RLC) layer, and a radio resource control (RRC) layer.

The higher layer processing unit 201 manages various types of configuration information of the terminal device 2. The higher layer processing unit 201 generates information assigned to each channel of the uplink, and outputs the generated information to the transmission unit 207. The higher layer processing unit 201 generates control information for controlling the reception unit 205 and the transmission unit 207, based on downlink control information (DCI) of which notification is performed on a PDCCH from the base station apparatus 1, and various types of configuration information of the terminal device 2, which are managed by the higher layer processing unit 201 in which radio resource control information of which notification is performed on a PDSCH is configured. The higher layer processing unit 201 outputs the generated control information to the control unit 203. The higher layer processing unit 201 sets various parameters (information elements and RRC messages) of each signal, based on pieces of information from information regarding a first configuration of which notification is performed from the base station apparatus 1, to information regarding the n-th configuration. The higher layer processing unit 201 generates information set described above, and outputs the generated information to the transmission unit 207 through the control unit 203. When connection with the base station apparatus 1 is established, the higher layer processing unit 201 generates function information of the terminal device 2, outputs the generated function information to the transmission unit 207 through the control unit 203, and notifies the base station apparatus 1 thereof. After the connection with the base station apparatus 1 is established, the higher layer processing unit 201 may notify the base station apparatus 1 of the function information.

The function information may include information (RF-Parameters) regarding a RF parameter. The information regarding the RF parameter may include information (1st SupportedBandCombination) indicating a band supported by the terminal device 2. The information regarding the RF parameter may include information (SupportedBandCombinationExt) indicating a band supporting the carrier aggregation and/or MIMO. The information regarding the RF parameter may include information (2nd SupportedBandConbination) indicating a band which supports a function of performing a plurality of timing advances between bands which are simultaneously aggregated in the terminal device 2, or of performing simultaneous transmission and reception between bands. The bands may be listed. The value (entry) indicated by plural pieces of listed information may be used commonly (may indicates the same).

Whether each band (bandE-UTRA, FreqBandIndicator, and E-UTRA Operating Band) supported by the terminal device 2 supports half duplex may be indicated. In a band in which half duplex is not supported, full duplex is supported.

Whether a band supported by the terminal device 2 supports the carrier aggregation and/or MIMO in an uplink may be indicated.

Whether a band supported by the terminal device 2 supports the carrier aggregation and/or MIMO in a downlink may be indicated.

The information regarding the RF parameter may include information indicating a band which supports TDD-FDD carrier aggregation. The above-described bands may be listed.

The information regarding the RF parameter may include information indicating whether a function of performing simultaneous transmission and reception between bands which support TDD-FDD carrier aggregation is supported.

The information regarding the RF parameter may include information indicating whether or not simultaneous transmission and reception is performed between bands of different duplex modes.

In a case where a function which is not supported is present among functions included in the function information, the higher layer processing unit 201 may not set information indicating whether or not the function is supported, in the function information. The base station apparatus 1 considers the function which is not set in the function information not to be supported by the terminal device 2, and performs various configurations. The information indicating whether or not the function is supported may be information indicating the function is supported.

If the function which is not supported is present, the higher layer processing unit 201 sets a specific value (for example, "0") indicating not to be supported or information (for example, "not supported", "disable", "FALSE", and the like), regarding the function. The higher layer processing unit 201 may notify the base station apparatus 1 of function information including the above information.

If the function which is supported is present, the higher layer processing unit 201 sets a specific value (for example, "1") indicating to be supported or information (for example, "supported", "enable", "TRUE", and the like), regarding the function. The higher layer processing unit 201 may notify the base station apparatus 1 of function information including the above information.

In a case where there is no a function of performing simultaneous transmission and reception between bands which may be simultaneously aggregated, the higher layer processing unit 201 sets a specific value or information indicating that the function is not supported, in information (simultaneousRx-Tx) indicating whether or not the function of performing simultaneous transmission and reception between bands which may be simultaneously aggregated is supported. In addition, the information indicating whether or not the function of performing simultaneous transmission and reception between bands which may be simultaneously aggregated is supported may be not set in the function information.

The higher layer processing unit 201 acquires the following pieces of information from the reception unit 205. The pieces of information include information indicating a sounding subframe, and a bandwidth of the radio resources reserved for transmitting the SRS in the sounding subframe; information indicating a subframe in which the periodic SRS of which the terminal device 2 is notified by the base station apparatus 1, a frequency band, and the quantity of cycling shift used in CAZAC sequences of the periodic SRS; and information indicating a frequency band for transmitting the aperiodic SRS of which the terminal device 2 is notified by the base station apparatus 1, and the quantity of cycling shift used in CAZAC sequences of the aperiodic SRS. The sounding subframe (SRS subframe, SRS transmission subframe) is a subframe for reserving radio resources which are used for transmitting the SRS reported by the base station apparatus 1.

The higher layer processing unit 201 controls SRS transmission in accordance with the information. Specifically, the higher layer processing unit 201 controls the transmission unit 207 to transmit a periodic SRS in accordance with information regarding the periodic SRS once or periodically.

In a case where transmission of the aperiodic SRS in a SRS request (SRS indicator) input from the reception unit 205 is required, the higher layer processing unit 201 transmits the aperiodic SRS in accordance with information regarding the aperiodic SRS, the predetermined number of times (for example, one time).

The higher layer processing unit 201 controls transmitted power of the PRACH, the PUCCH, the PUSCH, the periodic SRS, and the aperiodic SRS, based on information regarding transmitted power control of various uplink signals transmitted from the base station apparatus 1. Specifically, the higher layer processing unit 201 configures the transmitted power of the various uplink signals, based on information regarding various types of uplink power control acquired from the reception unit 205. For example, the transmitted power of the SRS is controlled based on $P_{O\_PUSCH}$, $\alpha$, power offset $P_{SRS\_OFFSET}(0)$ (first power offset (pSRS-Offset)) for the periodic SRS, power offset $P_{SRS\_OFFSET}(1)$ (second power offset (pSRS-OffsetAp)) for the aperiodic SRS, and a TPC command. The higher layer processing unit 201 performs switching between the first power offset and the second power offset, in accordance with which the periodic SRS or the aperiodic SRS is provided for $P_{SRS\_OFFSET}$.

In a case where third power offset is configured for the periodic SRS and/or aperiodic SRS, the higher layer processing unit 201 sets transmitted power, based on the third power offset. The third power offset may be configured so as to have a value in a range wider than that of the first power offset or the second power offset. The third power offset may be configured for each of the periodic SRS and the aperiodic SRS. That is, the information of parameters relating to the uplink power control corresponds to an information element or a RRC message which includes parameters relating to control of transmitted power of various uplink physical channels.

In a case where the sum of transmitted power of a first uplink reference signal and transmitted power of a physical uplink shared channel exceeds the maximum transmitted power (for example, $P_{CMAX}$ or $P_{CMAX,c}$) configured in the terminal device 2, in a certain serving cell or a certain subframe, the higher layer processing unit 201 output instruction information to the transmission unit 207 through the control unit 203, so as to transmit the physical uplink shared channel.

In a case where the sum of transmitted power of the first uplink reference signal and transmitted power of a physical uplink control channel exceeds the maximum transmitted power (for example, $P_{CMAX}$ or $P_{CMAX,c}$) configured in the terminal device 2, in a certain serving cell or a certain subframe, the higher layer processing unit 201 output instruction information to the transmission unit 207 through the control unit 203, so as to transmit the physical uplink control channel.

In a case where the sum of transmitted power of a second uplink reference signal and transmitted power of the physical uplink shared channel exceeds the maximum transmitted power configured in the terminal device 2, in a certain serving cell or a certain subframe, the higher layer processing unit 201 output instruction information to the transmission unit 207 through the control unit 203, so as to transmit the physical uplink shared channel.

In a case where the sum of transmitted power of the second uplink reference signal and transmitted power of the physical uplink control channel exceeds the maximum transmitted power configured in the terminal device 2, in a certain serving cell (for example, serving cell c) or a certain subframe (for example, subframe i), the higher layer processing unit 201 output instruction information to the transmission unit 207 through the control unit 203, so as to transmit the physical uplink control channel.

In a case where transmission of a plurality of physical channels occurs at the same timing (for example, subframe), the higher layer processing unit 201 may control transmitted power of various physical channels or control transmission of the various physical channels, in accordance with the priorities of the various physical channels. The higher layer processing unit 201 outputs control information thereof to the transmission unit 207 through the control unit 203.

In a case where carrier aggregation is performed by using a plurality of component carriers which respectively correspond to a plurality of serving cells or a plurality of serving cells, the higher layer processing unit 201 may control transmitted power of various physical channels or control transmission of the various physical channels, in accordance with the priorities of the various physical channels.

The higher layer processing unit 201 may control transmission of various physical channels which are to be transmitted from a cell, in accordance with the priority of the cell. The higher layer processing unit 201 outputs control information thereof to the transmission unit 207 through the control unit 203.

The higher layer processing unit 201 outputs instruction information to the transmission unit 207 through the control unit 203, based on information regarding a configuration of the uplink reference signal of which notification is performed from the base station apparatus 1, for example, such that the uplink reference signal is generated. That is the reference signal control unit 2013 outputs the information regarding the configuration of the uplink reference signal, to the uplink reference signal generation unit 2079 through the control unit 203.

The control unit 203 generates a control signal for controlling the reception unit 205 and the transmission unit 207, based on the control information from the higher layer processing unit 201. The control unit 203 outputs the generated control signal to the reception unit 205 and the transmission unit 207, and thus controls the reception unit 205 and the transmission unit 207.

The reception unit 205 separates, demodulates, and decodes a reception signal which is received from the base station apparatus 1 through the transmit/receive antenna 211, in accordance with the control signal input from the control unit 203. The reception unit 205 outputs information obtained by the decoding to the higher layer processing unit 201. The reception unit receives a PDCCH which has been transmitted by using the first DCI format or the second DCI format.

The reception unit 205 performs appropriate reception processing in accordance with whether or not information regarding a first configuration and/or information regarding a second configuration is received. For example, in a case where either of the information regarding the first configuration and the information regarding the second configuration is received, the reception unit 205 detects a first control information field from the received downlink control information format. In a case where the information regarding the first configuration and the information regarding the second configuration are received, the reception unit 205 detects a second control information field from the received downlink control information format.

The radio reception portion 2057 converts (down-converts) the frequency of the signal of a downlink which has been received through the receive antenna into an intermediate frequency, and removes an unnecessary frequency component. The radio reception portion 2057 controls an amplification level so as to appropriately maintain the signal level, and performs orthogonal demodulation based on the same phase component and the orthogonal component of the received signal. The radio reception portion 2057 converts the analog signal subjected to orthogonal demodulation, into a digital signal. The radio reception portion 2057 removes a portion corresponding to a guard interval from the converted digital signal. The radio reception portion 2057 performs Fast Fourier Transform on a signal obtained by removing the guard interval, and thus extracts a signal in the frequency domain.

The demultiplexing portion 2055 separates the extracted signal into a PDCCH, a PDSCH, and a downlink reference signal (DL-RS). The separation is performed based on assignment information and the like of radio resources of which notification is performed in downlink control information. The demultiplexing portion 2055 performs compensation of a path of the PDCCH and the PDSCH, based on an estimated value of the path, which is input from the channel measurement unit 209. The demultiplexing portion 2055 outputs the downlink reference signal obtained by the separation, to the channel measurement unit 209.

The demodulation portion 2053 performs demodulation of the QPSK modulation scheme, on the PDCCH transmitted by using the DCI format. The demodulation portion 2053 outputs a result obtained by the demodulation, to the decoding portion 2051. In a case where decoding of the PDCCH is examined, and success of decoding is determined, the decoding portion 2051 outputs the decoded downlink control information (DCI) to the higher layer processing unit 201. The demodulation portion 2053 performs demodulation of the modulation scheme of which notification is performed in the downlink control information, such as QPSK, 16QAM, and 64QAM on the PDSCH. The demodulation portion 2053 outputs a result obtained by the demodulation, to the decoding portion 2051. The decoding portion 2051 performs decoding with the coding rate of which notification is performed in the downlink control information, and outputs data information obtained by decoding, to the higher layer processing unit 201.

The channel measurement unit 209 measures the pathloss of the downlink based on the downlink reference signal input from the demultiplexing portion 2055, and outputs the measured pathloss to the higher layer processing unit 201. The channel measurement unit 209 calculates an estimated value of a channel of a downlink, based on the downlink reference signal, and outputs the calculated value to the demultiplexing portion 2055. The channel measurement unit 209 measures received power of a first signal and/or a second signal, or measures reception quality thereof, in accordance with various types of information regarding measurement, of which notification is performed from the reference signal control unit 2013 through the control unit 203, and various types of information regarding a measurement report. The channel measurement unit 209 outputs the result thereof to the higher layer processing unit 201. In a case where an instruction of performing a channel evaluation of the first signal and/or the second signal is performed, the channel measurement unit 209 may output a result regarding the channel evaluation of each of the signals, to the higher layer processing unit 201. Here, the first signal or the second signal are reference signals (pilot signals, pilot channels, base signals). In addition to the first signal or the second signal, a third signal or a fourth signal may be provided. That is, the channel measurement unit 209 measures channels of one or more signals. The channel measurement unit 209 configures a signal for measuring the channel, in accordance with the control information of which notification is performed from the higher layer processing unit 201 through the control unit 203.

In a certain cell (first cell), in a case where an uplink subframe in which uplink transmission is required is generated, and thus measurement of CRS or CSI-RS is not possible in the same subframe of a cell (second cell) different from the certain cell, the channel measurement unit 209 may perform processing except for a subframe in which measurement of an average of measurement results (received power, reception quality, channel quality, and the like) in the second cell is not possible. In other words, the channel measurement unit 209 may calculate an average value of the measurement results (received power, reception quality, channel quality, and the like), only by using the received CRS or CSI-RS. The channel measurement unit 209 may transmit the calculation result thereof (indicator or information corresponding to the calculation result) to the base station apparatus 1 through the transmission unit 207.

The transmission unit 207 generates an uplink demodulation reference signal (UL DMRS) and/or a sounding reference signal (SRS), based on the control signal (control information) input from the control unit 203. The transmission unit 207 codes and modulates data information input from the higher layer processing unit 201, and performs multiplexing of a PUCCH, a PUSCH, and the generated UL DMRS and/or the generated SRS. The transmission unit 207 adjusts transmitted power of the PUCCH, the PUSCH, the UL DMRS, and the SRS, and transmits the adjusted transmitted power to the base station apparatus 1 through the transmit/receive antenna 211.

In a case where information regarding a measurement result is output from the higher layer processing unit 201, the transmission unit 207 transmits the output information, to the base station apparatus 1 through the transmit/receive antenna 211.

In a case where channel state information which is a result regarding the channel evaluation is output from the higher layer processing unit 201, the transmission unit 207 performs feedback of channel state information to the base station apparatus 1. That is, the higher layer processing unit 201 generates channel state information (CSI, CQI, PMI, RI) based on a measurement result of which notification is performed from the channel measurement unit 209, and performs feedback to the base station apparatus 1 through the control unit 203.

If a predetermined grant (or a predetermined downlink control information format) is detected in the reception unit 205, the transmission unit 207 transmits an uplink signal corresponding to the predetermined grant in the first uplink subframe among subframes subsequent to a predetermined subframe from a subframe in which the grant is detected. For example, if the grant is detected in the subframe i, the uplink signal may be transmitted in the first uplink subframe among subframes subsequent to a subframe (i+k).

In a case where a transmission subframe of the uplink signal is the subframe the transmission unit 207 sets transmitted power of the uplink signal, based on a power control adjustment value obtained by a TPC command which is received in a subframe (i−k). Here, the power control adjustment value f(i) (or g(i)) is configured based on a corrected value or an absolute value which is correlated with a value set in the TPC command. In a case where the accumulation is effective, corrected values correlated with the value set in the TPC command are accumulated, and the accumulation result is applied as the power control adjustment value. In a case where the accumulation is not effective, a single absolute value which is correlated with a value set in the TPC command is applied as the power control adjustment value.

In a case where either of the information regarding the first configuration and the information regarding the second configuration is received in the reception unit 205, the transmission unit 207 sets transmitted power based on a parameter relating to the first uplink power control. In a case where the information regarding the first configuration and the information regarding the second configuration are received in the reception unit 205, the transmission unit 207 sets the transmitted power based on a parameter relating to the second uplink power control, and transmits the uplink signal.

The coding portion 2071 performs coding such as turbo-coding, convolutional coding, and block coding, on the uplink control information input from the higher layer processing unit 201, and data information. The modulation portion 2073 modulates the coded bits input from the coding portion 2071, by using a modulation scheme such as BPSK, QPSK, 16QAM, and 64QAM.

The uplink reference signal generation unit 2079 generates an uplink reference signal based on information regarding the configuration of the uplink reference signal. That is, the uplink reference signal generation unit 2079 generates CAZAC sequences known by the base station apparatus 1. The CAZAC sequences are obtained by using a rule which is determined based on a cell identifier for identifying the base station apparatus 1, a bandwidth for assigning an uplink demodulation reference signal, the first uplink reference signal, and the second uplink reference signal, and the like. The uplink reference signal generation unit 2079 adds the cycling shill to the CAZAC sequences of the generated uplink demodulation reference signal, the first uplink reference signal, and the second uplink reference signal, based on the control signal input from the control unit 203.

The uplink reference signal generation unit 2079 may initialize base sequences of the uplink demodulation reference signal, and/or the sounding reference signal, and the uplink reference signal, based on predetermined parameters. The predetermined parameters may be the same as each other in the reference signals. The predetermined parameters may be configured independently in the reference signals. That is, the uplink reference signal generation unit 2079 may initialize the base sequences of the reference signals by using the same parameter, as long as there is no parameter which is independently configured.

The multiplexing portion 2075 arranges modulation symbols of the PUSCH in parallel with each other, based on the control signal input from the control unit 203, so as to perform discrete Fourier transform (DFT), and performs multiplexing of the PUCCH, the signal of the PUSCH, and the generated UL DMRS, and the generated SRS.

The radio transmission portion 2077 performs Inverse Fast Fourier Transform on the multiplexed signals, and performs modulation of the SC-FDMA scheme. The radio transmission portion 2077 adds a guard interval to SC-FDMA symbols obtained by SC-FDMA modulation, and generates a baseband digital signal. The radio transmission portion 2077 converts the baseband digital signal into an analog signal, and generates the same-phase component and the orthogonal component of an intermediate frequency, from the analog signal. The radio transmission portion 2077 removes an extra frequency component from the intermediate frequency band, and converts (up-converts) a signal having an intermediate frequency into a signal having a high frequency (radio frequency). The radio transmission portion 2077 removes an extra frequency component, amplifies power, and outputs the signal to the transmit/receive antenna 211 so as to perform transmission.

In the embodiment, the case where the carrier aggregation is configured (secondary cell is configured), and the case where the PUCCH is transmitted and received in the primary cell are described. However, it is not limited thereto. In the case where the carrier aggregation is configured, HARQ-ACK corresponding to the PDSCH in the secondary cell may be transmitted and received in the secondary cell. At this time, in a case where the carrier aggregation is configured, and the carrier aggregation of the uplink is not configured, that is, in a case where the secondary cell is configured without accordance with the configuration of the uplink component carrier, the HARQ-ACK corresponding to the PDSCH in the secondary cell is transmitted and received in the primary cell. At this time, the above process may be performed by using the transmission and reception procedure of the HARQ-ACK which is described in the embodiment. Even in a case where the serving cell in which the PUCCH is transmitted and received is a serving cell other than the primary cell (for example, some (one) secondary cells in a secondary cell group), the above process may be performed by using the transmission and reception procedure of the HARQ-ACK which is described in the embodiment. At this time, the primary cell in the embodiment is rewritten to, for example, some secondary cells, and thus similar effects can be exhibited.

In the embodiment, the reception processing may include detection processing (detection). The reception processing may include demodulation processing (demodulation). The reception processing may include decoding processing (decode, decoding).

In the terminal device 2, the priorities of the physical channels/physical signals to be transmitted may be configured or defined in advance, in accordance with the type of the physical channel.

In the embodiment, the terminal device 2 may report a measurement result of the received power to the base station apparatus 1 based on the CSI-RS or a discovery reference signal (DRS). The terminal device 2 may perform periodically reporting. The terminal device 2 may perform the reporting in a case where a certain condition is satisfied.

In the embodiment, in a case where the terminal device 2 measures the received power based on the CSI-RS or the DRS, the terminal device 2 may perform transmitted power control of the uplink signal based on the received power. That is, the terminal device 2 may determine downlink pathloss based on the received power.

In the embodiment, in a case where the sum of transmitted power of the various uplink signals, which includes transmitted power of the first uplink reference signal and/or the second uplink reference signal exceeds the maximum transmitted power configured in the terminal device 2, the terminal device 2 may not transmit the first uplink reference signal and/or the second uplink reference signal.

If a TDD UL/DL configuration (first TDD UL/DL configuration) for the uplink transmission reference, and a TDD UL/DL configuration (second TDD UL/DL configuration) for the downlink transmission reference are configured, and information regarding the uplink transmitted power control is configured, in a case where subframes having the same type are configured in the first TDD UL/DL configuration and the second TDD UL/DL configuration, the terminal device 2 sets the uplink power control of the subframe, based on the parameters relating to the first uplink power control. In a case where subframes having different types are configured in the first TDD UL/DL configuration and the second TDD UL/DL configuration, the uplink power of the subframe is set based on the parameters relating to the second uplink power control.

The flexible subframe is a subframe which is an uplink subframe or a downlink subframe. The flexible subframe is a subframe which is a downlink subframe or a special subframe. The flexible subframe is a subframe which is uplink subframe or the special subframe. That is, the flexible subframe is a subframe which is a first subframe or a second subframe. For example, a subframe configured as the flexible subframe is processed as the first subframe (for example, uplink subframe) in a case of Condition 1, and is processed as the second subframe (for example, downlink subframe) in a case of Condition 2.

The flexible subframe may be set based on the first configuration and the second configuration. For example, in a case where a certain subframe i is configured as the uplink subframe in the first configuration, and is configured as the downlink subframe in the second configuration, the subframe i functions as the flexible subframe. The flexible subframe may be configured based on information for performing an instruction of a subframe pattern of the flexible subframe.

A plurality of subframes may be configured not based on two TDD UL/DL configurations, but based on one TDD UL/DL configuration and a flexible subframe pattern (downlink candidate subframe pattern or uplink candidate subframe pattern, addition subframe). The terminal device 2 may receive a downlink signal by using a subframe index indicated by a flexible subframe pattern as long as, even when indication as the uplink subframe in the TDD UL/DL configuration is performed, the uplink signal is transmitted in the subframe. The terminal device 2 may transmit the uplink signal as long as even when indication as the downlink subframe in the TDD UL/DL configuration is performed, an instruction of transmitting the uplink signal in the subframe is performed in advance. An instruction for a specific subframe as an uplink/downlink candidate subframe may be performed.

If a certain condition is satisfied, the terminal device 2 may recognize one set of subframes as a subframe set for an uplink, and recognize the other set of subframes as a subframe set for a downlink. Here, the subframe set for an uplink corresponds to a set of subframes configured for transmitting a PUSCH and a PHICH. The downlink subframe set corresponds to a set of subframes configured for transmitting a PDSCH and HARQ. Information indicating association of subframes with the PUSCH and the PHICH, and information indicating association of subframes with the PDSCH and the HARQ may be configured in the terminal device 2 in advance.

In the embodiment, a plurality of subframe sets is configured for one serving cell (primary cell, secondary cell, carrier frequency, transmission frequency, component carrier). A cell in which a plurality of subframe sets is configured, and a cell in which a plurality of subframe sets is not configured may be provided.

In the embodiment, in a case where two or more subframe sets are independently configured for one serving cell, the maximum transmitted power ($P_{CMAX}$, $P_{CMAX,c}$) for each terminal device 2 may be configured for each of the subframe sets. That is, the terminal device 2 may configure plural pieces of independent maximum transmitted power to be plural. That is, plural pieces of maximum transmitted power ($P_{CMAX}$, $P_{CMAX,c}$) may be set for one serving cell. Plural pieces of the maximum allowable output power ($P_{EMAX,c}$) may be configured for one serving cell.

In a case where resource assignments of various uplink signals are the same as each other, the base station apparatus 1 may detect the various uplink signals by using a difference between signal sequences of the uplink signals. That is, the base station apparatus 1 may recognize the uplink signal by using the difference between the signal sequences of the received uplink signals. The base station apparatus 1 may determine whether or not transmission to the base station apparatus 1 is performed, by using the difference between the signal sequences of the received uplink signals.

In a case where an instruction of measuring received power is performed by using the CSI-RS or the DRS from the base station apparatus 1, the terminal device 2 may calculate downlink pathloss based on the measurement result, and use the calculated downlink pathloss in the uplink transmitted power control.

Here, the measurement of the received power may be also referred to reference signal received power (RSRP) measurement or reception signal power measurement. Measurement of reception quality may be also referred to reference signal received quality (RSRQ) measurement or reception signal quality measurement.

The resource assignment (resource allocation, mapping to resource elements, mapping to physical resources) of the CSI-RS or the DRS may be frequency-shifted. The frequency shift of the CSI-RS or the DRS may be determined based on the physical cell ID. The frequency shift of the CSI-RS or the DRS may be determined based on the virtual cell ID.

For example, if notification of information is not performed from the base station apparatus 1, the terminal device 2 measures received power of the first downlink reference signal. Notification of information for an instruction of whether or not received power of the second downlink reference signal is measured is performed for the terminal device 2 from the base station apparatus 1. In a case where the instruction information indicates that the received power of the second downlink reference signal may be measured, the terminal device 2 measures the received power of the second downlink reference signal. At this time, the terminal device 2 may measure the received power of the first downlink reference signal along with the measurement of the second downlink reference signal. In a case where the instruction information indicates that measuring the received power of the second downlink reference signal is not possible, the terminal device 2 measures the received power of only the first downlink reference signal. The instruction information may include information for an instruction of whether or not reception quality of the second downlink reference signal is measured. Regardless the instruction information, received power of a third downlink reference signal may be measured.

In a case where two subframe sets are configured for one serving cell, if the second subframe set is set to be a subframe pattern of the flexible subframe, information of instructing the flexible subframe of a pattern of a subframe in which the DCI format including the TPC command field can be received may be transmitted to the terminal device 2 from the base station apparatus 1.

A pattern of a subframe in which a TPC command applicable to the uplink subframe which belongs to the first subframe set, and a pattern of a subframe in which a TPC command applicable to the uplink subframe which belongs to the second subframe set may be respectively configured. The correspondence between the uplink subframe and the downlink subframe in which the DCI format including the TPC command for the uplink subframe is transmitted may be managed in a table.

RSRP measurement results may be independent from each other in a subframe set. A RSRP by the CRS received in a downlink subframe of a fixation subframe and a RSRP by the CRS received in the flexible subframe may be independently measured.

In the embodiment, the descriptions are made by using a resource element or a resource block as a mapping unit of various uplink signals or various downlink signals, and by using a symbol, a subframe, or a radio frame as a transmitting unit in the time direction. However, it is not limited thereto. Similar effects may be also obtained by using a region unit and a time unit configured by an arbitrary frequency and time instead of the above-described units. In the embodiment, a case where demodulation is performed by using a RS subjected to precoding processing is described. Furthermore, the descriptions are made by using a port which is equivalent to the layer of MIMO, as a port corresponding to the RS subjected to the precoding processing. However, it is not limited thereto. In addition, the present invention is applied to ports corresponding to reference signals which are different from each other, and thus similar effects may be obtained. For example, as the port, a port which is equivalent to an output end after precoding is processed, or a port which is equivalent to a physical antenna (or combination of physical antennae) may be used by using Unprecoded (Nonprecoded) RS, not Precoded RS.

In the embodiment, in a case where only DCI format 3/3A is received in a certain downlink subframe, a correction value (or absolute value) corresponding to a value set in the TPC command field which is included in DCI format 3/3A is applied to the power control adjustment value for the transmitted power of a PUSCH which is transmitted in a specific subframe set, regardless of which subframe set the downlink subframe belongs to. In a case where only DCI format 3/3A is received in a certain downlink subframe, the accumulation of TPC commands included in DCI format 3/3A may be applied to the power control adjustment value for the transmitted power of a PUSCH which is transmitted in a specific subframe set. The specific subframe set may be a set of fixation subframes, a set of flexible subframes, or a set of arbitrary subframes.

In the embodiment, the parameter relating to the uplink power control corresponds to the parameter used in the transmitted power control of the uplink physical channel/physical signal (PUSCH, PUCCH, PRACH, SRS, DMRS, and the like). The parameter used in the transmitted power control includes information regarding switching or (re)configuring of various parameters which are used in configuring transmitted power of various uplink physical channels. The parameter relating to the downlink transmitted power control corresponds to the parameter used in the transmitted power control of the downlink physical channel/physical signal (CRS, UERS (DL DMRS), CSI-RS, PDSCH, PDCCH/EPDCCH, PBCH, PSS/SSS, PMCH, PRS, and the like). The parameter used in the transmitted power control includes information regarding switching or (re)configuring of various parameters which are used in configuring transmitted power of various downlink physical channels.

In the embodiment, the base station apparatus 1 may configure a plurality of virtual cells ID for one terminal device 2. For example, the base station apparatus 1 and a network including at least one base station apparatus 1 may configure independently virtual cells ID for each physical channel/physical signal. A plurality of virtual cells ID for one physical channel/physical signal may be configured. That is, the virtual cell ID may be set for each configuration of the physical channel/physical signal. The virtual cell ID may be shared between a plurality of physical channels/physical signals.

In the descriptions of the embodiment, for example, a case of setting power includes a case where a value of the power is set. The case of setting power includes a case where a value is set in a parameter relating to the power. A case of calculating power includes a case where the value of the power is calculated, and a case of measuring power includes a case where the value of the power is measured. A case of reporting power includes a case where the value of the power is reported. In this manner, the expression of the power appropriately includes the meaning of the value of the power.

In the descriptions of the embodiment, a case where transmission is not performed includes a case where transmission processing is not performed. The case where transmission is not performed includes a case where a signal for transmission is not generated. The case where transmission is not performed includes a case where a signal (or information) is generated, but the generated signal (or information) is not transmitted. A case where reception is not performed includes a case where reception processing is not performed. The case where reception is not performed includes a case where detection processing is not performed. The case where reception is not performed includes a case where decoding or demodulation processing is not performed.

In the descriptions of the embodiment, for example, a case of calculating the pathloss includes a case where the value of the pathloss is calculated. In this manner, the expression of the pathloss appropriately includes the meaning of the value of the pathloss.

In the descriptions of the embodiment, a case of configuring various parameters includes a case where values of the various parameters are configured. In this manner, the expression of various parameters appropriately includes the meaning of the value of the various parameters.

According to the present invention, programs operated in the base station apparatus 1 and the terminal device 2 correspond to a program of controlling a CPU and the like (program of causing a computer to perform functions), so as to realize the functions in the embodiment according to the present invention. Pieces of information handled in the base station apparatus 1 and the terminal device 2 are temporarily accumulated in a RAM during the processing, and then, the pieces of information are stored in various ROMs or various HDDs. The stored pieces of information are read by the CPU, if necessary, and modification and writing is performed. As a recoding medium of storing the program, any of a semiconductor medium (for example, ROM, non-volatile memory card, and the like), an optical recording medium (for example, DVD, MO, MD, CD, BD, and the like), a magnetic recording medium (for example, magnetic tape, flexible disc, and the like), and the like may be used. The loaded program is executed, and thus the above-described functions of the embodiment are performed, and an operating system, other applications, or the like are processed together, based on an instruction of the program. Thus, the functions according to the present invention may be realized.

In a case where distribution to markets is performed, the program may be stored in a portable recoding medium and be distributed, or may be transmitted to a server computer connected through a network such as the Internet. In this case, the present invention also includes a recording device of the server computer. In the above-described embodiment, some or all of components of the base station apparatus 1 and the terminal device 2 may be realized as a LSI which is a typical integrated circuit. Function blocks of the base station apparatus 1 and the terminal device 2 may be individually formed as a form of the chip. Some or all of the function blocks may be integrated so as to be formed as a form of the chip. A method of integration of circuits is not limited to the LSI, and may be realized as a dedicated circuit or a public processor. In a case where the progress of the semiconductor technology causes a technology of integration of circuits, which substitute the LSI to be expressed, an integrated circuit obtained by using the expressed technology may be used.

Hitherto, the embodiment according to the invention is described in detail with reference to the drawings. However, the specific configuration is not limited to the embodiment, and includes design modification and the like in a range without departing from the gist of the invention. The present invention may be changed in a scope described in the claims, and an embodiment obtained by appropriately combining technological means disclosed in different embodiments is also included in the technological scope of the present invention. The components are components described in the embodiment, and a configuration obtained by substituting components of exhibiting similar effects with each other is also included.

This application invention is not limited to the above-described embodiment. The terminal device of this application invention is not limited to application to a mobile station, and may be applied to a stationary type electronic apparatus or a non-movable electronic apparatus which is installed indoor or outdoor. Examples of such an electronic apparatus include AV devices, kitchen utensils, cleaning or washing devices, an air-conditioning device, business appliances, vending machines, other domestic appliances. The present invention is preferably used in a radio base station apparatus, a radio terminal device, a radio communication system, or a radio communication method.

REFERENCE SIGNS LIST

1 BASE STATION APPARATUS
2 TERMINAL DEVICE
101 HIGHER LAYER PROCESSING UNIT
103 CONTROL UNIT
105 RECEPTION UNIT
107 TRANSMISSION UNIT
109 CHANNEL MEASUREMENT UNIT
111 TRANSMIT/RECEIVE ANTENNA
1051 DECODING PORTION
1053 DEMODULATION PORTION
1055 DEMULTIPLEXING PORTION
1057 RADIO RECEPTION PORTION
1071 CODING PORTION
1073 MODULATION PORTION
1075 MULTIPLEXING PORTION
1077 RADIO TRANSMISSION PORTION
1079 DOWNLINK REFERENCE SIGNAL GENERATION PORTION
201 HIGHER LAYER PROCESSING UNIT
203 CONTROL UNIT
205 RECEPTION UNIT
207 TRANSMISSION UNIT
209 CHANNEL MEASUREMENT UNIT
211 TRANSMIT/RECEIVE ANTENNA
2051 DECODING PORTION
2053 DEMODULATION PORTION
2055 DEMULTIPLEXING PORTION
2057 RADIO RECEPTION PORTION
2071 CODING PORTION
2073 MODULATION PORTION
2075 MULTIPLEXING PORTION
2077 RADIO TRANSMISSION PORTION
2079 UPLINK REFERENCE SIGNAL GENERATION UNIT

The invention claimed is:

1. A user equipment comprising:
transmission circuitry configured to transmit hybrid automatic repeat request-acknowledgement (HARQ-ACK) bits in a subframe n,
reception circuitry configured to detect downlink control information format (DCI) 0 or 4 corresponding to a physical uplink shared channel on a serving cell, and
control circuitry configured to
determine the number of the HARQ-ACK bits based on a parameter $W_{DAI}^{UL}$,
determine a value of the $W_{DAI}^{UL}$ from a downlink assignment index (DAI) in a subframe n−4 for the serving cell in a case that the user equipment is configured with more than one serving cell, frame structure types of two configured serving cells are different, a primary cell is frame structure type 2, and the serving cell is frame structure type 1, and
determine a value of the $W_{DAI}^{UL}$ from the DAI in a subframe n−k for the serving cell with the frame structure type 2, wherein
the DAI is in the DCI format 0 or 4,
the frame structure type 1 is applicable to frequency division duplex (FDD),
the frame structure type 2 is applicable to time division duplex (TDD)
the n is an integer, and
the k is an integer defined by TDD uplink-downlink configuration and the subframe n.

2. The user equipment according to claim 1, wherein the serving cell is a secondary cell using FFD.

3. The user equipment according to claim 1, wherein the serving cell is a primary cell or a secondary cell which uses TDD.

4. A base station apparatus which communicates with a user equipment, the base station apparatus comprising:
reception circuitry configured to receive hybrid automatic repeat request-acknowledgement (HARQ-ACK) bits in a subframe n,
transmission circuitry configured to transmit downlink control information format (DCI) 0 or 4 corresponding to a physical uplink shared channel on a serving cell, and
control circuitry configured to
determine the number of the HARQ-ACK bits based on a parameter $W_{DAI}^{UL}$,
determine a value of the $W_{DAI}^{UL}$ from a downlink assignment index (DAI) in a subframe n−4 for the serving cell in a case that the user equipment is configured with more than one serving cell, frame structure types of two configured serving cells are different, a primary cell is frame structure type 2, and the serving cell is frame structure type 1, and
determine a value of the $W_{DAI}^{UL}$ from the DAI in a subframe n−k for the serving cell with the frame structure type 2, wherein the DAI is in the DCI format 0 or 4,
the frame structure type 1 is applicable to frequency division duplex (FDD),
the frame structure type 2 is applicable to time division duplex (TDD)
the n is an integer, and
the k is an integer defined by TDD uplink-downlink configuration and the subframe n.

5. The base station apparatus according to claim 4, wherein
the serving cell is a secondary cell using FFD.

6. The base station apparatus according to claim 1, wherein
the serving cell is a primary cell or a secondary cell which uses TDD.

7. A communication method of a user equipment, the communication method comprising:
transmitting hybrid automatic repeat request-acknowledgement (HARQ-ACK) bits in a subframe n,
detecting downlink control information format (DCI) 0 or 4 corresponding to a physical uplink shared channel on a serving cell, and
determining the number of HARQ-ACK bits, based on a parameter $W_{DAI}^{UL}$,
determine a value of the $W_{DAI}^{UL}$ from a downlink assignment index (DAI) in a subframe n−4 for the serving cell in a case that the user equipment is configured with more than one serving cell, frame structure types of two configured serving cells are different, a primary cell is frame structure type 2, and the serving cell is frame structure type 1, and
determine a value of the $W_{DAI}^{UL}$ from the DAI in a subframe n−k for the serving cell with the frame structure type 2, wherein
the DAI is in the DCI format 0 or 4,
the frame structure type 1 is applicable to frequency division duplex (FDD),
the frame structure type 2 is applicable to time division duplex (TDD),
the n is an integer, and
the k is an integer defined by TDD uplink-downlink configuration and the subframe n.

8. A communication method of a base station apparatus which communicates with a user equipment, the communication method comprising:
receiving hybrid automatic repeat request-acknowledgement (HARQ-ACK) bits in a subframe n,
transmitting downlink control information format (DCI) 0 or 4 corresponding to a physical uplink shared channel on a serving cell, and
determining the number of HARQ-ACK bits, based on a parameter $W_{DAI}^{UL}$,
determine a value of the $W_{DAI}^{UL}$ is determined from a downlink assignment index (DAI) in a subframe n−4 for the serving cell in a case that the user equipment is configured with more than one serving cell, frame structure types of two configured serving cells are different, a primary cell is frame structure type 2, and the serving cell is frame structure type 1, and
determine a value of the $W_{DAI}^{UL}$ from the DAI in a subframe n−k for the serving cell with the frame structure type 2, wherein
the DAI is in the DCI format 0 or 4,
the frame structure type 1 is applicable to frequency division duplex (FDD),
the frame structure type 2 is applicable to time division duplex (TDD),
the n is an integer, and
the k is an integer defined by TDD uplink-downlink configuration and the subframe n.

* * * * *